US012123937B2

(12) United States Patent
Amadjikpe et al.

(10) Patent No.: US 12,123,937 B2
(45) Date of Patent: Oct. 22, 2024

(54) HIGH END IMAGING RADAR

(71) Applicant: Intel Corporation, Santa Clara, CA (US)

(72) Inventors: Arnaud Amadjikpe, Beaverton, OR (US); Timo Sakari Huusari, Hillsboro, OR (US); Tae Young Yang, Portland, OR (US); Hossein Alavi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 523 days.

(21) Appl. No.: 17/369,994

(22) Filed: Jul. 8, 2021

(65) Prior Publication Data

US 2022/0196821 A1 Jun. 23, 2022

Related U.S. Application Data

(63) Continuation of application No. PCT/US2020/066291, filed on Dec. 21, 2020.

(51) Int. Cl.
*G01S 13/42* (2006.01)
*G01S 7/35* (2006.01)
*G01S 13/89* (2006.01)

(52) U.S. Cl.
CPC ............ *G01S 13/426* (2013.01); *G01S 13/89* (2013.01); *G01S 7/35* (2013.01)

(58) Field of Classification Search
CPC ...... G01S 13/42; G01S 13/426; G01S 13/584; G01S 13/881; G01S 13/89; G01S 13/931; G01S 7/35; G01S 7/417
See application file for complete search history.

(56) References Cited

U.S. PATENT DOCUMENTS 10,481,696 B2 11/2019 Molchanov et al.
11,887,575 B2 * 1/2024 Chang .............. G10K 11/17857
(Continued)

FOREIGN PATENT DOCUMENTS

WO 2019065158 A1 4/2019

OTHER PUBLICATIONS

International Search Report issued for the corresponding international application No. PCT/US2020/066291, dated Sep. 16, 2021, 11 pages (only for informational purposes).
Nosrati Mehrdad et al., "A Concurrent Dual-Beam Phased-Array Doppler Radar Using MIMO Beamforming Techniques for Short-Range Vital-Signs Monitoring", Apr. 2019, IEEE, pp. 2390-pp. 2404, Transactions on Antennas and Propagation, vol. 67, Issue: 4, DOI:10.1109/TAP.2019.2893337.
(Continued)

*Primary Examiner* — Timothy X Pham
(74) *Attorney, Agent, or Firm* — VIERING, JENTSCHURA & PARTNER MBB

(57) ABSTRACT

A radar device may include a digital to analog converter (DAC) stage. The DAC stage may generate a plurality of analog signals. The DAC stage may generate a different analog signal for each transmitter chain of a plurality of transmitter chains. Each analog signal of the plurality of analog signals may represent a single digital signal. Each transmitter chain of the plurality of transmitter chains may include a transmit chain portion and switched analog beamforming network (BFN). The transmit chain portion may generate a plurality of intermediate analog signals representative of the corresponding analog signal. The switched analog BFN may generate a plurality of analog transmit signals for an intermediate analog signal of the plurality of intermediate analog signals. The plurality of analog transmit signals may include a beam formed in accordance with a state of the switched analog BFN.

13 Claims, 44 Drawing Sheets

(56) References Cited

U.S. PATENT DOCUMENTS

| | | | |
|---|---|---|---|
| 2013/0063297 A1 | 3/2013 | Papziner et al. | |
| 2013/0088391 A1* | 4/2013 | Corman | H04B 7/18515 |
| | | | 342/365 |
| 2014/0313071 A1 | 10/2014 | McCorkle | |
| 2017/0074986 A1* | 3/2017 | Chang | G01S 19/215 |
| 2019/0131721 A1 | 5/2019 | Dani et al. | |
| 2019/0324136 A1 | 10/2019 | Amadjikpe | |
| 2020/0204244 A1* | 6/2020 | Hajimiri | H04B 7/0697 |
| 2020/0225317 A1 | 7/2020 | Chen et al. | |
| 2020/0229206 A1 | 7/2020 | Badic et al. | |
| 2020/0371229 A1 | 11/2020 | Levitan et al. | |
| 2021/0013940 A1* | 1/2021 | Lu | H04B 7/0686 |
| 2021/0067217 A1 | 3/2021 | Nagasaku | |
| 2023/0223686 A1* | 7/2023 | Franson | H01Q 9/0407 |
| | | | 342/372 |

OTHER PUBLICATIONS

National Search Report for Dutch patent application No. 2029822, dated Mar. 1, 2023, 17 pages, (For informational purposes only).

"MESA-X-EVU Evaluation Unit X-Band 19dBi Agile Beam Radar Aperture", retrieved from http://xponential.vporoom.com/Echodyne/download/MESA-X_EVU_2016_0428.pdf, Apr. 28, 2016, pp. 2, 2016, Echodyne Corp.

Feng et al., "Dual-Wideband Dual-Polarized Metasurface Antenna Array for the 5G Millimeter Wave Communications Based on Characteristic Mode Theory," IEEE Access, Jan. 23, 2020, pp. 21589-21601, vol. 8.

Payam et al., "Bifocal Design and Aperture Phase Optimizations of Reflectarray Antennas for Wide-Angle Beam Scanning Performance", IEEE Transactions on Antennas and Propagation, vol. 61, No. 9, Sep. 2013, pp. 4588-4597, IEEE.

* cited by examiner

HIGH END IMAGING RADAR

CROSS-REFERENCE TO RELATED APPLICATIONS

This patent application claims the benefit of and priority to Patent Cooperation Treaty Application PCT/US2020/066291, filed on Dec. 21, 2020, the entirety of which is hereby incorporated herein by reference.

TECHNICAL FIELD

Various aspects of this disclosure generally relate to radar, antenna array configuration in radar, processing of radar signals by one or more artificial neural networks, and implementation of same, such as in robotic devices.

BACKGROUND

Autonomous devices (e.g., autonomous vehicles and robots) perceive and navigate through their environment using sensor data of one or more sensor types. Conventionally, autonomous perception relies heavily on light-based sensors, such as image sensors (e.g. cameras) and/or Light Detection and Ranging (LIDAR) sensors. Such light-based sensors may perform poorly under certain conditions, such as conditions of poor visibility or in certain inclement weather conditions (e.g. rain, snow, hail, or other forms of precipitation), thereby limiting their usefulness or reliability. Radio detection and ranging (Radar) systems, however, may be comparatively undisturbed by inclement weather and/or reduced visibility.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
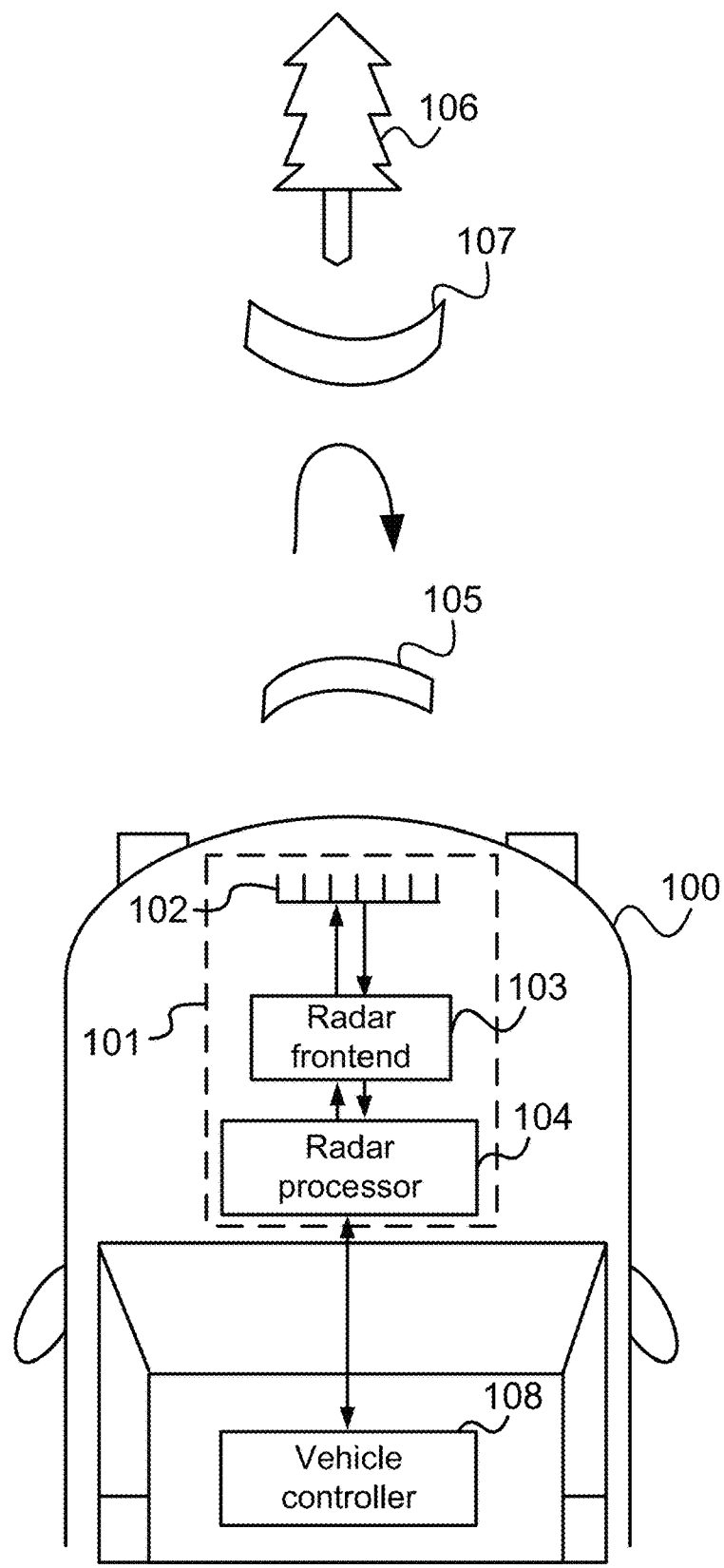
FIG. 1 shows an exemplary autonomous device such as a vehicle.

The following detailed description refers to the accompanying drawings that show, by way of illustration, exemplary details in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

A "vehicle" may be understood to include any type of driven object. By way of example, a vehicle may be a driven object with a combustion engine, a reaction engine, an electrically driven object, a hybrid driven object, or a combination thereof. A vehicle may be or may include an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, as described above, which is configured to traverse the ground, e.g., on a street, on a road, on a track, on one or more rails, off-road, etc.

The term "autonomous vehicle" may describe a vehicle capable of implementing at least one navigational change without driver input. A navigational change may describe or include a change in one or more of steering, braking, or acceleration/deceleration of the vehicle. A vehicle may be described as autonomous even in case the vehicle is not fully automatic (for example, fully operational with driver or without driver input). Autonomous vehicles may include those vehicles that can operate under driver control during certain time periods and without driver control during other time periods. Autonomous vehicles may also include vehicles that control only some aspects of vehicle navigation, such as steering (e.g., to maintain a vehicle course between vehicle lane constraints) or some steering operations under certain circumstances (but not under all circumstances), but may leave other aspects of vehicle navigation to the driver (e.g., braking or braking under certain circumstances). Autonomous vehicles may also include vehicles that share the control of one or more aspects of vehicle navigation under certain circumstances (e.g., hands-on, such as responsive to a driver input) and vehicles that control one or more aspects of vehicle navigation under certain circumstances (e.g., hands-off, such as independent of driver input). Autonomous vehicles may also include vehicles that control one or more aspects of vehicle navigation under certain circumstances, such as under certain environmental conditions (e.g., spatial areas, roadway conditions). In some aspects, autonomous vehicles may handle some or all aspects of braking, speed control, velocity control, and/or steering of the vehicle. An autonomous vehicle may include those vehicles that can operate without a driver. The level of autonomy of a vehicle may be described or determined by the Society of Automotive Engineers (SAE) level of the vehicle (e.g., as defined by the SAE, for example in SAE J3016 2018: Taxonomy and definitions for terms related to driving automation systems for on road motor vehicles) or by other relevant professional organizations. The SAE level may have a value ranging from a minimum level, e.g. level 0 (illustratively, substantially no driving automation), to a maximum level, e.g. level 5 (illustratively, full driving automation).

In the context of the present disclosure, "vehicle operation data" may be understood to describe any type of feature related to the operation of a vehicle. By way of example, "vehicle operation data" may describe the status of the vehicle such as the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, etc. More generally, "vehicle operation data" may describe or include varying features or varying vehicle operation data (illustratively, time varying features or data).

Various aspects of the disclosure herein may utilize one or more machine learning models to perform or control functions of the vehicle (or other functions described herein). The term "model" may, for example, used herein may be understood as any kind of algorithm, which provides output data from input data (e.g., any kind of algorithm generating or calculating output data from input data). A machine learning model may be executed by a computing system to progressively improve performance of a specific task. In some aspects, parameters of a machine learning model may be adjusted during a training phase based on training data. A trained machine learning model may be used during an inference phase to make predictions or decisions based on input data. In some aspects, the trained machine learning model may be used to generate additional training data. An additional machine learning model may be adjusted during a second training phase based on the generated additional training data. A trained additional machine learning model may be used during an inference phase to make predictions or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to predict the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. Techniques that may be implemented in an unsupervised learning model may include, e.g., self-organizing maps, nearest-neighbor mapping, k-means clustering, and singular value decomposition.

Reinforcement learning models may include positive or negative feedback to improve accuracy. A reinforcement learning model may attempt to maximize one or more objectives/rewards. Techniques that may be implemented in a reinforcement learning model may include, e.g., Q-learning, temporal difference (TD), and deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify certain driving conditions and/or environmental conditions, such as weather conditions, road conditions, and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

Throughout the present disclosure, the following terms will be used as synonyms: driving parameter set, driving model parameter set, safety layer parameter set, driver assistance, automated driving model parameter set, and/or the like (e.g., driving safety parameter set).

Furthermore, throughout the present disclosure, the following terms will be used as synonyms: driving parameter, driving model parameter, safety layer parameter, driver assistance and/or automated driving model parameter, and/or the like (e.g., driving safety parameter).

FIG. 1 shows an exemplary autonomous device such as a vehicle 100.

The vehicle 100 includes a radar device 101 that includes an antenna arrangement 102, a radar frontend 103 and a radar processor 104.

The radar frontend 103 for example includes one or more (radar) transmitters and a one or more (radar) receivers. The antenna arrangement 102 may include multiple transmit antennas in the form of a transmit antenna array and multiple receive antennas in the form of a receive antenna array or one or more antennas used both as transmit and receive antennas. In the latter case, the radar frontend 103 for example includes a duplexer (i.e. a circuit to separate transmitted signals from received signals).

For the detection of an object 106, the radar processor 104 transmits, using the radar frontend 103 and the antenna arrangement 102, a radio transmit signal 105.

The radio transmit signal 105 is reflected by the object 106 resulting in an echo 107.

The radar device 101 receives the echo 107 and the radar processor 104 calculates information about position, speed and direction of the object 106 with respect to the vehicle 100. The radar processor 104 may then for example supply this calculated information to a vehicle controller 108 of the vehicle 100, e.g. for autonomous driving of the vehicle 100, to facilitate operation of the vehicle 100.

For example, the radar device 101 may be installed in a vehicle for detection of nearby objects, in particular for autonomous driving. In the following, a further application example of radar is illustrated in FIG. 2.

Figure 2:
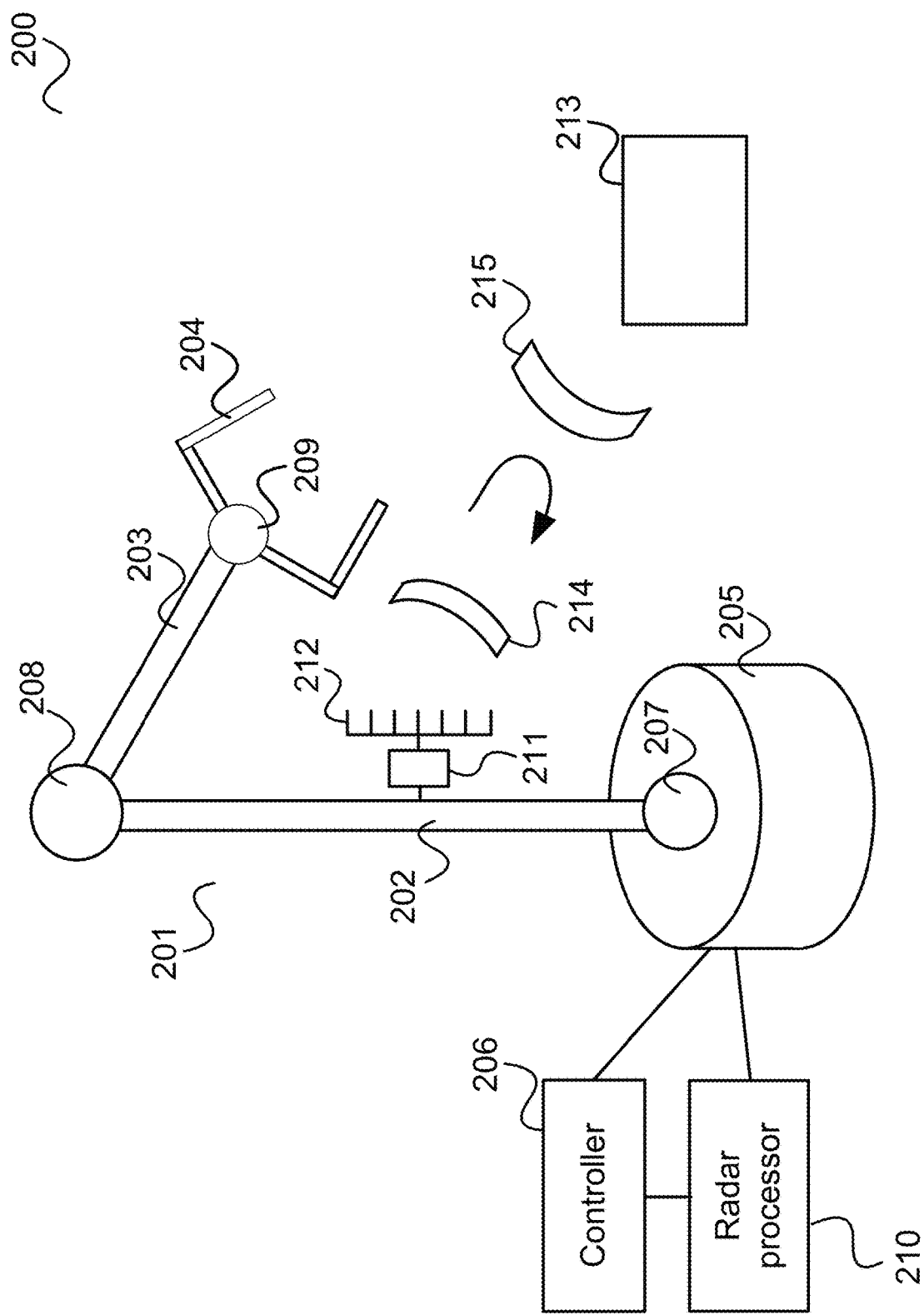
FIG. 2 shows an exemplary autonomous device such as a robot.

FIG. 2 shows an exemplary autonomous device such as a robot 200.

The robot 200 includes a robot arm 201. The robot 200 may for example be in a factory for handling an object 213, which is for example a part that should be affixed to a product that is being manufactured. The robot arm 201 includes movable members 202, 203, 204 and a support 205. Moving the movable members 202, 203, 204 of the robot arm 201 (by actuation of associated motors) allows physical interaction with the environment to carry out a task, e.g. handling the object 213.

For moving the members, the robot arm 201 may include joint elements 207, 208, 209 connecting the members 202, 203, 204 with each other and with the support 205. A joint element 207, 208, 209 may have one or more joints, each of which may provide rotatable motion (i.e. rotational motion) and/or translatory motion (i.e. displacement) to associated manipulators relative to each other. The movement of the manipulators 202, 203, 204 may be initiated by means of actuators.

The last member 204 (furthest from the support 205) of the members 202, 203, 204 is also referred to as the end-effector 204 and may include one or more tools such as a claw for gripping an object, a welding tool or the like. The other members 202, 203 (closer to the support 205) allow changing the position of the end-effector 204 in three-dimensional space. Thus, the robot arm 201 can function similarly to a human arm (possibly with a tool at its end).

For controlling the robot arm 201 according to the task to be performed, the robot 200 includes a (robot) controller 206 configured to implement the interaction with the environment (by controlling the robot arm's actuators) according to a control program.

An actuator may be understood as a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

The term "controller" may be understood as any type of logic implementing entity, which may include, for example, a circuit and/or a processor capable of executing software stored in a storage medium, firmware, or a combination thereof, and which can issue instructions, e.g. to an actuator in the present example. The controller may be configured, for example, by program code (e.g., software) to control the operation of a system, a robot in the present example.

In the present example, the controller 206 is in communication with a radar processor 210 of the robot 200.

Further, a radar fronted 211 and a radar antenna arrangement 212 are provided, in this example at the robot arm 201, which are coupled to the radar processor 210. The radar frontend 211, the radar antenna arrangement 212 and the radar processor 210 form a radar device.

Similar to the example of FIG. 1, the radar frontend 211 for example includes one or more (radar) transmitters, a duplexer (i.e. a circuit to separate transmitted signals from received signals) and a one or more (radar) receivers. The antenna arrangement 212 may include multiple transmit antennas in form of a transmit antenna array and multiple receive antennas in form of a receive antenna array or one or more antennas used both as transmit and receive antennas.

For the detection of the object 213, the radar processor 210 transmits, using the radar frontend 211 and the antenna arrangement 212, a radio transmit signal 214. The radio transmit signal 214 is reflected by the object 213 resulting in an echo 215.

The antenna arrangement 212 receives the echo 215 and the radar processor 210 calculates information about position, speed and direction of the object 213 with respect to the robot arm 201. The radar processor 210 may then for example supply this calculated information to the robot controller 206 which may control the robot arm 201 accordingly, e.g. to grab the object 213.

Figure 3:
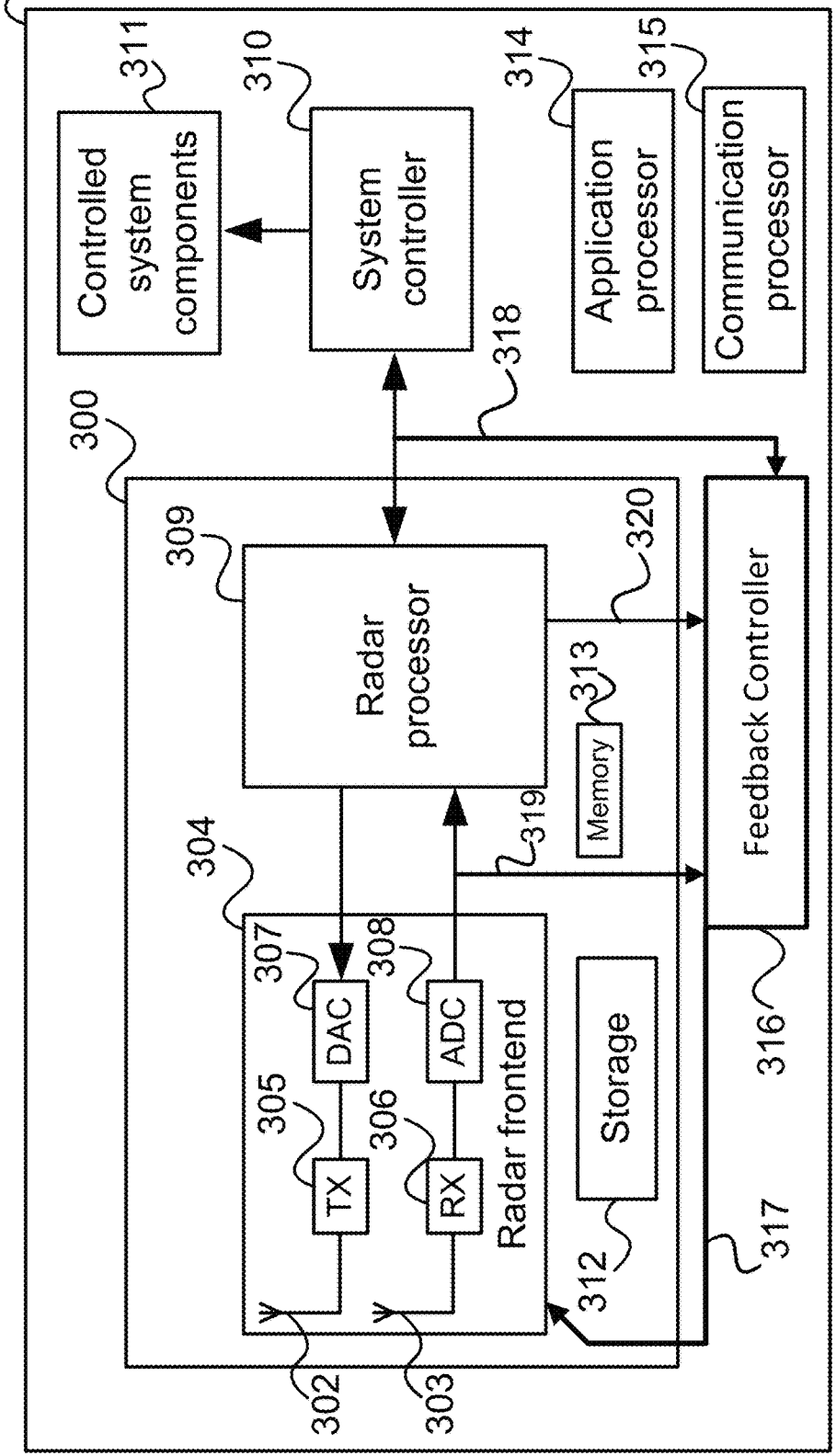
FIG. 3 shows an exemplary radar device.

While FIGS. 1 and 2 illustrate specific application examples of a radar device, a radar device in a more general context is illustrated in FIG. 3.

FIG. 3 shows a radar device 300.

The radar device 300 is part of a system 301, which, as in the examples above, may for example be an autonomous device such as a vehicle or a robot. The radar device 300 includes an antenna arrangement, which in this example includes one or more transmit antennas 302 and one or more receive antennas 303. The radar device 300 further includes a radar frontend 304 and a radar processor 309.

The one or more transmit antennas 302 are coupled with a transmitter (or transmitter arrangement) 305 of the radar frontend 304. The one or more receive antennas 303 are coupled with a receiver (or receiver arrangement) 306 of the radar frontend 304. The transmitter 305 may for example include an oscillator and a power amplifier to generate radio transmit signals. The receiver 306 for example includes one or more mixers and one or more filters for down-converting radio signals received via the one or more receive antennas.

The radar processor 309 supplies digital radar transmit data values to the radar frontend 304. The radar frontend 304 includes a digital-to-analog converter (DAC) 307 which converts the digital radar transmit data values to an analog transmit signal. The transmitter 305 converts the analog transmit signal to a radio transmit signal which it transmits via the one or more transmit antennas 302.

The receiver 306 converts a radio receive signal received via the one or more receive antennas 303 to an analog receive signal. The radar frontend 304 includes an analog-to-digital (ADC) converter 308 which generates digital radar reception data values from the analog receive signal which it supplies to the radar processor 309.

The radar processor detects one or more objects using the digital radar reception data values. This detection may include the determination of information including one or more of range, speed and direction of the one or more objects with respect to the system 301.

The radar processor 309 for example supplies the determined information to a system controller 310 (e.g. a vehicle controller or robot controller) which controls controlled system components 311 of the system 301 (e.g. a motor, a brake, steering etc.), e.g. by means of corresponding actuators.

The radar device 300 may include a storage 312 or a memory 313, e.g. storing digital radar reception data values being processed by the radar processor 309.

The system 301 may for example include an application processor 314 and a communication processor 315 or both which may for example at least partially implement the system controller 310 and perform communication between the system controller 310, the radar device 300 and the controlled system components 311.

In the above examples, the radio transmit signal 105, 214 may include a plurality of pulses. Pulse transmission includes the transmission of short high-power bursts in combination with times during which the radar device listens for echoes 107, 215. This is typically not optimal for a highly dynamic situation like in an automotive scenario. Therefore, a continuous wave (CW) may instead be used as radio transmit signal. However, a continuous wave (with constant frequency) only allows velocity determination, but does not allow range determination (due to the lack of a time mark that could allow distance calculation). To also allow speed as well as range determination, approaches like frequency-modulated continuous wave (FMCW) radar, phase-modulated continuous wave (PMCW) radar or orthogonal frequency division multiplexing (OFDM) radar may be used. In the following, FMCW is explained in more detail as an example.

According to an aspect of the disclosure, the system 301 may include a feedback controller 316, which may be configured to determine a plurality of reconfigurable radio parameters 317, for example, based on output 318 of the radar processor 309. The reconfigurable radio parameters 317 may include a waveform, a modulation, a center frequency, a bandwidth, a polarization, a beamforming directivity, phase and/or amplitude values, e.g., control signals to the radar frontend, for example a radiofrequency lens, antennas, transmitters and receivers, and/or any other additional or alternative parameters. The feedback controller 316 may be configured to determine the reconfigurable radio parameters, for example, based on one or more sensing indicators, such as maximum unambiguous ranger (Rmax), maximum radial velocity (Vmax), angular FOV (HFOV, VFOV), range resolution (Rres), radial velocity resolution (Vres), or Angular resolution (at boresight) (Hres, VerticalRes).

According to various aspects of the disclosure, the feedback controller 316 may be configured to feedback the reconfigurable radio parameters 317 to the radar frontend 304.

According to some aspects of the disclosure, the feedback controller 316 may be configured to determine the plurality of reconfigurable radio parameters 317, for example, based on digital radar samples 319.

According to some aspect of the disclosure, the feedback controller 316 may be configured to determine the plurality of reconfigurable radio parameters 317 based on any other additional or alternative input from one or more additional or alternative elements of the vehicle 100 or robot 200.

According to other aspects of the disclosure, the feedback controller 316 may include an artificial intelligence engine, which may be trainable, for example, according to the radar perception data 318, the digital radar samples 319, and/or intermediate radar processing data 320 from the radar processor 309.

According to some aspects of the disclosure, the radar processor 309 and/or the feedback controller 316 may include, or may be implemented, partially or entirely, by circuitry and/or logic, e.g., one or more processors including circuitry and/or logic, memory circuitry and/or logic. Additionally or alternatively, one or more functionalities of radar processor 309 and/or feedback controller 316 may be implemented by logic, which may be executed by a machine and/or one or more processors, e.g., as described herein.

According to an aspect of the disclosure, the radar processor 309 and/or feedback controller 316 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

According to other aspects of the disclosure, radar processor 309 and/or feedback controller 316 may be implemented by one or more additional or alternative elements of vehicle 100 or robot 200.

According to some aspects of the disclosure, at least part of the functionality of radar processor 309 and/or feedback controller 316 may be implemented as part of system controller 310.

In other embodiments, the functionality of radar processor 309 and/or feedback controller 316 may be implemented as part of any other element of radar 300 vehicle 100, and/or robot 200.

According to some aspects of the disclosure, the feedback controller 316 may be configured to determine the plurality of reconfigurable radio parameters 317, for example, based on a reliability indicator from radar processor 309.

According to some aspects of the disclosure, feedback controller 316 may be configured to determine the plurality of reconfigurable radio parameters 317, for example, based on the digital radar samples 319.

According to some aspects of the disclosure, feedback controller 316 may be configured to adaptively determine the plurality of reconfigurable radio parameters 317 in real time, for example, based on previous radar perception data corresponding to previously processed digital radar samples. For example, feedback controller 316 may be configured to temporarily store the previously processed digital radar samples, and to retrieve the previously processed digital radar samples for processing together with current radar perception data received from radar processor 309, such as in real time.

According to some aspects of the disclosure, the radar 300 may be configured to support a combination of radar processor 309 and feedback controller 316, for example, to provide a reinforcement learning based feedback control engine, which may be, for example, optimized to generate radar perception data 318 with low latency.

According to some aspects of the controller, the reinforcement learning based feedback control engine may include two AI engines, for example, forward and feedback AI engines, e.g., the radar perception processor 309 and feedback controller 316, which may provide learning and cognitive functionalities of radar 300. These functionalities may mitigate interference, may improve signal to interference plus noise ratio, and/or may increase (e.g., optimize) a perception accuracy of radar 300.

According to some aspects of the disclosure, the feedback controller 316 may adaptively change the reconfigurable radio parameters According to some aspects of the disclosure, the feedback controller 316 may adaptively change the reconfigurable radio parameters 317, for example, based on one or more principles and/or conceptions, e.g., as described herein. The feedback controller 316 may be configured to adaptively determine the plurality of reconfigurable radio parameters in real time based on previous radar perception data corresponding to previously processed digital radar samples. For example, and according to some aspects of the disclosure, the feedback controller 316 may be configured to temporarily store the previously processed digital radar samples, and to retrieve the previously processed digital data received from radar processor 309 in real time. According to other aspects of the disclosure, the feedback controller 316 may be configured to adaptively change the reconfigurable radio parameters 317 to affect a transmitted waveform, antenna parameters and/or the like.

Figure 4:
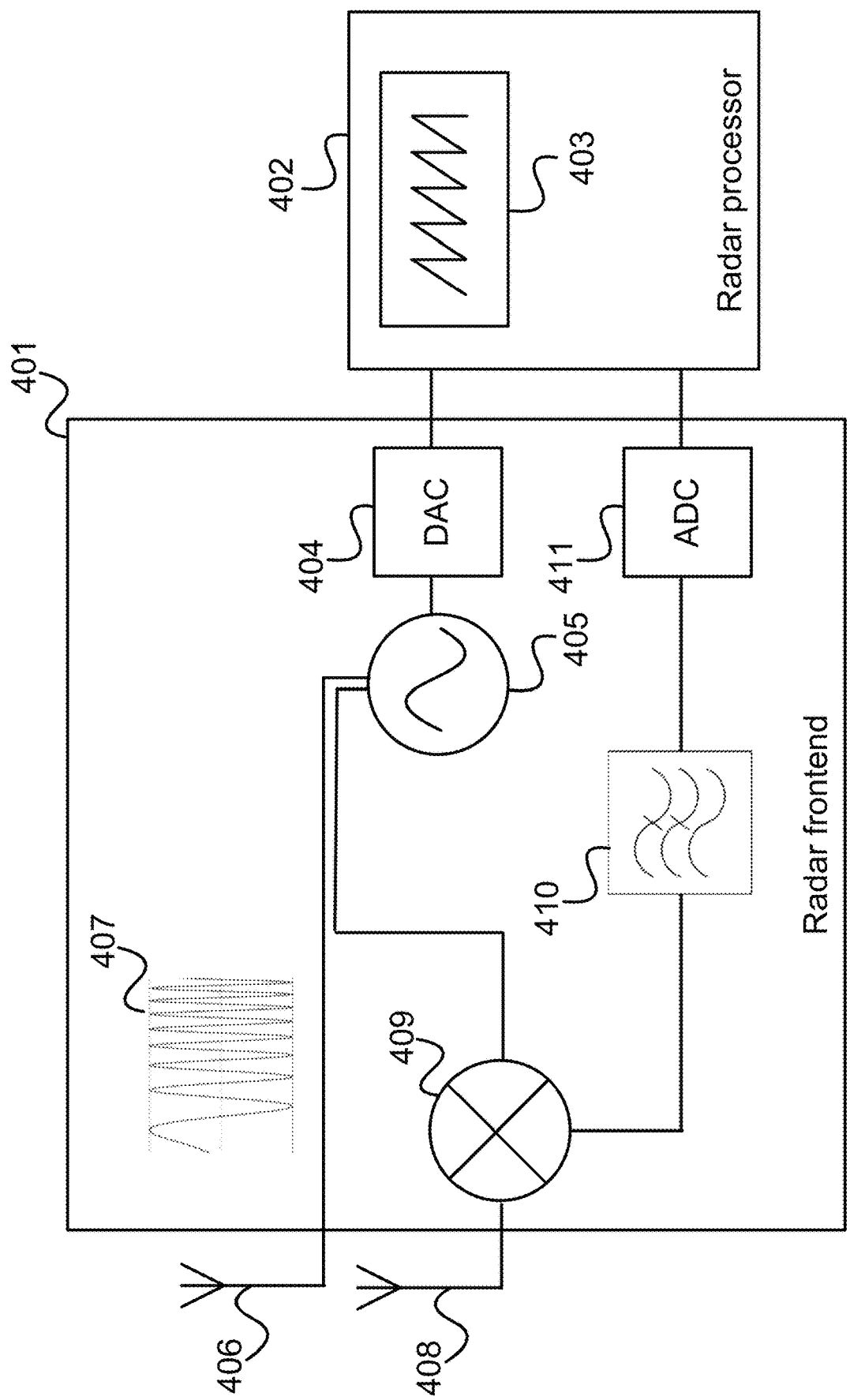
FIG. 4 shows an FMCW (frequency-modulated continuous wave) radar device.

FIG. 4 shows an FMCW radar device 400.

The FMCW radar device 400 includes a radar frontend 401, e.g. corresponding to radar frontend 304, and a radar processor 402, e.g. corresponding to radar processor 309.

According to FMCW radar, rather than sending a radio transmit signal with a constant frequency, the frequency of the transmit signal is periodically ramped up and reset according to a saw tooth (or alternatively a triangle) waveform 403 which, in this example, the radar processor 402 supplies in digital form (i.e. as a sequence of digital values) to the radar frontend 401.

A DAC 404 of the radar frontend 401 converts the saw tooth waveform 403 to analog form and supplies it to a voltage-controlled oscillator 405 such that an output signal of the oscillator 405 is frequency-modulated in accordance with the sawtooth waveform 403.

The output signal of the oscillator 405 is a radio transmit signal which is fed to and sent out by one or more transmit antenna 406.

According to its generation, the radio transmit signal has the form of a sequence of chirps 407, which are result of the modulation of a sinusoid with the saw tooth waveform 403. One single chirp 407 corresponds to the sinusoid of the oscillator signal frequency-modulated by one "tooth" of the saw tooth waveform 403 from the minimum frequency to the maximum frequency.

Regarding reception, one or more receive antennas 408 receive the echo of the radio transmit signal (in addition to noise etc.) as radio receive signal. A mixer 409 of the radar frontend 401 mixes the radio transmit signal with the radio receive signal. The result of the mixing is filtered by a low pass filter 410, converted to digital reception data values by an ADC 411 and supplied to the radar processor 402. It should be noted that the filter 410 may also be a digital filter and the ADC 411 may for this be arranged between the mixer 409 and the filter 410.

The radar processor may determine range, speed (velocity) and direction information of one or more objects from the digital reception data values.

For this, the radar processor 402 performs two FFTs (Fast Fourier Transforms) to extract range information (by a first FFT, also denoted as range FFT) as well as velocity information (by a second FFT, also denoted as Doppler FFT) from the digital reception data values.

Figure 5:
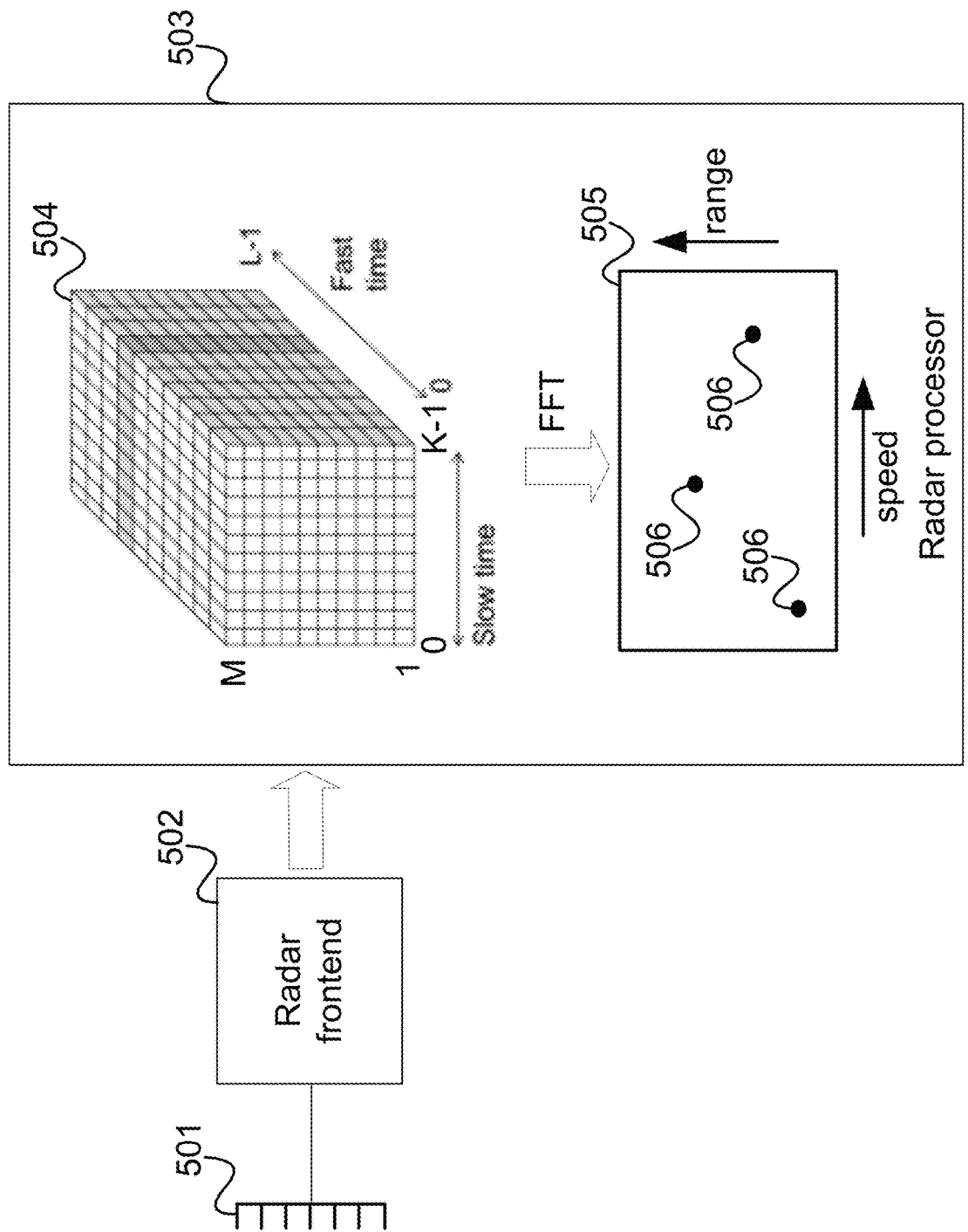
FIG. 5 illustrates the extraction of range and speed estimations from digital reception data values.

FIG. 5 illustrates the extraction of range and speed estimations from digital reception data values.

A receive antenna array 501 receives a radio receive signal (including echoes of a radio transmit signal). The radio receive signal is processed by a radio radar frontend 502 to generate digital reception data values as explained above with reference to FIG. 4. The radio radar frontend 502 supplies the digital reception data values to a radar processor 503. The digital reception data values may be represented in the form of a data cube 504.

The data cube 504 includes digitized samples of the radio receive signal from M antennas, wherein each (horizontal) layer of the data cube 504 includes the samples of a respective antenna. For each chirp, the data cube 504 includes L samples (e.g. L=512), which are arranged in the so-called "fast time"-direction. The data cube 504 includes samples for K chirps, which are arranged in the so-called "slow time"-direction.

The radar processor 503 processes the L samples collected for each chirp and for each antenna by a first FFT. The first FFT is performed for each chirp and each antenna, so that the result of the processing of the data cube 504 by the first FFT has again three dimensions and may have the size of the data cube 504 but longer has values for L sampling times but instead values for L range bins.

The radar processor 503 then processes the result of the processing of the data cube 504 by the first FFT by a second FFT along the chirps (for each antenna and for each range bin).

This means that the direction of the first FFT is "fast time", whereas the direction of the second FFT is "slow time".

The result of the second FFT gives, when aggregated over the antennas, a range/Doppler (R/D) map 505 which has FFT peaks 506 (i.e. peaks of FFT output values (in terms of absolute values) for certain range/speed combinations (i.e. for range/Doppler bins, wherein each range/Doppler bin corresponds to a range bin and a Doppler bin). The radar processor 503 may consider each peak as corresponding to an object (of the range and speed of the peak's range bin and speed bin).

It should be noted that while the above example was given for FMCW radar, the radar processor 503 may also determine a range/Doppler map 505 from digital reception data values of PMCW radar or OFDM radar or other radar technologies.

Using, as a receive antenna arrangement 303, an receive antenna array having a plurality of receive antennas allows the radar processor 309 further to determine the angle of arrival of echoes 105, 215 and thus to determine the direction of a detected object with respect to the system 301.

Figure 6:
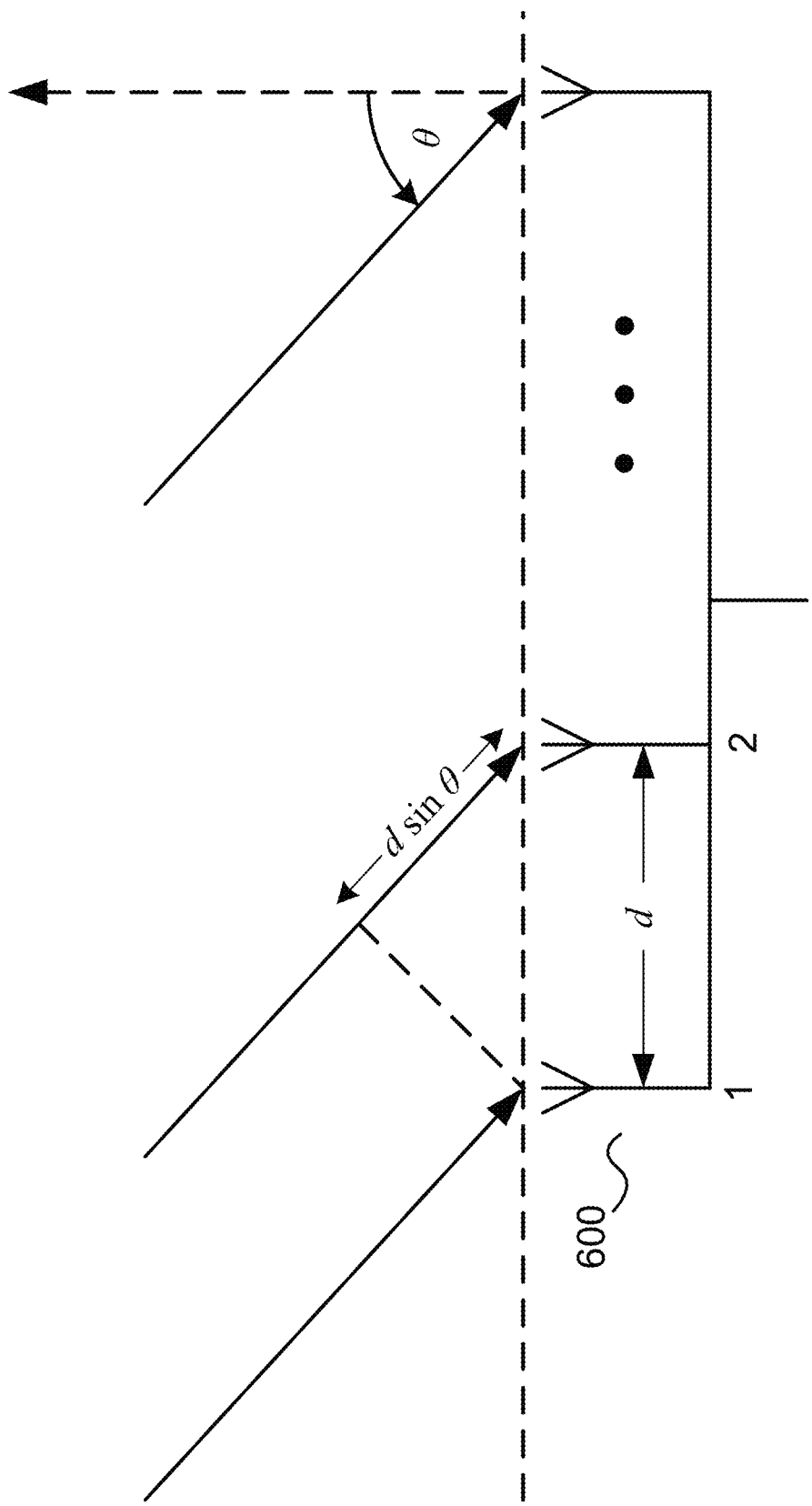
FIG. 6 illustrates the determination of an angle of arrival of an incoming radio signal received by a receive antenna array.

FIG. 6 illustrates the determination of an angle of arrival of an incoming radio signal received by a receive antenna array 600.

The receive antenna array 601 includes M antennas (numbered, from left to right, 1 to M).

In the example of FIG. 6, it is assumed that an echo is coming from an object located at the top left direction. Accordingly, the direction of the echo (i.e. the incoming radio signal) is towards the bottom right. Thus, the further to the left a receive antenna is located, the earlier it will receive a certain phase of the incoming radio signal. More specifically, the phase difference between two antennas of the receive antenna array 601 is $$\Delta \varphi = \frac{2\pi}{\lambda} d \cdot \sin \theta$$

where $\lambda$ is the wavelength of the incoming radio signal, d is the distance between the two antennas and $\theta$ is the angle of arrival of the incoming radio signal (with respect to the radio array's normal direction).

This relation between phase and angle of the incoming radio signal allows the radar processor 309 to determine the angle of arrival of echoes, for example by performing a third FFT (angular FFT) over the antennas.

To increase the spatial resolution (i.e. to have high-resolution radar), multiple transmit antennas, i.e. an antenna array having multiple antennas, may be used, resulting in a MIMO (multiple input multiple output) radar device.

Figure 7:
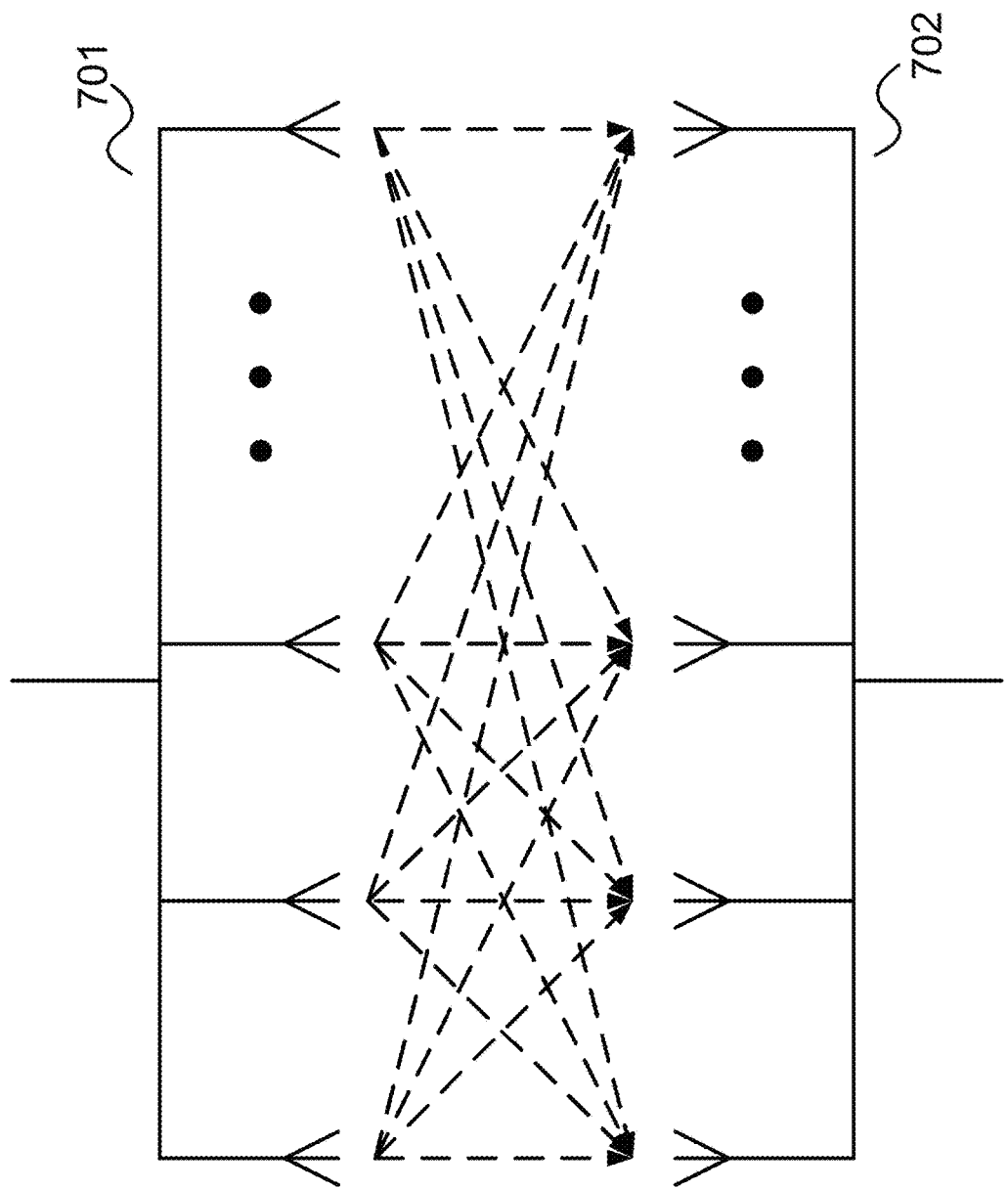
FIG. 7 illustrates a radar MIMO (multiple-input multiple-output) arrangement including a transmit antenna array and a receive antenna array.

FIG. 7 illustrates a radar MIMO arrangement including a transmit antenna array 701 and a receive antenna array 702.

The transmit antenna array 701 for example corresponds to the one or more transmit antennas 302 and the receive antenna array 702 for example corresponds to the one or more receive antennas 303.

Having antenna arrays including multiple antennas both for transmitting the radio transmit signals and receiving echoes results in a plurality of virtual channels as illustrated by the dashed lines, one from each transmit antenna to each receive antenna.

This is achieved by having each transmit antenna send out an individual radio transmit signal (e.g. having a phase associated with the respective transmit antenna). In case of N transmit antennas and M receive antennas the result is a virtual array of size N×M.

Figure 8:
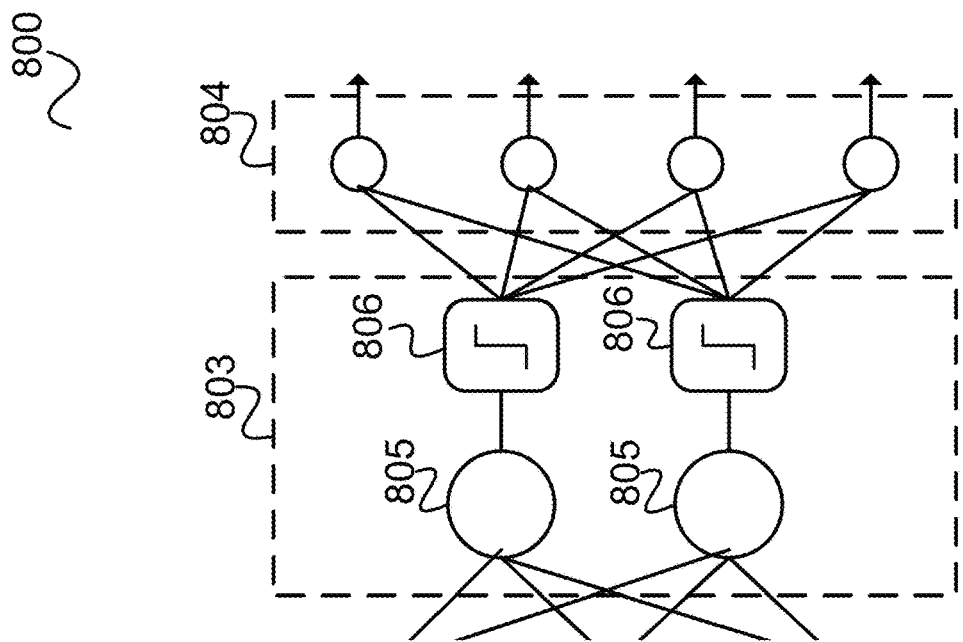
FIG. 8 shows an example of a neural network.
Figure 8:
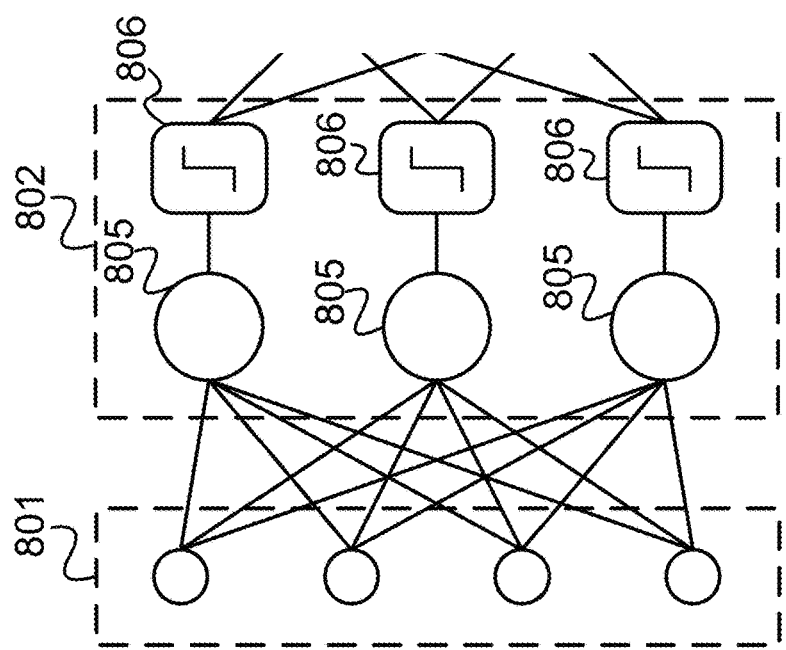

FIG. 8 shows an example of a neural network 800.

The neural network 800 contains an input layer 801, a sequence of hidden layers 802, 803 and an output layer 804.

The neural network 800 is configured to map input data to output data. The input data may for example be digital reception data values provided by a radar frontend, and the output data may include information about objects such as range, speed and direction with respect to a system (e.g. a vehicle or robot) containing the radar frontend.

The input data is supplied to the neural network 800 by the input layer 801 and the neural network 800 provides the output data by the output layer 804.

The input data is for example in the form of a multidimensional array of values, for example a data cube. The input layer 801 supplies the input data to the neurons (perceptrons) 805 of the first layer 802 of the sequence of hidden layers.

In the illustrated example, the layers 802, 803 are fully connected (FC) layers. Each perceptron 805 of a layer multiplies each input value of the data input to the layer by a weight and sums the calculated values. Additionally, a perceptron 805 may add a bias to the sum. Each perceptron 805 is followed by a nonlinear activation function 806, e.g., a ReLU unit ($f(x)=\max(0,x)$) or a sigmoid function ($f(x)=1/(1+\exp(-x))$). The resulting value is then output to the next layer (i.e. is an input value of the data input to the subsequent layer of the sequence of layers).

The neural network 800 may also have other types of layers, in particular convolutional layers and pooling layers which are typical for a convolutional neural network (CNN).

Figure 9:
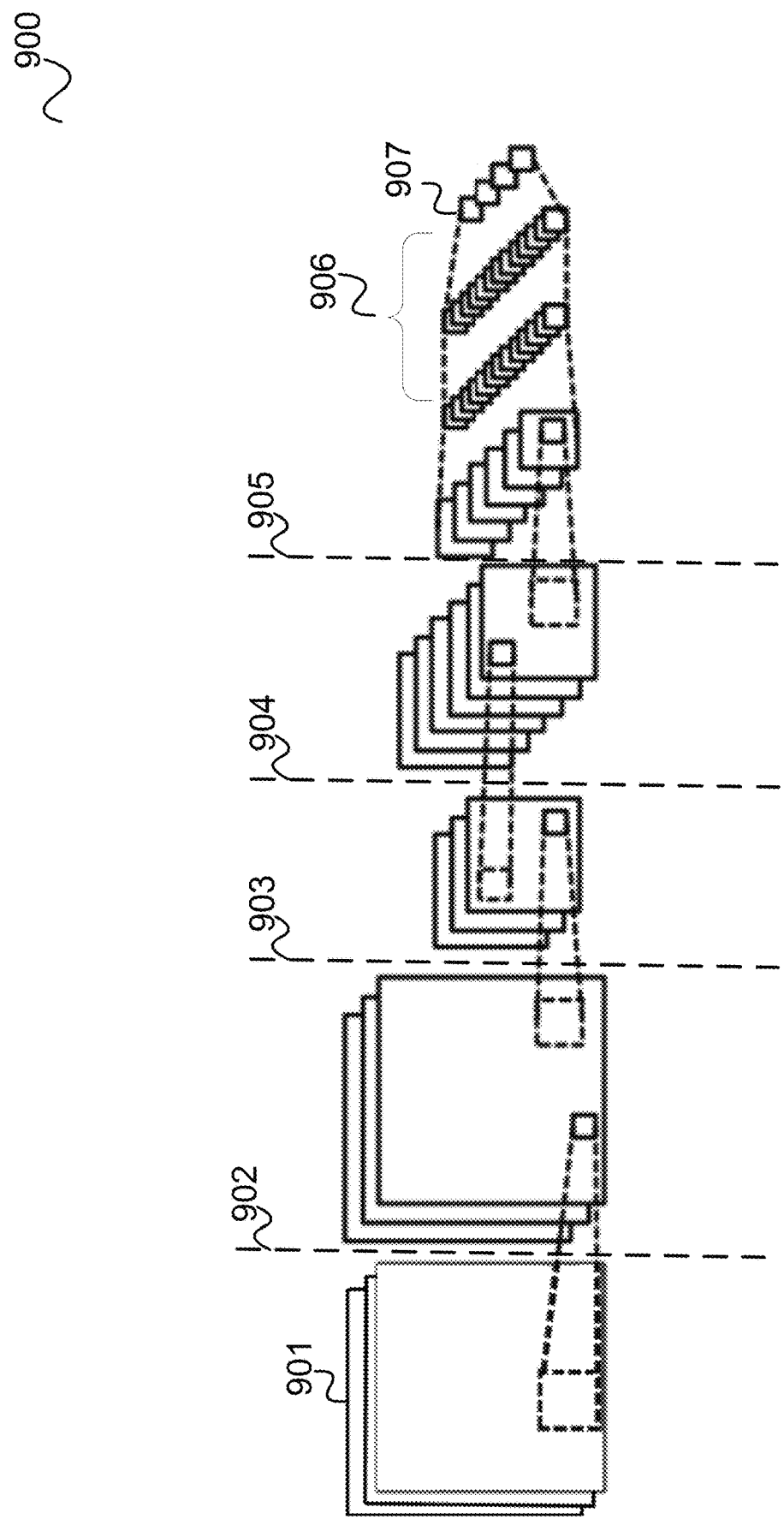
FIG. 9 shows an example of a convolutional neural network.

FIG. 9 shows an example of a convolutional neural network 900.

In the illustration of FIG. 9 only the input data and output data of the various layers of the neural network 900 are indicated as rectangles while the layers are indicated by dashed lines.

In the example of FIG. 9, the input data are three matrices which can also be seen as a three-dimensional array, e.g. forming a data cube.

The input data is processed by a first convolutional layer 902. In a convolutional layer (or convolutional layer) the input data is modified by one or more convolution filters.

Each convolution filter takes a subset of the input data and applies a convolution to it. They can be interpreted to represent possible features in the input data, such as a certain shape. The output of each convolution filter (after being applied to multiple subsets of the input data) can be seen as a feature map.

Typically, a convolution filter is moved over the entire input data (e.g. "pixel-by-pixel" if the input data is viewed as an image). This may be done for each matrix (i.e. 2-dimensional array) of the input data or the convolution filters may be used that is three dimensional to process multiple data cube layers (i.e. multiple 2-dimensional layers of the input data of the respective convolutional array) together.

Figure 10:
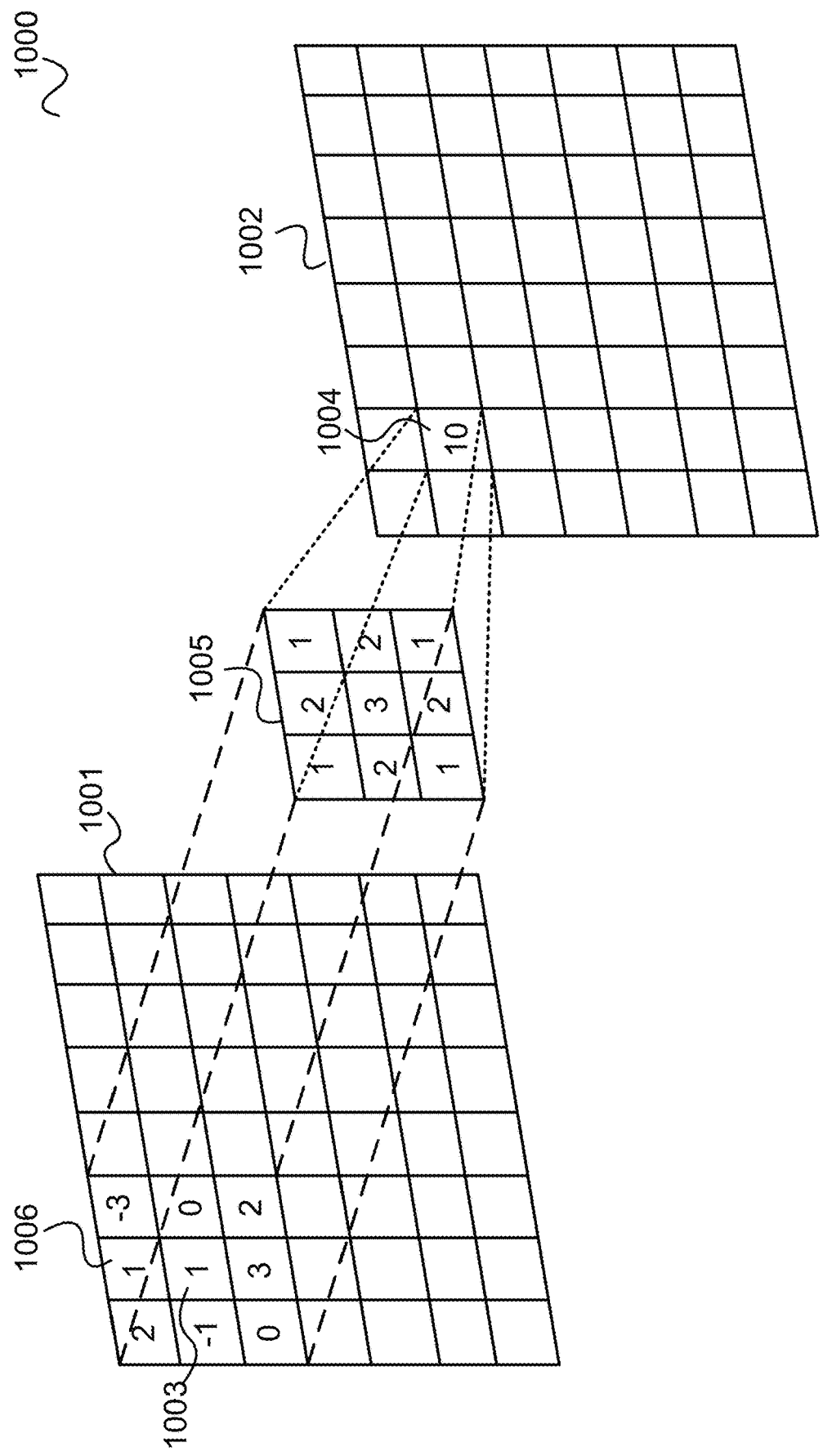
FIG. 10 illustrates the application of a convolution filter to two-dimensional input data.

FIG. 10 illustrates the application of a convolution filter to two-dimensional input data 1001.

The input data 1001 of the filter is shown as a two-dimensional matrix. Similarly, the output data 1002 of the filter is shown as a two-dimensional matrix. In the case of multiple layers, several such matrices can be "superimposed" (and form a tensor), but for simplicity only one layer is considered.

The output value 1004 for an input value 1003 is obtained by applying a filter matrix 1005 to the input value 1003 and its surrounding values 1006 (represented in FIG. 10 by the components of the matrix except the input value 1003, for which exemplary entries are shown). The size of the surrounding area from which the surrounding values 1006 are taken is given by the filter matrix 1005. The surrounding values 1006 together with the input value 1003 form a submatrix of the input data, which has the same size as the filter matrix 1005. The filter matrix 1005 is applied to the input value 1005 and its surrounding values 1006 by forming the inner product of the filter matrix 1005 with the submatrix (both matrices are regarded as vectors). The result of the inner product is the output value 1004. For the exemplary values shown in FIG. 10, the following is obtained $$1*2+2*1+1*(-3)+2*(-1)+3*1+2*0+1*0+2*3+1*2=10$$

For a matrix as input data, each entry of the filter matrix can thus be understood as a weighting value for a component value in the sub-matrix of the input data.

In the example of FIG. 10, the filter matrix 1005 is a 3×3 matrix, but it can also have a different size. The total output values of the output data of the convolutional filter are generated by shifting the filter matrix over the input data 1001 so that the output data 1002 in the end corresponds to the convolution of the input data 1001 with the convolutional filters filter matrix 1005.

It should be noted that when the filter matrix 1005 is moved to an edge of the input data (i.e. the current the input value 1003 is at the edge of the input data matrix), there are not values in the input data for all values of the filter matrix 1005. One way of handling the edges is to move the filter matrix only as long as the input data has a value for the whole filter matrix (i.e. do not move it completely to the edge of the input data matrix). However, this can reduce the output dimension (i.e. the matrix dimension of the output data 1002) compared to the matrix dimension of the input data 1001.

In order to avoid reducing the output dimension with respect to the input dimension, a padding of the input data may be performed. For example, the edges of the input data 1001 are padded with zeros (zero padding). For example, an input data matrix 1001 is padded with zeros on all four sides so that the output of a 3×3 filter (which is moved over the padded matrix) has the same dimension as the original input matrix. It can also be padded so that the dimension of the output is larger than the dimension of the input.

In a convolutional layer 902, the convolution filters are typically followed by a nonlinear activation function, e.g. a ReLU.

Following processing by the nonlinear activation function, the data is then passed to a pooling layer 903. In the pooling layer 903, a filter is also moved over the input data, and this filter usually outputs the maximum or average of several input values. In the representation of FIG. 10, the values of the submatrix (with the input value 1003 in the middle) are averaged, or their maximum is taken in order to generate the output value 1004. Typically, a pooling filter has a step size greater than one, for example, a step size of two or three. For example, a 2×2 filter with a step size of two is moved over an input data matrix, which returns the maximum of four input values each. In other words, the pooling layer combines several input values, that is, aggregates them, which is why it is also called aggregation layer. The operation of the pooling layer can also be seen as sub-sampling, which is why it can also be called sub-sampling layer.

In other words, a pooling layer can be seen as a form of nonlinear down-sampling in which the amount of data is reduced by combining the outputs of multiple nodes into a single node in the next layer, for example, by including the maximum value of the outputs.

In the pooling layer 903, there is typically no activation function, so pooling can also be considered a part of the preceding convolutional layer (or any other layer) (typically, each layer of a neural network has an activation function).

In the example of FIG. 9, the pooling layer 903 is followed by a second convolutional layer 904, which in turn is followed by a second pooling layer 905. It should be noted that a convolutional layer can also be directly followed by another convolutional layer (without pooling), and that many more convolution and/or pooling layers can be part of a convolutional neural network. In the present example, the second pooling layer 905 is followed by two fully connected layers 906, wherein the output tensor of the second pooling layer 905 is flattened to a (one-dimensional) vector before feeding it to the first one of the fully connected layers 906.

An output layer receives the data from the second fully connected layer 906 and outputs output data 907.

In some aspects, multiple input multiple output (MIMO) radar devices such as radar device in FIG. 3 may implement a virtual antenna array. The virtual antenna array may include an aperture size that is larger than that of physical antenna arrays. In addition, in some aspects, the MIMO radar devices may include fewer transmitters, receivers, or some combination thereof than an active electrically scanning array (AESA) radar device. The MIMO radar devices may also provide cost benefits due to the reduced number of transmitters, receivers, or some combination thereof compared to an AESA radar device. Further, a footprint of the MIMO radar devices may be reduced compared to AESA radar devices or other radar devices. The reduced footprint of the MIMO radar devices may improve implementation of the MIMO radar devices in vehicle environments (e.g., automotive driver assistance applications) compared to AESA radar devices.

In some aspects, the MIMO radar devices may perform beamforming within digital portions of the MIMO radar devices. Therefore, a size of data storage (e.g., memory) and a processing complexity within the MIMO radar devices may increase at a rate scaled with a number of digital receivers within the MIMO radar devices. As an ability of the MIMO radar devices to detect objects increases (e.g., an angular resolution of the MIMO radar devices increases) or for imaging implementations of the MIMO radar devices, the size of the data storage and the processing complexity within the MIMO radar devices may become unwieldy and difficult to implement. In addition, the MIMO radar devices may be susceptible to receiving the same signal via multiple paths (e.g., multipath) interference due to ambiguities in a transmit (Tx) portion, a receive (Rx) portion, or some combination thereof.

Some aspects described in the present disclosure may include a MIMO radar device that reduces the size of data storage, the processing complexity, or some combination thereof compared to other MIMO radar devices. The MIMO radar device, according to some aspects described in the present disclosure, may reduce the size of the data storage, the processing complexity, or some combination thereof while maintaining the increased aperture size compared to physical antenna arrays.

In some aspects, the MIMO radar device may include a P number of transmitter chains and a Q number of receiver chains. In addition, each transmitter chain and each receiver chain may be electrically coupled to a different N×M subarray. The N×M subarrays may form up to N×M beams (e.g., sectors). Further, each N×M subarray may include two beamforming stages. A first beamforming stage may include an M×M switched analog beamforming network (BFN) and may form a corresponding beam in a first angular dimension. A second beamforming stage may include an N×N switched analog BFN and may form the corresponding beam in a second angular dimension.

The MIMO radar device may include a DAC stage configured to generate analog Tx signals. The DAC stage may generate a different analog Tx signal for each transmitter chain. The DAC stage may generate each of the analog Tx signals representative of a single digital Tx signal. Each transmitter chain in the MIMO radar device may include a Tx chain portion and a switched analog Tx BFN. Each Tx chain portion may generate intermediate analog Tx signals representative of the corresponding analog Tx signal. In addition, each switched analog Tx BFN may generate multiple analog Tx signals for one or more of the intermediate analog Tx signals. Further, each switched analog Tx BFN may form a beam of the corresponding analog Tx signals in accordance with a state of the switched analog Tx BFN.

Each receiver chain in the MIMO radar device may include a switched analog Rx BFN and a Rx chain portion. In some aspects, the switched analog Rx BFN may generate intermediate analog Rx signals based on Rx signals. Each switched analog Rx BFN may form a beam of the corresponding analog Rx signals in accordance with a state of the switched analog Rx BFN. Each of the Rx chain portions may generate a single Rx analog signal representative of the intermediate analog Rx signals. The MIMO radar device may also include an ADC stage. In some aspects, the ADC stage may generate multiple digital Rx signals based on the Rx analog signals generated by the Rx chain portions. The ADC stage may generate each of the digital RC signals representative of the corresponding analog Rx signal. The ADC stage may generate a different digital Rx signal for each receiver chain in the MIMO radar device.

In some aspects, a number of digital chains within the MIMO radar device described in the present disclosure may be reduced by a factor of N×M compared to other MIMO radar devices. In addition, in some aspects, the size of the data storage, the processing complexity, or some combination thereof of the MIMO radar device described in the present disclosure may be reduced by a factor of (1+QM)/(1+Q) compared to other MIMO radar devices. In some aspects, Q may represent a number of receiver chains within the MIMO radar device and M may represent a number of inputs and outputs of the switched analog M×M BFN. Further, a circuit footprint of the MIMO radar device described in the present disclosure may be smaller compared analog radar devices while maintaining the same or similar angular resolution as analog radar devices. In some aspects, the N×M subarray within the MIMO radar device may operate as a pre-select filter to reduce or eliminate multipath interference rather than the MIMO radar device including dedicated multipath suppression circuits further reducing the processing complexity of the MIMO radar device.

Accordingly, one or more aspect described in the present disclosure may permit the MIMO radar device to increase the aperture size of the virtual antenna array while reducing the size of the data storage, the processing complexity, or some combination thereof. Various differences, advantages, and benefits of the MIMO radar device described in the present disclosure are listed in Table I.

TABLE I

| Parameters | Analog array | Digital array | MIMO array | Beam switching hybrid MIMO array |
|---|---|---|---|---|
| # physical antenna | $(P \times Q) \times (N \times M)$ | $(P \times Q) \times (N \times M)$ | $(P + Q) \times (N + M)$ | $(P + Q) \times (N \times M)$ |
| # of digital Tx chains | 1 | $(P \times Q) \times (N \times M)$ | $(P \times N)$ | P |
| # of digital Rx chains | 1 | $(P \times Q) \times (N \times M)$ | $(Q \times M)$ | Q |
| Physical array size[1] ($\propto$) | $(P \times Q) \times (N \times M)$ | $(P \times Q) \times (N \times M)$ | $\geq \frac{(P \times Q) \times (N \times M)}{2}$ | $\geq \frac{(P \times Q) \times (N \times M)}{2}$ |
| Angular resolution ($\propto$) | $\frac{1}{P \times N} \times \frac{1}{Q \times M}$ | $\frac{1}{P \times N} \times \frac{1}{Q \times M}$ | $\frac{1}{P \times N} \times \frac{1}{Q \times M}$ | $\frac{1}{P \times N} \times \frac{1}{Q \times M}$ |
| # analog beams (sectors) per subarray | — | — | — | (NM) |
| # digital beams Per sector | — | — | — | K |
| # Tx beams per digital Rx chain | $K \times (NM)$ | $K \times (NM)$ | $K \times (NM)$ | $K \times (NM)$ |
| # Tx beams total | $K \times (NM)$ | $K \times (NM) \times [(PQ) \times (NM)]$ | $K \times (NM) \times (QM)$ | $K \times (NM) \times Q$ |
| # Rx beams | $K \times (NM)$ | $K \times (NM)$ | $K \times (NM)$ | $K \times (NM)$ |
| # beams total | $2K \times (NM)$ | $K \times (NM) \times [1 + (PQ) \times (NM)]$ | $K \times (NM) \times [1 + (QM)]$ | $K \times (NM) \times [1 + (Q)]$ |
| Memory and processing complexity (compared to analog array) | 1 | $\frac{1 + (PQ) \times (NM)}{2}$ | $\frac{1 + (QM)}{2}$ | $\frac{1 + (Q)}{2}$ |
| Tx array ambiguity | Full-not ambiguous | Full-not ambiguous | Thin-Ambiguous Full-Not Ambiguous | Partially full/thin |
| Rx array ambiguity | Full-not ambiguous | Full-not ambiguous | Thin-Ambiguous Full-Not Ambiguous | Partially full/thin |
| Immunity to multipath | ++ | ++ | — | +[2] |

[1] For large size arrays, a MIMO array physical size with full Tx and thin Rx (or thin Rx and full Tx) converges to about half the size of its virtual array.
[2] Subarray beamformers acts as a pre-select filter for incoming multipath rays and helps reduce processing complexity to suppress multipath ghost targets compared to a MIMO array.

Accordingly, at least one aspect described in the present disclosure may reduce power consumption compared to other MIMO radar devices by reducing the number of digital chains within the MIMO radar device. In addition, at least one aspect described in the present disclosure may reduce the memory and processing complexity within the MIMO radar device compared to other MIMO radar devices. Further, at least one aspect described in the present disclosure may reduce the circuit footprint of the MIMO radar device compared to analog MIMO radar devices.

Figure 11:
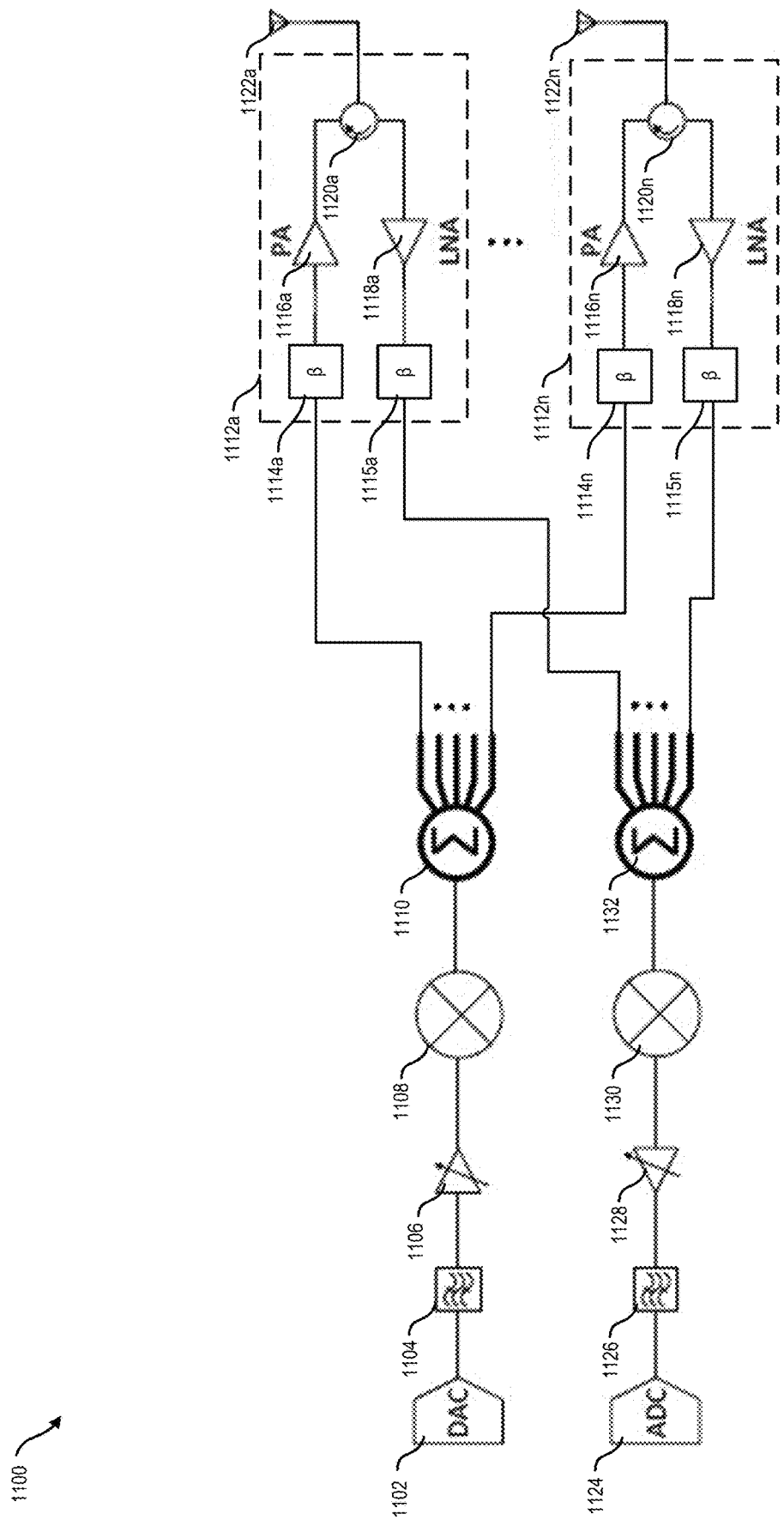
FIG. 11 illustrates an example analog radar device.

FIG. 11 illustrates an example analog radar device 1100, in accordance with at least one aspect described in the present disclosure. The analog radar device 1100 may correspond to at least a portion of the radar frontends 103, 211, and 304, described above in relation to FIGS. 1, 2, and 3. The analog radar device 1100 may include multiple T/R modules 1112a-n (referenced collectively in the present disclosure as "T/R modules 1112").

The analog radar device 1100 may include a DAC 1102 electrically coupled to a Tx filter 1104. In addition, the analog radar device 1100 may include a Tx variable gain amplifier (VGA) 1106 electrically coupled between the Tx filter 1104 and a Tx mixer 1108. Further, the analog radar device 1100 may include a splitter 1110 electrically coupled between the Tx mixer 1108 and one or more of the T/R modules 1112.

The analog radar device 1100 may include a combiner 1132 electrically coupled to the T/R modules 1112. In addition, the analog radar device 1100 may include a Rx mixer 1130 electrically coupled between the combiner 1132 and a Rx VGA 1128. Further, the analog radar device 1100 may include a Rx filter 1126 electrically coupled between the Rx VGA 1128 and an ADC 1124.

The analog radar device 1100 may include multiple antennas 1122a-n electrically coupled to the T/R modules 1112. In some aspects, each of the antennas 1122 may be electrically coupled to a different T/R module of the T/R modules 1122.

The T/R modules 1112 may include Tx phase shifters 1114a-n, Rx phase shifters 1115a-n, power amplifiers (PAs) 1116a-n, low noise amplifiers (LNAs) 1118a-n, and circulators 1120a-n. Each of the Tx phase shifters 1114a-n may be electrically coupled between the splitter 1110 and a different PA of the PAs 1116a-n. For example, a first Tx phase shifter 1114a of a first T/R module 1112a may be electrically coupled between the splitter 1110 and a first PA 1116a. Each of the PAs 1116a-n may be electrically coupled to a different circulator of the circulators 1120a-n. For example, the first PA 1116a may be electrically coupled to a first circulator 1120a.

Each of the LNAs 1118a-n may be electrically coupled between a different circulator of the circulators 1120a-n and a different Rx phase shifter of the Rx phase shifters 1115a-n. For example, a first LNA 1118a of the first T/R module 1112a may be electrically coupled between the first circulator 1120a and a first Rx phase shifter 1115a. Each of the Rx phase shifters 1115a-n may be electrically coupled to the combiner 1132. In addition, each of the circulators 1120a-n may be electrically coupled to a different antenna of the antennas 1122a-n. For example, the first circulator 1120a may be electrically coupled to a first antenna 1122a.

The DAC 1102 may receive a digital Tx signal to be transmitted. The DAC 1102 may generate an analog Tx signal representative of the digital Tx signal. The Tx filter 1104 may receive the analog Tx signal and may prevent portions of the analog Tx signal from propagating the Tx filter 1104. The Tx filter 1104 may provide a filtered Tx signal based on the analog Tx signal. The Tx VGA 1106 may amplify a power level of the filtered Tx signal to generate an amplified Tx signal. The Tx mixer 1108 may mix the amplified Tx signal to generate a mixed Tx signal at a different frequency than the amplified Tx signal.

The splitter 1110 may receive the mixed Tx signal and may provide multiple split Tx signals based on the mixed Tx signal. In some aspects, each of the split Tx signals may be the same or similar to the mixed Tx signal (e.g., the split Tx signals may include copies of the mixed Tx signal). As indicated by the ellipsis, the splitter 1110 may include any appropriate number of outputs and may generate any appropriate number of split Tx signals. The number of split Tx signals generated by the splitter 1110 may correspond to the number of T/R modules 1112 within the analog radar device 1100.

The Tx phase shifters 1114a-n may receive the split TX signals. Each of the Tx phase shifters 1114a-n may generate a phase shifted Tx signal by adjusting a phase of a corresponding split Tx signal. The Tx phase shifters 1114a-n may provide the corresponding phase shifted Tx signals to the corresponding PAs 1116a-n with the phases being different than the phase of the corresponding split Tx signals. Each of the PAs 1116a-n may generate an amplified Tx signal by amplifying a power level (e.g., an amplitude) of the corresponding phase shifted Tx signal. Each of the circulators 1120a-n may route and provide the corresponding amplified Tx signal to the corresponding antenna of the antennas 1122a-n. The antennas 1122a-n may transmit the corresponding amplified Tx signal as transmit signals.

The antennas 1122a-n may receive multiple Rx signals. The antennas 1122a-n may provide the Rx signals to the corresponding circulator of the circulators 1120a-n. The circulators 1120a-n may route and provide the corresponding Rx signals to the corresponding LNAs 1118a-n. The LNAs 1118a-n may generate an amplified Rx signal by amplifying a power level of the corresponding Rx signal. The Rx phase shifters 1115a-n may generate phase shifted Rx signals by adjusting a phase of the corresponding amplified RX signals. The Rx phase shifters 1115a-n may provide the phase shifted Rx signals to the combiner 1132 with the phase of each of the phase shifted Rx signals being different than the phase of the corresponding amplified RX signals.

The combiner 1132 may generate a combined Rx signal by combining each of the phase shifted Rx signals. The Rx mixer 1130 may mix the combined Rx signal to generate a mixed Rx signal at a different frequency than the combined Rx signal. The Rx VGA 1128 may amplify a power level of the mixed Rx signal to generate an amplified Rx signal. The Rx filter 1126 may receive the amplified Rx signal and may prevent portions of the amplified Rx signal from propagating the Rx filter 1126. The Rx filter 1126 may provide a filtered Rx signal based on the amplified Rx signal. The ADC 1124 may receive the filtered Rx signal and generate a digital Rx signal representative of the filtered Rx signal.

In some aspects, the analog radar device 1100 may perform beamforming of the transmit signals within the T/R modules 1112. In these and other aspects, the analog radar device 1100 combining signals in an analog domain (e.g., combining the phase shifted Rx signals into the combined signal) as analog signals may reduce processor power of the analog radar device 1100.

Figure 12:
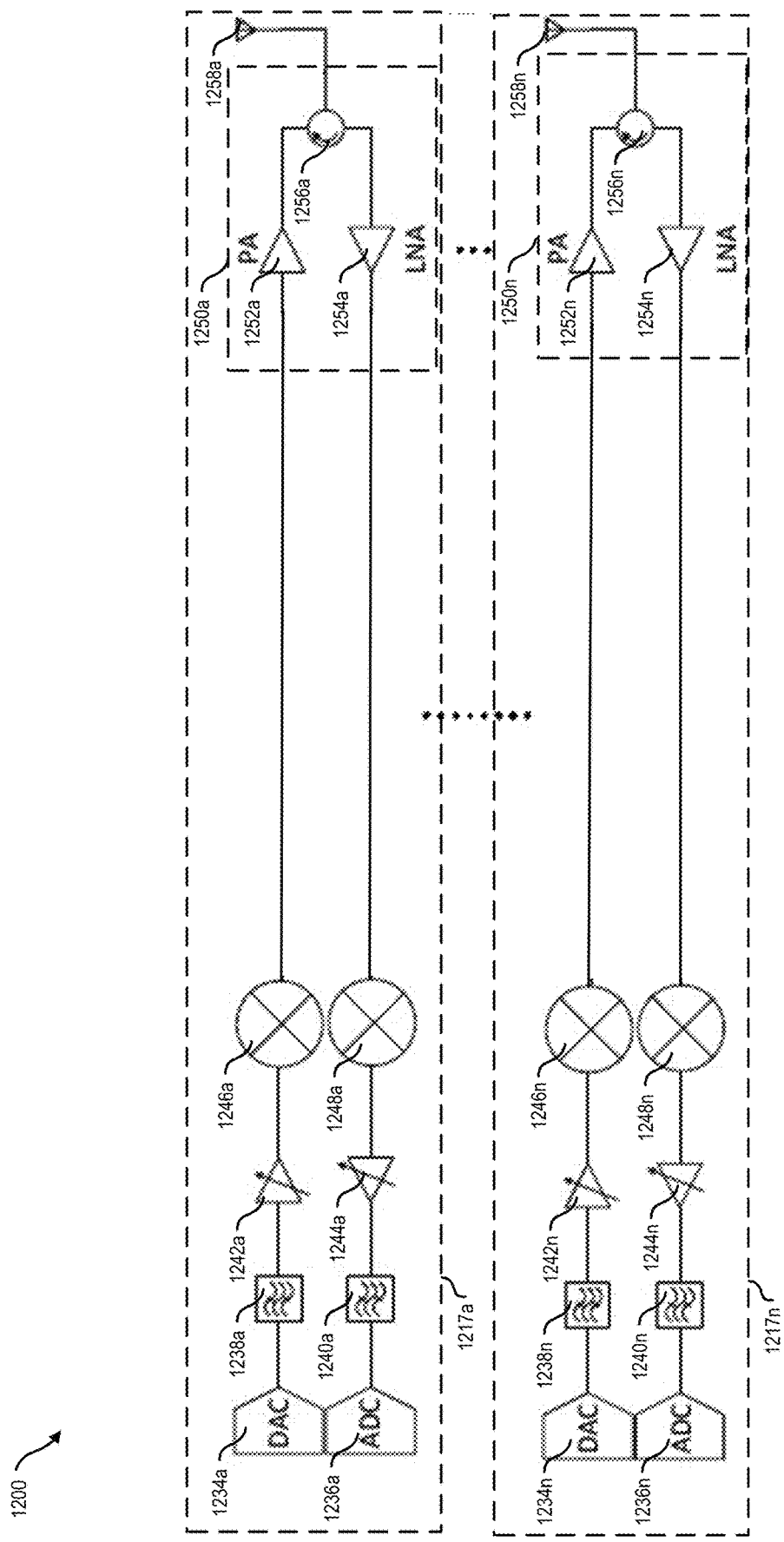
FIG. 12 illustrates an example digital radar device.

FIG. 12 illustrates an example digital radar device 1200, in accordance with at least one aspect described in the present disclosure. The digital radar device 1200 may correspond to at least a portion of the radar frontends 103, 211, and 304, described above in relation to FIGS. 1, 2, and 3. The digital radar device 1200 may include multiple T/R modules 1250a-n (referenced collectively in the present disclosure as "T/R modules 1250").

The digital radar device 1200 may include multiple DACs 1234*a-n*, multiple Tx filters 1238*a*, multiple Tx VGAs 1242*a-n*, and multiple Tx mixers 1246*a-n*. Each of the Tx filters 1238*a-n* may be electrically coupled between a different DAC of the DACs 1234*a-n* and a different Tx VGA of the Tx VGAs 1242*a-n*. For example, a first Tx filters 1238*a* may be electrically coupled between a first DAC 1234*a* and a first Tx VGA 1242*a*. Each of the Tx mixers 1246*a-n* may be electrically coupled between a different Tx VGA of the Tx VGAs 1242*a-n* and a different T/R module of the T/R modules 1250. For example, a first Tx mixer 1246*a* may be electrically coupled between the first Tx VGA 1242*a* and a first T/R module 1250*a*.

The digital radar device 1200 may include multiple Rx mixers 1248*a-n*, multiple Rx VGAs 1244*a-n*, multiple Rx filters 1240*a-n*, and multiple ADCs 1236*a-n*. Each of the Rx mixers 1248*a-n* may be electrically coupled between a different T/R module of the T/R modules 1250 and a different Rx VGA of the Rx VGAs 1244*a-n*. For example, a first Rx mixer 1248*a* may be electrically coupled between the first T/R module 1250*a* and a first Rx VGA 1244*a*. Each of the Rx filters 1240*a-n* may be electrically coupled between a different Rx VGA of the Rx VGAs 1244*a-n* and a different ADC of the ADCs 1236*a-n*. For example, a first Rx filter 1240*a* may be electrically coupled between the first Rx VGA 1244*a* and a first ADC 1236*a*.

The digital radar device 1200 may include multiple antennas 1258*a-n* electrically coupled to the T/R modules 1250. Each of the antennas 1258*a-n* may be electrically coupled to a different T/R module of the T/R modules 1250.

The T/R modules 1250 may include PAs 1252*a*, LNAs 1254*a-n*, and circulators 1256*a*. Each of the PAs 1252*a* may be electrically coupled between a different Tx mixer of the Tx mixers 1242*a-n* and a different circulator of the circulators 1256*a-n*. For example, a first PA 1252*a* may be electrically coupled between the first Tx mixer 1246*a* and a first circulator 1256*a*. Each of the LNAs 1254*a-n* may be electrically coupled between a different Rx mixer of the Rx mixers 1248*a-n* and a different circulator of the circulators 1256*a-n*. For example, a first LNA 1254*a* may be electrically coupled between the first circulator 1256*a* and the first Rx mixer 1248*a*. Each of the circulators 1256*a-n* may be electrically coupled to a different antenna of the antennas 1258*a-n*. For example, the first circulator 1256*a* may be electrically coupled to a first antenna 1258*a*.

The digital radar device 1200 may include multiple communication chains 1217*a-n*. As indicated by the ellipsis, the digital radar device 1200 may include any appropriate number of communication chains 1217*a-n*. Each of the communication chains 1217*a-n* may include a Tx portion and a Rx portion.

Operation of a first communication chain 1217*a* is now discussed. Each of the communication chains 1217*a-n* may operate accordingly. The first DAC 1234*a* may receive a digital Tx signal to be transmitted. The first DAC 1234*a* may generate an analog Tx signal representative of the digital Tx signal. The first Tx filter 1238*a* may receive the analog Tx signal and may prevent portions of the analog Tx signal from propagating the first Tx filter 1238*a*. The first Tx filter 1238*a* may provide a filtered Tx signal based on the analog Tx signal. The first Tx VGA 1242*a* may amplify a power level of the filtered Tx signal to generate an amplified Tx signal. The first Tx mixer 1246*a* may mix the amplified Tx signal to generate a mixed Tx signal at a different frequency than the amplified Tx signal.

The first PA 1252*a* may generate an amplified mixed Tx signal by amplifying a power level (e.g., an amplitude) of the mixed Tx signal. The first circulator 1256*a* may route and provide the amplified mixed Tx signal to the first antenna 1258*a*. The first antenna 1258*a* may transmit the corresponding amplified mixed Tx signal as a transmit signal.

The first antenna 1258*a* may receive a Rx signal and provide the Rx signal to the first circulator 1256*a*. The first circulator 1256*a* may route and provide the Rx signal to the first LNA 1254*a*. The first LNA 1254*a* may generate an amplified Rx signal by amplifying a power level of the corresponding Rx signal. The first Rx mixer 1248*a* may mix the amplified Rx signal to generate a mixed Rx signal at a different frequency than the amplified Rx signal. The first Rx VGA 1244*a* may amplify a power level of the mixed Rx signal to generate an amplified mixed Rx signal. The first Rx filter 1240*a* may receive the amplified mixed Rx signal and may prevent portions of the amplified mixed Rx signal from propagating the first Rx filter 1240*a*. The first Rx filter 1240*a* may provide a filtered Rx signal based on the amplified mixed Rx signal to the first ADC 1236*a*. The first ADC 1236*a* may generate a digital Rx signal representative of the filtered Rx signal.

In some aspects the T/R modules 1250 may be digitized and may cause the digital radar array 1200 to operate as a digital beamforming array radar. Each of the T/R modules 1250 including digital components may increase the size of the data storage and the processing complexity of the digital radar device 1200 compared to the analog radar device 1100.

Figure 13:
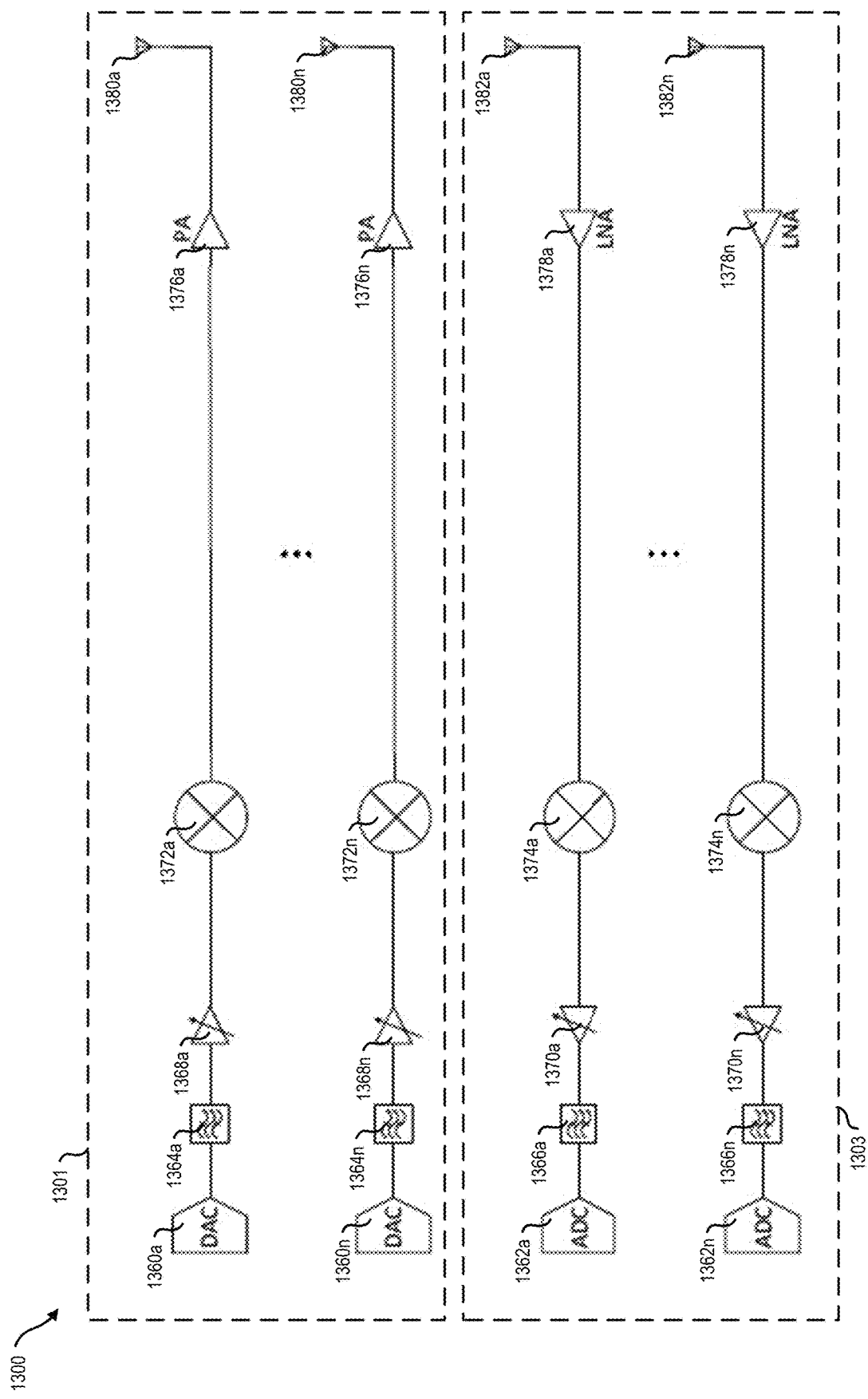
FIG. 13 illustrates an example MIMO radar device.

FIG. 13 illustrates an example MIMO radar device 1300, in accordance with at least one aspect described in the present disclosure. The MIMO radar device may correspond to at least a portion of the radar frontends 103, 211, and 304, described above in relation to FIGS. 1, 2, and 3. The MIMO radar device 1300 may include a Tx portion 1301 and a Rx portion 1303.

The Tx portion 1301 may include DACs 1360*a-n*, Tx filters 1364*a-n*, Tx VGAs 1368*a-n*, Tx mixers 1372*a-n*, PAs 1376*a-n*, and Tx antennas 1380*a-n*. Each of the Tx filters 1364*a-n* may be electrically coupled between a different DAC of the DACs 1360*a-n* and a different TX VGA of the Tx VGAs 1368*a-n*. In addition, Each of the Tx mixers 1372*a-n* may be electrically coupled between a different Tx VGA of the Tx VGAs 1368*a-n* and a different PA of the PAs 1376*a-n*. Further, each of the Tx antennas 1380*a-n* may be electrically coupled to a different PA of the PAs 1376*a-n*.

The Tx portion 1301 may include transmitter chains that each include a single DAC of the DACs 1360*a-n*, a single Tx filter of the Tx filters 1364*a-n*, a single Tx VGA of the Tx VGAs 1368*a-n*, a single Tx mixer of the Tx mixers 1372*a-n*, a single PA of the PAs 1376*a-n*, and a single Tx antenna of the Tx antennas 1380*a-n*. For example, a first transmitter chain may include a first DAC 1360*a*, a first Tx filter 1364*a*, a first Tx VGA 1368*a*, a first Tx mixer 1372*a*, a first PA 1376*a*, and a first Tx antenna 1380*a*. As indicated by the ellipsis, the transmit portion 1301 may include any appropriate number of transmitter chains.

The Rx portion 1303 may include ADCs 1362*a-n*, RX filters 1366*a-n*, Rx VGAs 1370*a-n*, Rx mixers 1374*a-n*, LNAs 1378*a-n*, and Rx antennas 1382*a-n*. Each of the LNAs 1378*a-n* may be electrically coupled between a different Rx antenna of the Rx antennas 1382*a-n* and a different Rx mixer of the Rx mixers 1374*a-n*. In addition, each of the Rx VGAs 1370*a-n* may be electrically coupled between a different Rx mixer of the Rx mixers 1374*a-n* and a different Rx filter of the Rx filters 1366*a-n*. Further, each of the ADCs 1362*a-n* may be electrically coupled to a different Rx filter of the Rx filters 1366*a-n*.

The Rx portion 1303 may include receiver chains that each include a single ADC of the ADCs 1362a-n, a single Rx filter of the Rx filters 1366a-n, a single Rx VGA of the Rx VGAs 1370a-n, a single Rx mixer of the Rx mixers 1374a-n, a single LNA of the LNAs 1378a-n, and a single Rx antenna of the Rx antennas 1382a-n. For example, a first receiver chain may include a first ADC 1362a, a first Rx filter 1366a, a first Rx VGA 1370a, a first Rx mixer 1374a, a first LNA 1378a, and a first Rx antenna 1382a. As indicated by the ellipsis, the receive portion 1303 may include any appropriate number of receiver chains.

Operation of the first transmitter chain (e.g., the first DAC 1360a, the first Tx filter 1364a, the first Tx VGA 1368a, the first Tx mixer 1372a, the first PA 1376a, and the first Tx antenna 1380a) is now discussed. Each of the transmitter chains may operate accordingly.

The first DAC 1360a may receive a digital Tx signal to be transmitted. The first DAC 1360a may generate an analog Tx signal representative of the digital Tx signal. The first Tx filter 1364a may receive the analog Tx signal and may prevent portions of the analog Tx signal from propagating the first Tx filter 1364a. The first Tx filter 1364a may provide a filtered Tx signal based on the analog Tx signal. The first Tx VGA 1368a may amplify a power level of the filtered Tx signal to generate an amplified Tx signal. The first Tx mixer 1372a may mix the amplified Tx signal to generate a mixed Tx signal at a different frequency than the amplified Tx signal.

The first PA 1376a may generate an amplified mixed Tx signal by amplifying a power level (e.g., an amplitude) of the mixed Tx signal. The first PA 1376a may provide the amplified mixed Tx signal to the first Tx antenna 1380a. The first antenna 1380a may transmit the amplified mixed Tx signal as a transmit signal.

Operation of a first receiver chain (e.g., the first ADC 1362a, the first Rx filter 1366a, the first Rx VGA 1370a, the first Rx mixer 1374a, the first LNA 1378a, and the first Rx antenna 1382a) is now discussed. Each of the receiver chains may operate accordingly.

The first Rx antenna 1382a may receive a Rx signal and provide the Rx signal to the first LNA 1378a. The first LNA 1378a may generate an amplified Rx signal by amplifying a power level of the corresponding Rx signal. The first Rx mixer 1374a may mix the amplified Rx signal to generate a mixed Rx signal at a different frequency than the amplified Rx signal. The first Rx VGA 1370a may amplify a power level of the mixed Rx signal to generate an amplified mixed Rx signal. The first Rx filter 1366a may receive the amplified mixed Rx signal. The first Rx filter 1366a may prevent portions of the amplified mixed Rx signal from propagating the first Rx filter 1366a and may provide a filtered Rx signal based on the amplified mixed Rx signal. The first ADC 1362a may receive the filtered Rx signal and generate a digital Rx signal representative of the filtered Rx signal.

In some aspects, the MIMO radar device 1300 may not include a T/R module. Due to not including a T/R module, the MIMO radar device 1300 may include the Rx antennas 1382a-n and the Tx antennas 1380a-n as different types of antennas. Thus, the MIMO radar device 1300 may include a greater size of the data storage and the processing complexity compared to the analog radar device 1100. However, due to ambiguities in the transmitter chains, the receiver chains, or some combination thereof, the MIMO radar device 1300 may be susceptible to multipath interference. In some aspects, the MIMO radar device 1300 may include a full array in the receiver chains along a first angular dimension and a full array in the transmitter chains along a second angular dimension to prevent or reduce the impact of multipath interference.

Figure 14:
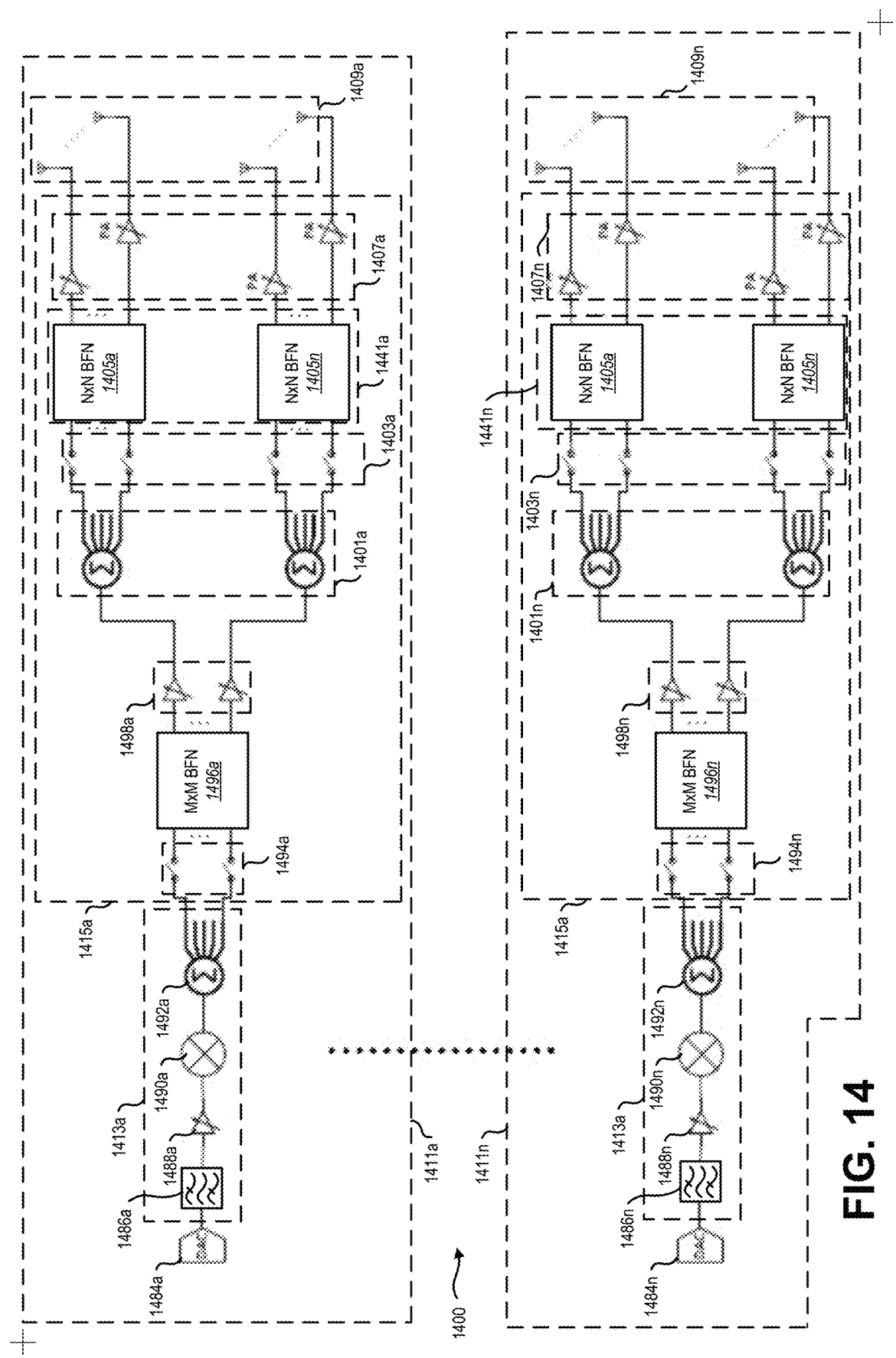
FIG. 14 illustrates an example Tx MIMO portion of a MIMO radar device.

FIG. 14 illustrates an example Tx MIMO portion 1400 of a MIMO radar device, in accordance with at least one aspect described in the present disclosure. The Tx MIMO portion 1400 may correspond to at least a portion of the radar frontends 103, 211, and 304, described above in relation to FIGS. 1, 2, and 3. The Tx MIMO portion 1400 may include transmitter chains 1411a-n (referenced collectively in the present disclosure as "transmitter chains 1411").

The transmitter chains 1411 may include DACs 1484a-n (also referred to in the present disclosure collectively as a DAC stage), Tx chain portions 1413a-n, switched analog BFNs 1415a-n, and Tx antenna arrays 1409a-n. Each of the Tx chain portions 1413a-n may be electrically coupled between a different DAC of the DACs 1484a-n and a different switched analog BFN of the switched analog BFNs 1415a-n. Each of the switched analog BFNs 1415a-n may be electrically coupled to a different Tx antenna array of the Tx antenna arrays 1409a-n.

The Tx chain portions 1413a-n may include Tx filters 1486a-n, Tx VGAs 1488a-n, Tx mixers 1490a-n, and splitters 1492a-n. Each of the Tx filters 1486a-n may be electrically coupled between a different Tx filter of the Tx filters 1486a-n and a different Tx mixer of the Tx mixers 1490a-n. For example, a first Tx VGA 1488a may be electrically coupled between a first Tx filter 1486a and a first Tx mixer 1490a. In addition, each of the splitters 1492a-n may be electrically coupled to a different Tx mixer of the Tx mixers 1490a-n. For example, a first splitter 1492a may be electrically coupled to the first Tx mixer 1490a.

The switched analog BFNs 1415a-n may include first switch arrays 1494a-n, M×M BFNs 1496a-n, VGA arrays 1498a-n, splitter arrays 1401a-n, second switch arrays 1403a-n, N×N BFN arrays 1441a-n, PA arrays 1407a-n, and Tx antenna arrays 1409a-n. Each of the M×M BFNs may be electrically coupled between a different first switch array of the first switch arrays 1494a-n and a different VGA array of the VGA arrays 1498a-n. For example, a first M×M BFN 1496a may be electrically coupled between a first switch array 1494a and a first VGA array 1498a.

Each of the first switch arrays 1494a-n may be electrically coupled to a different Tx chain portion of the Tx chain portions 1413a-n (e.g., a different splitter of the splitters 1491a-n). The first switch arrays 1494a-n may include multiple switches. Each switch of the first switch arrays 1494a-n may be electrically coupled between different outputs of the splitters 1492a-n and different inputs of the M×M BFNs 1496a-n. In addition, the VGA arrays 1498a-n may include multiple VGAs. Each VGA of the VGA arrays 1498a-n may be electrically coupled to a different output of the M×M BFNs 1496a-n.

In addition, each of the splitter arrays 1401a-n may be electrically coupled between a different VGA array of the VGA arrays 1498a-n and a different second switch array of second switch arrays 1403a-n. For example, a first splitter array 1401a may be electrically coupled between a first second switch array 1403a and the first VGA array 1498a. The splitter arrays 1401a-n may include multiple splitters. Each splitter of the splitter arrays 1401a-n may be electrically coupled to a different VGA of the VGA arrays 1498a-n.

Each of the N×N BFN arrays 1441a-n may be electrically coupled between a different second switch array of the second switch arrays 1403a-n and a different PA array of the PA arrays 1407a-n. For example, a first N×N BFN array 1441a may be electrically coupled between the first second switch array 1403a and a first PA array 1407a. In addition, each of the PA arrays 1407a-n may be electrically coupled to a different Tx antenna array of the Tx antenna arrays 1409a-n. For example, the first PA array 1407a may be electrically coupled to the first Tx antenna array 1409a.

The PA arrays 1407a-n may include multiple PAs. Each PA of the PA arrays 1407a-n may be electrically coupled to a different output of the N×N BFNs 1405a-n and a different Tx antenna of the TX antenna array 1409a-n. As indicated by the ellipsis, the Tx MIMO portion 1400 may include any appropriate number of transmitter chains 1411.

The DAC stage (e.g., the DACs 1484a-n) may generate a different analog Tx signal for each of the transmitter chains 1411a-n. In some aspects, the DAC stage may generate each of the different analog Tx signals representative of a single digital Tx signal.

Operation of a first transmitter chain 1411a is now discussed. Each of the transmitter chains 1411a-n may operate accordingly. The first DAC 1484a may receive a digital Tx signal to be transmitted. The first DAC 1484a may generate the analog Tx signal representative of the digital Tx signal.

The first Tx filter 1486a may receive the analog Tx signal and may prevent portions of the analog Tx signal from propagating the first Tx filter 1486a. The first Tx filter 1486a may provide a filtered analog Tx signal based on the analog Tx signal. The first Tx VGA 1488a may amplify a power level of the filtered analog Tx signal to generate an amplified analog Tx signal. In some aspects, the first Tx VGA 1488a may generate the amplified analog Tx signals based on the filtered Tx signal.

The first Tx mixer 1490a may mix the amplified analog Tx signal to generate a mixed analog Tx signal based on the amplified analog Tx signal. In some aspects, the first Tx mixer 1490a may generate the mixed analog Tx signal at a different frequency than the amplified analog Tx signal.

The first splitter 1492a may receive the mixed Tx signal. In addition, the first splitter 1492a may generate multiple intermediate analog Tx signals based on the mixed analog Tx signal. In some aspects, the first splitter 1492a may generate each of the intermediate analog Tx signals the same as or similar to the mixed Tx signal (e.g., the intermediate analog Tx signals may include copies of the mixed analog Tx signal). As indicated by the ellipsis, the first splitter 1492a may include any appropriate number of outputs and may generate any appropriate number of intermediate analog Tx signals. The first splitter 1492a may generate a number of intermediate analog Tx signals that corresponds to a number of inputs of the first M×M BFN 1496a.

The first first switch array 1494a may regulate the number of the intermediate analog Tx signals that the first M×M BFN 1496a receives. For example, the first first switch array 1494a may regulate the number of intermediate analog Tx signals such that the first M×M BFN 1496a either receives each of the intermediate analog Tx signals or only receives a portion of the intermediate analog Tx signals.

The first M×M BFN 1496a may generate formed analog Tx signals for each of the intermediate analog Tx signals that are received (e.g., for one or more of the intermediate analog Tx signals). For example, if the first M×M BFN 1496a receives ten intermediate analog Tx signals via the first first switch array 1494a, the first M×M BFN 1496a may generate ten formed analog Tx signals. In some aspects, the first M×M BFN 1496a may form the formed analog Tx signals in a first angular dimension.

One or more VGAs of the first VGA array 1498a may amplify a power level of corresponding formed analog Tx signals to generate amplified formed analog Tx signals. In some aspects, the first VGA array 1498a may generate an amplified formed analog Tx signal for each of the formed analog Tx signals that are generated by the first M×M BFN 1496a.

One or more splitters of the first splitter array 1401a may generate multiple split analog Tx signals for each amplified analog TX signal. In some aspects, the one or more splitters of the first splitter array 1401a may generate the split analog Tx signals the same as or similar to the corresponding amplified analog Tx signal (e.g., the split analog Tx signals may include copies of the corresponding amplified analog Tx signal). As indicated by the ellipsis, each splitter the first splitter array 1401a may include any appropriate number of outputs and may generate any appropriate number of split analog Tx signals. The one or more splitters of the first splitter array 1401a may generate a number of split analog Tx signals that corresponds to a number of inputs of corresponding N×N BFNs 1405a-n of the first N×N BFN array 1441a.

The first second switch array 1403a may regulate the number of the split analog Tx signals that the first N×N BFN array 1441a receives. For example, the first second switch array 1403a may regulate the number of split analog Tx signals such that the first N×N BFN array 1441a either receives each of the split analog Tx signals or only receives a portion of the split analog Tx signals.

One or more N×N BFNs 1405a-n of the first N×N array 1441a may generate multiple additional analog Tx signals for one or more of the split analog Tx signals. For example, if one or more of the N×N BFNs 1405a-n receive twenty split analog Tx signals via the first second switch array 1403a, the corresponding N×N BFNs 1405a-n may generate twenty additional analog Tx signals. In some aspects, the N×N BFNs 1405a-n may form the additional analog Tx signals in a second angular dimension.

One or more PAs of the first PA array 1407a may amplify a power level of corresponding additional analog Tx signals to generate the analog Tx signals. In some aspects, the first PA array 1407a may generate an analog Tx signal for each of the additional analog Tx signals that are generated by the first N×N BFNs 1405a-n. In some aspects, the analog Tx signals may include a beam formed in accordance with a state of the first switched analog BFN 1415a.

The first Tx antenna array 1409a may transmit signals representative of the corresponding analog Tx signals. Each antenna of the first Tx antenna array 1409a may transmit a signal representative of a different analog Tx signal.

Figure 15:
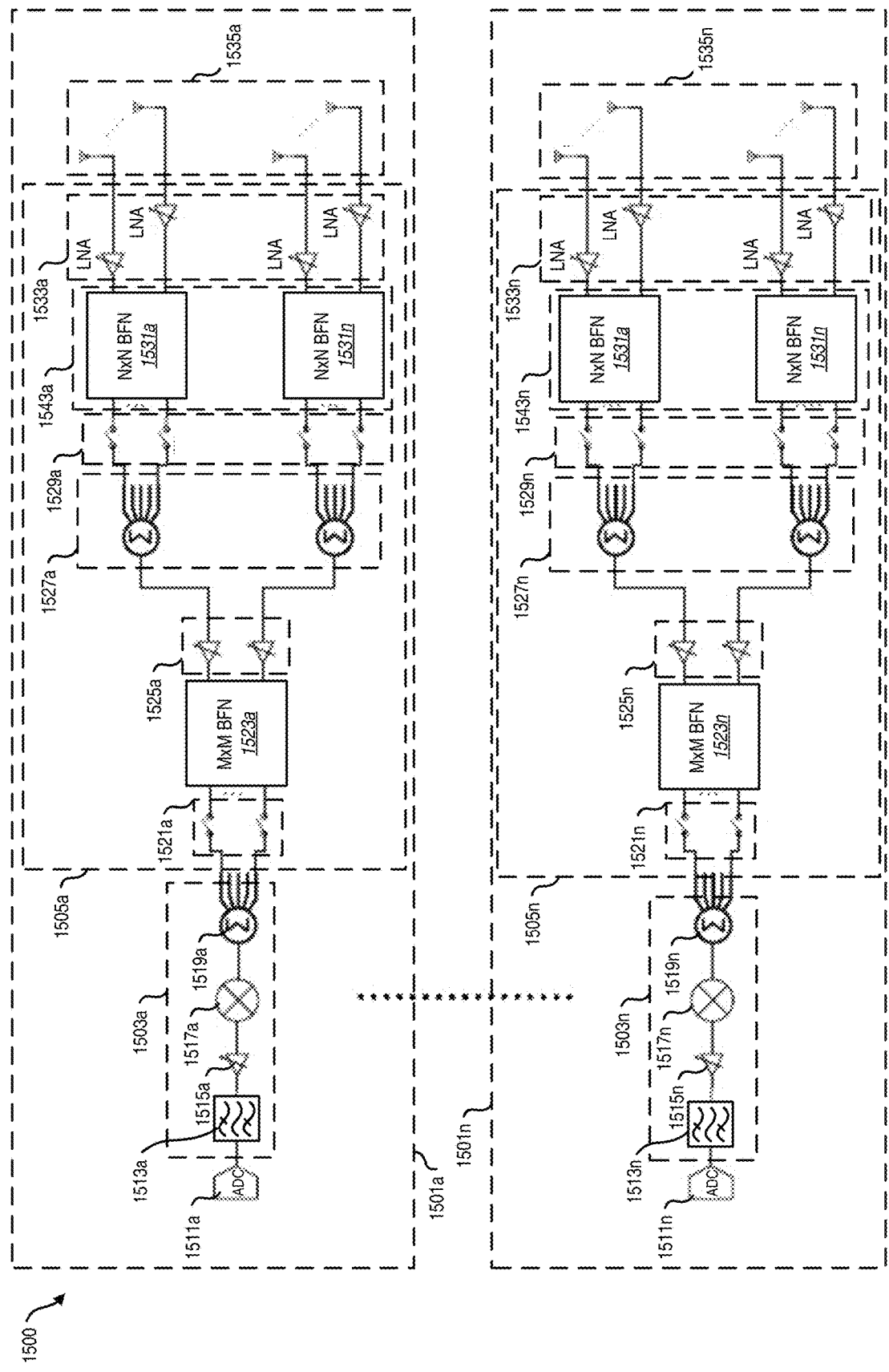
FIG. 15 illustrates an example Rx MIMO portion of a MIMO radar device.

FIG. 15 illustrates an example Rx MIMO portion 1500 of a MIMO radar device, in accordance with at least one aspect described in the present disclosure. The Rx MIMO portion 1500 may correspond to at least a portion of the radar frontends 103, 211, and 304, described above in relation to FIGS. 1, 2, and 3. The Rx MIMO portion 1500 may include receiver chains 1501a-n (referenced collectively in the present disclosure as "receiver chains 1501").

The receiver chains 1500 may include ADCs 1511a-n (also referred to in the present disclosure collectively as an ADC stage), Rx chain portions 1503a-n, switched analog BFNs 1505a-n, and Rx antenna arrays 1535a-n. Each of the Rx chain portions 1503a-n may be electrically coupled between a different ADC of the ADCs 1511a-n and a different switched analog BFN of the switched analog BFNs 1505a-n. Each of the switched analog BFNs 1505a-n may be electrically coupled to a different Rx antenna array of the RX antenna arrays 1535a-n.

The Rx chain portions 1503a-n may include Rx filters 1513a-n, Rx VGAs 1515a-n, RX mixers 1517a-n, and combiners 1519*a-n*. Each of the Rx VGAs 1515*a-n* may be electrically coupled between a different Rx filter of the RX filters 1513*a-n* and a different Rx mixer of the Rx mixers 1517*a-n*. For example, a first Rx VGA 1515*a* may be electrically coupled between a first Rx filter 1513*a* and a first Rx mixer 1517*a*. In addition, each of the combiners 1519*a-n* may be electrically coupled to a different Rx mixer of the Rx mixers 1517*a-n*. For example, a first combiner 1519*a* may be electrically coupled to the first Rx mixer 1517*a*.

The switched analog BFNs 1505*a-n* may include first switch arrays 1521*a-n*, M×M BFNs 1523*a-n*, VGA arrays 1525*a-n*, combiner arrays 1527*a-n*, second switch arrays 1529*a-n*, N×N BFN arrays 1543*a-n*, and LNA arrays 1533*a-n*. Each of the M×M BFNs 1523*a-n* may be electrically coupled between a different first switch array of the first switch arrays 1521*a-n* and a different VGA array of the VGA arrays 1525*a-n*. For example, a first M×M BFN 1523*a* may be electrically coupled between a first first switch array 1521*a* and a first VGA array 1525*a*.

Each of the first switch arrays 1521*a-n* may be electrically coupled to a different Rx chain portion of the Rx chain portions 1503*a-n* (e.g., a different combiner of the combiners 1519*a-n*). The first switch arrays 1521*a-n* may include multiple switches. Each switch of the first switch arrays 1521*a-n* may be electrically coupled between a different output of the M×M BFNs 1523*a-n* and a different input of the combiners 1519*a-n*. In addition, the VGA arrays 1525*a-n* may include multiple VGAs. Each VGA of the VGA arrays 1525*a-n* may be electrically coupled to a different input of the M×M BFNs 1523*a-n*.

Each of the combiner arrays 1527*a-n* may be electrically coupled between a different VGA array of the VGA arrays 1525*a-n* and a different second switch array of the second switch arrays 1529*a-n*. For example, a first combiner array 1527*a* may be electrically coupled between a first second switch array 1529*a* and the first VGA array 1525*a*. The combiner arrays 1527*a-n* may include multiple combiners. Each combiner of the combiner arrays 1527*a-n* may be electrically coupled to a different VGA of the VGA arrays 1525*a-n*.

Each of the N×N BFN arrays 1543*a-n* may be electrically coupled between a different second switch array of the second switch arrays 1529*a-n* and a different LNA array of the LNA arrays 1533*a-n*. For example, a first N×N BFN array 1545*a* may be electrically coupled between the first second switch array 1529*a* and a first LNA array 1533*a*. In addition, each of the LNA arrays 1533*a-n* may be electrically coupled to a different Rx antenna array of the Rx antenna arrays 1535*a-n*. For example, the first LNA array 1533*a* may be electrically coupled to the first Rx antenna array 1535*a*. The LNA arrays 1533*a-n* may include multiple LNAs. Each LNA of the LNA arrays 1533*a-n* may be electrically coupled to a different RX antenna of the RX antennas 1535*a-n* and a different input of the N×N BFNs 1531*a-n*. As indicated by the ellipsis, the RX MIMO portion 1500 may include any appropriate number of receiver chains 1501.

The switched analog Rx BFNs 1505*a-n* may generate intermediate analog Rx signals based on receive signals received from the Rx antenna arrays 1535*a-n*. Operation of a first receiver chain 1501*a* is now discussed. Each of the receiver chains 1501*a-n* may operate accordingly.

The first Rx antenna array 1535*a* may receive Rx signals and provide the Rx signals to the first LNA array 1533*a*. The first LNA array 1533*a* may generate amplified Rx signals by amplifying a power level of corresponding Rx signals. The N×N BFNs 1531*a-n* of the first N×N array 1543*a* may generate formed analog Rx signals for each of the amplified Rx signals. In some aspects, the N×N BFNs 1531*a-n* may form the formed analog Rx signals in a second angular dimension.

The first second switch array 1529*a* may regulate the number of the formed analog Rx signals that the first combiner array 1527*a* receives. For example, the first second switch array 1529*a* may regulate the number of formed analog Rx signals such that the first combiner array 1527*a* either receives each of the formed analog Rx signals or only receives a portion of the formed analog Rx signals. The first combiner array 1527*a* may generate one or more combined analog Rx signals based on the formed analog RX signals received via the first second switch array 1529*a*. One or more combiners of the combiner array 1527*a* may generate a combined analog Rx signal by combining each of the corresponding formed analog RX signals.

One or more VGAs of the first VGA array 1525*a* may amplify a power level of a corresponding combined analog Rx signal to generate one or more combined amplified analog Rx signals. In some aspects, the first VGA array 1525*a* may generate an amplified formed analog Rx signal for each of the combined analog Rx signals that are received via the first second switch array 1527*a*.

The first M×M BFN 1523*a* may generate intermediate analog RX signals based on the amplified formed analog Rx signals. In some aspects, the first M×M BFN 1523*a* may form the intermediate analog Rx signals in a first angular dimension. The first first switch array 1521*a* may regulate the number of the intermediate analog Rx signals that the first combiner 1519*a* receives. For example, the first first switch array 1521*a* may regulate the number of intermediate analog Rx signals such that the first combiner 1519*a* either receives each of the intermediate analog Rx signals or only receives a portion of the intermediate analog Rx signals.

The first combiner 1519*a* may generate a combined analog Rx signal by combining each of the intermediate analog Rx signals received by the first combiner 1519*a*. The first Rx mixer 1517*a* may mix the combined Rx signal to generate a mixed analog Rx signal at a different frequency than the combined analog Rx signal. The first Rx VGA 1515*a* may amplify a power level of the mixed analog Rx signal to generate an amplified analog Rx signal.

The first Rx filter 1513*a* may receive the amplified analog Rx signal and may prevent portions of the amplified analog Rx signal from propagating the first Rx filter 1513*a*. The first Rx filter 1513*a* may provide a filtered analog Rx signal based on the amplified analog Rx signal. The first ADC 1511*a* may receive the filtered analog Rx signal and may generate a digital Rx signal representative of the filtered Rx signal.

In some aspects, the Tx MIMO portion 1400 and the Rx MIMO portion 1500 may be positioned within a MIMO radar device. With combined reference to FIGS. 14 and 15, the MIMO radar device may further include a control circuit (not illustrated). The control circuit may be operatively coupled to the first switch arrays 1494*a-n* and 1521*a-n* and the second switch arrays 1402*a-n* and 1529*a-n*.

The control circuit may control the switches within the first switch arrays 1494*a-n* and 1521*a-n* and the second switch arrays 1402*a-n* and 1529*a-n*. In some aspects, the control circuit may control the switches within the first switch arrays 1494*a-n* and 1521*a-n* and the second switch arrays 1402*a-n* and 1529*a-n* to control the number of corresponding signals that propagate the first switch arrays 1494*a-n* and 1521*a-n* and the second switch arrays 1402*a-n* and 1529*a-n*. In addition, the control circuit may control the switched within the first switch arrays 1494a-n and 1521a-n and the second switch arrays 1402a-n and 1529a-n to control the state of the switched analog BFNs 1415a-, and 1505a-n.

In some aspects, the control circuit may control the switches within the first switch arrays 1494a-n to control the number of intermediate analog Tx signals that the M×M BFNs 1496a-n receive. In some aspects, the control circuit may control the first switch arrays 1494a-n to cause the M×M BFNs 1494a-n to generate the corresponding formed analog Tx signals as a particular number of analog signals. In some aspects, the control circuit may control the switches within the second switch arrays 1403a-n to control the number of split analog Tx signals that the N×N BFNs 1441a-n receive. In some aspects, the control circuit may control the second switch arrays 1403a-n to cause the N×N BFNs 1441a-n to generate the corresponding additional analog Tx signals as a particular number of analog signals.

In some aspects, the control circuit may control the switches within the first switch arrays 1521a-n to control the number of intermediate analog Rx signals that the combiners 1519a-n receive. In some aspects, the control circuit may control the first switch arrays 1521a-n to cause a particular number of the combined analog Rx signals to be received by the combiners 1519a-n. In some aspects, the control circuit may control the switches within the second switch arrays 1529a-n to control the number of formed analog Rx signals that the combiner arrays 1527a-n receive. In some aspects, the control circuit may control the second switch arrays 1529a-n to cause a particular number of the formed analog Rx signals to be received by the combiner arrays 1527a-n.

A MIMO radar device may include transmitter chains and a DAC stage. The DAC stage may generate a different analog signal for each transmitter chain of the MIMO radar device. The analog signals may be representative of a single digital signal to be transmitted. Each of the transmitter chains may include a transmit chain portion and a switched analog BFN. Each of the transmit chain portions may generate intermediate analog signals. In some aspects, the transmit chain portions may generate the intermediate analog signals representative of the corresponding analog signal. Each of the switched analog BFNs may generate analog transmit signals for one or more of the intermediate analog signals. The switched analog BFNs may generate the analog transmit signals to include a beam formed in accordance with a state of the switched analog BFN.

In some aspects, the MIMO radar device may include a P number of digital transmitter MIMO chains and a Q number of digital receiver MIMO chains. In these and other aspects, each of the digital transmitter MIMO chains or each of the digital receiver MIMO chains may be electrically coupled to a different analog M×N subarray. The M×N subarrays may form N×M contiguous beams.

In some aspects, each of the analog M×N subarrays may include a first beamforming stage and a second beamforming stage. Each of the first beamforming stages may include a M×M switched analog BFN. The M×M switched analog BFNs may form a beam in a first angular dimension. In addition, each of the second beamforming stages may include multiple N×N switched analog BFNs. The N×N switched analog BFNs may form the beam in a second angular dimension.

In some aspects, the first beamforming stages and the second beamforming stages may generate either focused contiguous beams or spoiled beams. The first beamforming stages and the second beamforming stages may generate the focused contiguous beams or the spoiled beams using switch networks that drive the N×N switched analog BFNs and the M×M switched analog BFNs.

The MIMO radar device may include transmit antennas to transmit signals representative of the analog transmit signals. In some aspects, each of the transmit antennas may transmit a signal representative of a different analog transmit signal. In some aspects, the transmit chain portions may perform beamforming of the analog transmit signals using the digital signal.

Each of the transmit chain portions may include a filter, a VGA, a mixer, a splitter, or some combination thereof. Each of the filters may generate a filtered analog signal based on the corresponding analog signal. Each of the VGAs may generate an amplified analog signal based on the corresponding filtered analog signal. Each of the mixers may generate a mixed analog signal based on the corresponding amplified analog signal. Each of the splitters may generate multiple intermediate analog signals based on the corresponding mixed analog signal.

Each of the switched analog BFNs may include a M×M BFN, VGAs, splitters, N×N BFNs, PAs, or some combination thereof. Each of the M×M BFNs may generate multiple formed analog signals for one or more intermediate analog signals. The VGAs may generate amplified formed analog signals for each of the corresponding formed analog signals. The splitters may generate multiple split analog signals for one or more corresponding amplified formed analog signals. The N×N BFNs may generate multiple additional analog signals for one or more of the split analog signals. The PAs may generate analog transmit signals based on corresponding additional analog signals.

The M×M BFNs may generate the formed analog signals formed in a first angular dimensions. In addition, the N×N BFNs may generate the additional analog signals formed in a second angular dimensions. The second angular dimension may be different than the first angular dimension. In some aspects, the second angular dimension may include an orthogonal angle to the first angular dimensions. In these and other aspects, the first angular dimension may include an azimuth dimension and the second angular dimension may include an elevation dimensions. Alternatively, the first angular dimension may include the elevation dimension and the second angular dimension may include the azimuth dimension.

Each of the switched analog BFNs may also include a first set of switches and a second set of switches. In addition, the MIMO radar device may include a control circuit. The control circuit may control the first set of switches to cause the corresponding M×M BFNs to generate the formed analog signals as a particular number of analog signals. In addition, the control circuit may control the second set of switches to cause the corresponding N×N BFNs to generate the additional analog signals as a particular number of analog signals. The states of the switched analog BFNs may include a state of the corresponding first set of switches and a state of the corresponding second set of switches.

In some aspects, the switched analog BFNs may form the analog transmit signals as a contiguous beam. In other aspects, the switched analog BFNs may form the analog transmit signals as a spoiled beam. The switched analog BFNs may operate as a pre-select filter to reduce multipath interference within the transmitter chains of the MIMO radar device.

Each of the PAs may set a receive noise figure, maximize transmit output power of the corresponding analog transmit signal, control sidelobe levels of the corresponding analog transmit signal, or some combination thereof. Each of the VGAs may window the corresponding amplified formed analog signal in a particular angular dimensions. For example, each of the VGAs may window the corresponding amplified formed analog signal in the first angular dimension or the second angular dimension.

In some aspects, each of the VGAs may operate as a driver amplifier for the corresponding M×M BFN to compensate for losses in the corresponding M×M BFN stage. In addition, each of the VGAs may window beams in a second angular dimension to control sidelobes of the beams formed by the corresponding M×M BFN.

The VGAs may act as driver amplifiers, compensate for losses in the corresponding M×M BFNs, control sidelobe levels of the amplified formed analog signals, or some combination thereof.

In some aspects, the switched analog BFNs may include N×N BFNs and PAs. Each of the N×N BFNs may generate multiple formed analog signals for one or more intermediate analog signals. The PAs may generate the analog transmit signals based on the corresponding formed analog signals.

The MIMO radar device may also include receiver chains. The MIMO radar device may include a P number of transmitter chains and a Q number of receiver chains. In some aspects, Q may be less than P. In other aspects, Q may be equal to P. In some aspects, M may include a number equal to a number of inputs and outputs of each of the M×M BFNs and N may include a number equal to a number of inputs and outputs of each of the N×N BFNs.

In some embodiments, a MIMO radar device may include multiple receiver chains and an ADC stage. Each receiver chain may include a switched analog BFN and a receive chain portion. The switched analog BFNs may generate intermediate analog signals based on receive signals. The switched analog BFNs may generate the intermediate analog signals to include a beam formed in accordance with a state of the switched analog BFNs. The receive chain portions may generate single analog signals representative of the intermediate analog signals. The ADC stage may generate multiple digital signals based on the analog signals. The ADC stage may generate a digital signal of the multiple digital signals for each receiver chain. The ADC stage may generate each digital signal representative of a corresponding analog signal.

The receiver chain may also include receive antennas. The receive antennas may receive the receive signals. The switched analog BFN may generate each intermediate signal representative of a different receive signal. In some aspects, the receive chain portion may perform beamforming using the digital signal.

Each of the switched analog BFNs may include LNAs, N×N BFNs, combiners, VGAs, and a M×M BFN. The LNAs may generate amplified analog signals based on the receive signals. The N×N BFNs may generate formed analog signals for the amplified analog signals. The combiners may generate combined analog signals based on at least a portion of the formed analog signals. The VGAs may generate combined amplified analog signals for each of the combined analog signals. The M×M BFNs may generate the intermediate analog signals based on at least a portion of the combined amplified analog signals.

The M×M BFNs may generate the intermediate analog signals in a first angular dimensions. The N×N BFNs may generate the formed analog signals in a second angular dimension. In some aspects, the second angular dimension may include an orthogonal angle to the first angular dimensions. In these and other aspects, the first angular dimension may include an azimuth dimension and the second angular dimension may include an elevation dimensions. Alternatively, the first angular dimension may include the elevation dimension and the second angular dimension may include the azimuth dimension.

Each of the switched analog BFNs may also include a first set of switches and a second set of switches. In addition, the MIMO radar device may include a control circuit. The control circuit may control the first set of switches to cause the combiners to generate the combined analog signals for a particular number of formed analog signals. In addition, the control circuit may control the second set of switches to cause the intermediate analog signals to be a particular number of analog signals. The state of the switched analog BFNs may include a state of the corresponding first set of switches and a state of the corresponding second set of switches.

In some aspects, each of the receive chain portions may include a receive combiner, a mixer, a VGA, a filter, or some combination thereof. Each of the receive combiners may generate a single combined analog signal based on the corresponding intermediate analog signals. Each of the mixers may generate a mixed analog signal based on the corresponding single combined analog signal. Each of the VGAs may generate an amplified signal based on the corresponding mixed analog signal. Each of the filters may generate an analog signal based on the corresponding amplified signal.

In some aspects, the switched analog BFNs may operate as a pre-select filter to reduce multipath interference within the receiver chains of the MIMO radar device.

The MIMO radar device may also include transmitter chains. The MIMO radar device may include a P number of transmitter chains and a Q number of receiver chains. In some aspects, Q may be less than P. In other aspects, Q may be equal to P. In some aspects, M may include a number equal to a number of inputs and outputs of each of the M×M BFNs and N may include a number equal to a number of inputs and outputs of each of the N×N BFNs.

A MIMO radar device may include a DAC stage and multiple transmitter chains. The DAC stage may be electrically coupled to the transmitter chains. Each transmitter chain may include a transmit chain portion electrically coupled to the DAC stage. In addition, each transmitter chain may include a transmit switched analog BFN electrically coupled to a corresponding transmit chain portion. The transmit switched analog BFN may generate analog transmit signals that include a beam formed in accordance with a state of the transmit switched analog BFN. The MIMO radar device may also include an ADC stage and multiple receiver chains. The ADC stage may be electrically coupled to the receiver chains. Each of the receiver chains may include a receive switched analog BFN. The receive switched analog BFNs may generate intermediate analog signals that include a beam formed in accordance with a state of the receive switched analog BFNs. Each of the receiver chains may include a receive chain portion electrically coupled to a corresponding receive switched analog BFN and the ADC stage.

The transmitter chain may also include antennas electrically coupled to corresponding transmit switched analog BFNs. The receiver chain may also include antennas electrically coupled to corresponding receive switched analog BFNs.

Each of the transmit switched analog BFNs may include a transmit filter electrically coupled to the DAC stage. Each of the transmit switched analog BFNs may also include a transmit VGA electrically coupled to a corresponding transmit filter. In addition, each of the transmit switched analog BFNs may include a transmit mixer electrically coupled to a corresponding transmit VGA. Further, each of the transmit switched analog BFNs may include a transmit splitter electrically coupled to a corresponding transmit mixer.

Each of the transmit switched analog BFNs may include a M×M BFN electrically coupled to a corresponding transmit switched analog BFN. Each of the transmit switched analog BFNs may also include a VGA electrically coupled to a corresponding M×M BFN. In addition, each of the transmit switched analog BFNs may include splitters. Each of the splitters may be electrically coupled to a different VGA. Further, each of the transmit switched analog BFNs may include N×N BFNs. Each of the N×N BFNs may be electrically coupled to a different splitter. Each of the transmit switched analog BFNs may include PAs. Each PA may be electrically coupled to a different output of the N×N BFNs.

Each of the transmit switched analog BFNs may include a first set of switches. Each switch of the first set of switches may be electrically coupled between a different output of the transmit chain portions and a corresponding M×M BFN. Each of the transmit switched analog BFNs may also include a second set of switches. Each switch of the second set of switches may be electrically coupled between a different splitter and a different input of a corresponding N×N BFN.

Each of the receive switched analog BFNs may include LNAs. Each of the receive switched analog BFNs may also include receive N×N BFNs. Each input of the receive N×N BFNs may be electrically coupled to a different LNA. In addition, each of the receive switched analog BFNs may include combiners. Each combiner may be electrically coupled to a different output of the receive N×N BFNs. Further, each of the receive switched analog BFNs may include receive VGAs. Each of the VGAs may be electrically coupled to a different combiner. Each of the receive switched analog BFNs may include a receive M×M BFN electrically coupled to the corresponding receive VGAs.

Each of the receive switched analog BFNs may also include a third set of switches. Each switch of the third set of switches may be electrically coupled between a different output of the receive M×M BFNs and a corresponding receive chain portion. Each of the receive switched analog BFNs may also include a fourth set of switches. Each switch of the fourth set of switches may be electrically coupled between a different output of the N×N BFNs and a different combiner.

Each of the receive chain portions may include a receive combiner electrically coupled to a corresponding receive switched analog BFN. Each of the receive chain portions may also include a receive mixer electrically coupled to a corresponding receive combiner. In addition, each of the receive chain portions may include a receive mixer electrically coupled to a corresponding receive combiner. Further, each of the receive chain portions may include a receive VGA electrically coupled to a corresponding receive mixer. Each of the receive chain portions may include a receive filter electrically coupled to a corresponding receive VGA.

Each of the transmit switched analog BFNs may include N×N BFNs electrically coupled to a corresponding transmit chain portion. In addition, each of the transmit switched analog BFNs may include PAs. Each of the PAs may be electrically coupled to a different output of a corresponding N×N BFN.

The filters discussed in the present disclosure may include a bandpass filter, a low pass filter, a high pass filter, or any other appropriate type of filter.

An analog radar device may include an AESA and a passive electronically scanned array (PESA). For the PESA portions, the analog radar device may not include amplifiers. The lack of amplifiers may cause excessive phase shifter losses at millimeter wave lengths or higher frequencies.

In some aspects, signals within T/R modules may be combined in the analog domain prior to being digitized and sent to a baseband processing unit. This may reduce the size of the storage devices since there is only one digital chain.

In some aspects, the MIMO radar device described in the present disclosure may be implemented on a printed circuit board, as an integrated circuit, or some combination thereof.

An antenna system may include apertures configured to control gain and beam patterns (e.g., beam widths) of signals that are transmitted or received by the antenna system. For example, an antenna system for millimeter wave communication and radar sensing may include an aperture that both increases gain and narrows the beam pattern. In addition, the antenna system may perform beam scanning to detect devices that are not stationary.

During beam scanning, the antenna system may transmit signals with a wide beam pattern. During track mode (e.g., when a device has been detected), the antenna system may transmit signals with a narrow beam pattern.

Some antenna systems may include a phased array, a metamaterial array, or a metasurface antenna array. The phased array, the metamaterial array, or some combination thereof may include high loss rates, poor update rates, high power consumption, poor scalability with frequency, or some combination thereof.

The phased array may include an active phased array or a passive phased array. The active phased array may include a T/R module for each antenna element. The T/R modules may include high power consumption. In addition, as a size of the active phased array is increased (e.g., sixty-four elements up to two hundred fifty-six elements), cost, power consumption, heat dissipation, or some combination thereof may become prohibitive. For example, components for heat dissipation may exceed form-factors or application suitability. The passive phased array may not include amplifiers. However, the passive phased array may include sensitivity degradation due to losses in phase shifters.

The metamaterial array may include a passive array in which a traveling wave illuminates a metamaterial aperture that is loaded with varactor phase shifters or other control mechanisms (e.g., voltage biased liquid crystal). The metamaterial array may include a reduced power consumption and cost compared to the active phase array. However, the metamaterial array may include losses that are prohibitive in a millimeter wave system. For example, the metamaterial array may include gallium arsenic (GaAs) varactors to control a metamaterial aperture and each varactor may include roughly eleven decibels of loss millimeter waves.

Additionally or alternatively, the metamaterial array may include control mechanisms that area liquid crystals with a very slow update rate in the order of few milliseconds (ms). Therefore, the metamaterial array may not be implemented in a radar system in which update rates are required to scan thousands of beams in less than a ms.

The metasurface antenna array may include an aperture that includes an artificial sheet material with sub-wavelength metal patterns. The metasurface antenna may modulate the surface waves through boundary conditions between the sub-wavelength metal patterns. The metasurface antenna may include frequency selective surfaces, impedance sheets, ohmic sheets, or some combination thereof. The metasurface antenna may operate within broadband, enhance radiation gain, suppress side-lobe, reduce antenna size, or some combination thereof. In addition, the metasurface array may not be capable of being quickly reconfigured (e.g., reconfigured on the fly).

Some aspects described in the present disclosure may include a lens antenna system that includes a reconfigurable device (e.g., a reconfigurable aperture or a reconfigurable layer) that is capable of performing beam scanning.

At least one lens antenna system described in the present disclosure may include a reconfigurable aperture and a control device. The reconfigurable aperture may include diodes located on a surface of the reconfigurable aperture. The diodes may be arranged in patches or other patterns. The control device may control one or more of the diodes to adjust a beam pattern of an output beam transmitted by the lens antenna system. The control device may control a state of one or more of the diodes to adjust a surface impedance distribution of the reconfigurable aperture (referred to generally in the present disclosure as the impedance of the reconfigurable aperture) and the beam pattern of the output beam.

In some aspects, the control device may utilize a semiconductor solid state plasma of the diodes to control the beam pattern of the output beam. For example, the control device may control the diodes as tunable resistive loads to control the output beam (e.g., the travelling wave from an antenna) to control a field of view (FOV) of the antenna system. The control device may control the diodes by implementing a closed loop feedback that accounts for temperature variations of one or more of the diodes.

At least one lens antenna system described in the present disclosure may include a reconfigurable twister reflector, a reconfigurable aperture, or a reconfigurable layer to perform polarization twisting, phase collimation, beam steering, FOV reconfiguration on the fly, or some combination thereof.

Therefore, at least one lens antenna system described in the present disclosure may provide adjustable beam patterns to provide coverage of a large range of applications. In addition, the diodes of the reconfigurable aperture may reduce power consumption during an on state of the diodes compared to T/R modules. Further, at least one lens antenna system described in the present disclosure may provide fine control of impedance to increase accuracy of the feedback loop and selectable control of the impedance of the reconfigurable aperture. At least one lens antenna system described in the present disclosure may be scaled to a terahertz frequency and may include a small footprint. In addition, at least one lens antenna system described in the present disclosure may be simpler to implement and calibrate, consume less power, update faster than, or some combination thereof versus other antenna systems.

Accordingly, at least one aspect described in the present disclosure may include a lens antenna system that is scalable to Terahertz. In addition, at least aspect described in the present disclosure may reduce power consumption compared to other lens antenna systems by implementing low power diodes for beam forming. Further, at least one aspect described in the present disclosure may reduce a number of components within the lens antenna system and may reduce a circuit footprint of the lens antenna system. At least one aspects described in the present disclosure may update the beamforming compared to other lens antenna systems.

Figure 16:
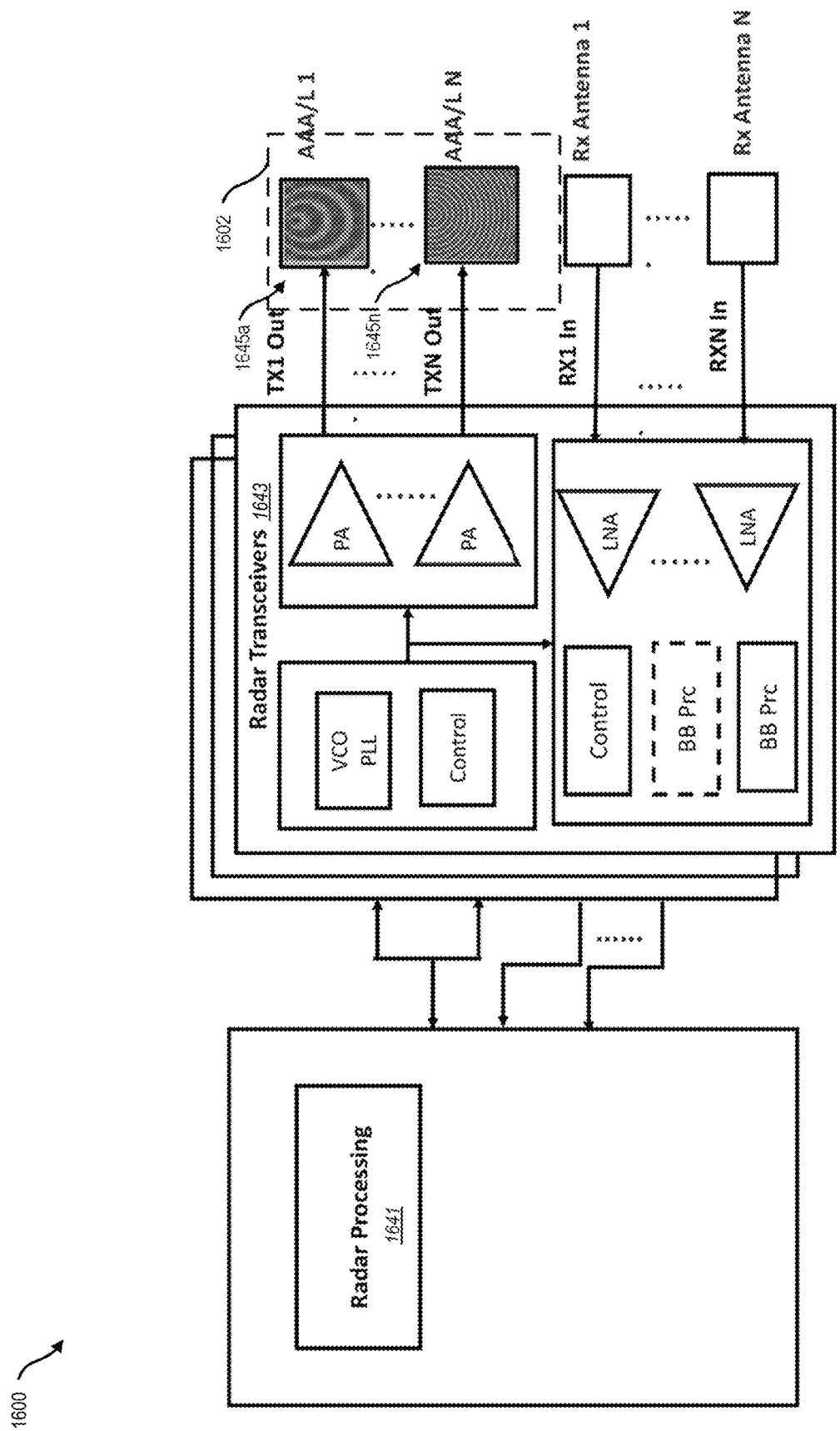
FIG. 16 illustrates a block diagram of an example lens antenna system.

FIG. 16 illustrates a block diagram of an example lens antenna system 1600, in accordance with at least one aspect described in the present disclosure. The lens antenna system 1600 may include a reconfigurable aperture 1602, a radar processing device 1641, and radar transceivers 1643. The radar processing device 1641 may correspond to at least a portion of the radar processors 104, 210, 309, and 402 described above in relation to FIGS. 1-4. The radar transceivers 1643 may correspond to at least a portion of the radar frontends 103, 304, and 401 described above in relation to FIGS. 1, 3, and 4. The reconfigurable aperture 1602 is illustrated as including only a first aperture 1645a and nth aperture 1645n (generally referred to as "apertures 1645"). As indicated by the ellipsis, the reconfigurable aperture 1602 may include any appropriate number of apertures 1645.

Antenna elements may be positioned proximate the apertures 1645. In some aspects, the antenna elements may be operatively coupled to the aperture 1645. The antenna elements may generate and transmit source beams. The apertures 1645 may receive the source beams. In addition, the apertures 1645 may provide output beams. The apertures 1645 may provide the output beams based on an impedance of the apertures 1645 (e.g., an impedance of diodes within the aperture 1645) and the source beam.

Figure 17:
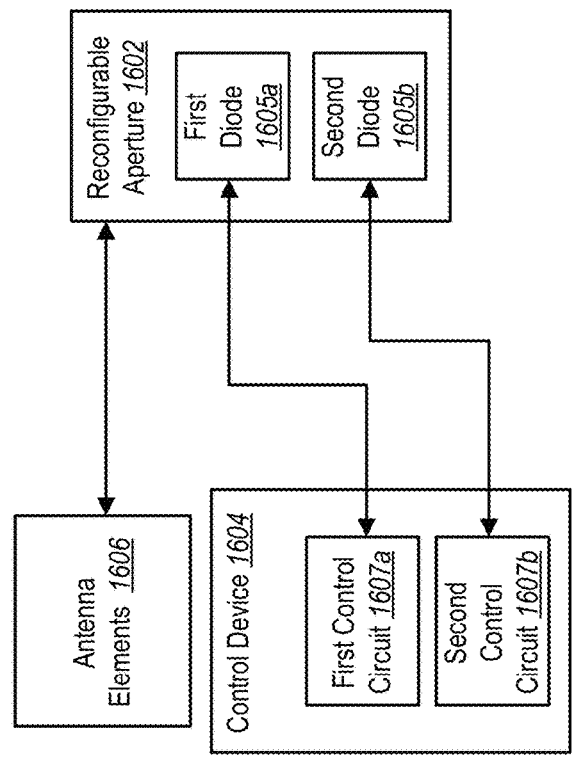
FIG. 17 illustrates a block diagram of an example lens antenna system.

FIG. 17 illustrates a block diagram of an example lens antenna system 1700, in accordance with at least one aspect described in the present disclosure. The lens antenna system 1700 may include the reconfigurable aperture 1602, a control device 1604, and antenna elements 1606. The reconfigurable aperture 1602 may include a first diode 1605a and a second diode 1605b (referenced collectively in the present disclosure as "diodes 1605"). The control device 1604 may include a first control circuit 1607a and a second control circuit 1607b (referenced collectively in the present disclosure as "control circuits 1607").

The reconfigurable aperture 1602 is illustrated as including only the first diode 1605a and the second diode 1605b for simplicity of illustration and discussion. In addition, the control device 1604 is illustrated as including only the first control circuit 1607a and the second control circuit 1607b for simplicity of illustration and discussion. The reconfigurable aperture 1602 may include any appropriate number of diodes 1605 and the control device 1604 may include any appropriate number of control circuits 1607, without departing the spirit and scope of the present disclosure.

The antenna elements 1606 may be positioned proximate the reconfigurable aperture 1602. In some aspects, the antenna elements 1606 may be operatively coupled to the reconfigurable aperture 1602. The antenna elements 1606 may generate and transmit a source beam. The reconfigurable aperture 1602 (e.g., the diodes 1605) may receive the source beam. In addition, the reconfigurable aperture 1602 may provide an output beam. The reconfigurable aperture 1602 may provide the output beam based on an impedance of the reconfigurable aperture 1602 (e.g., an impedance of the diodes 1605) and the source beam. In some aspects, the reconfigurable aperture 1602 may provide the output beam to an external environment for detecting objects as discussed above.

The control device 1604 may be operatively coupled to the diodes 1605. For example, the first control circuit 1607a may be operatively coupled to the first diode 1605a and the second control circuit 1607b may be operatively coupled to the second diode 1605b. The control device 1604 may control the impedance of the reconfigurable aperture 1602. In some aspects, the control device 1604 may control the impedance of the reconfigurable aperture 1602 by controlling a state of the diodes 1605. For example, the control circuits 1607 may bias the diodes 1605 to change the state of the diodes 1605. The states of the diodes 1605 is discussed in more detail in relation to FIG. 19.

The control device 1604 may control the impedance of the reconfigurable aperture 1602 to configure and reconfigure the beam pattern of the output beam on the fly. For example, the control device 1604 may control the impedance of the reconfigurable aperture 1602 to permit at least a portion of the source beam to propagate the reconfigurable aperture 1602 as the output beam.

Figure 18:
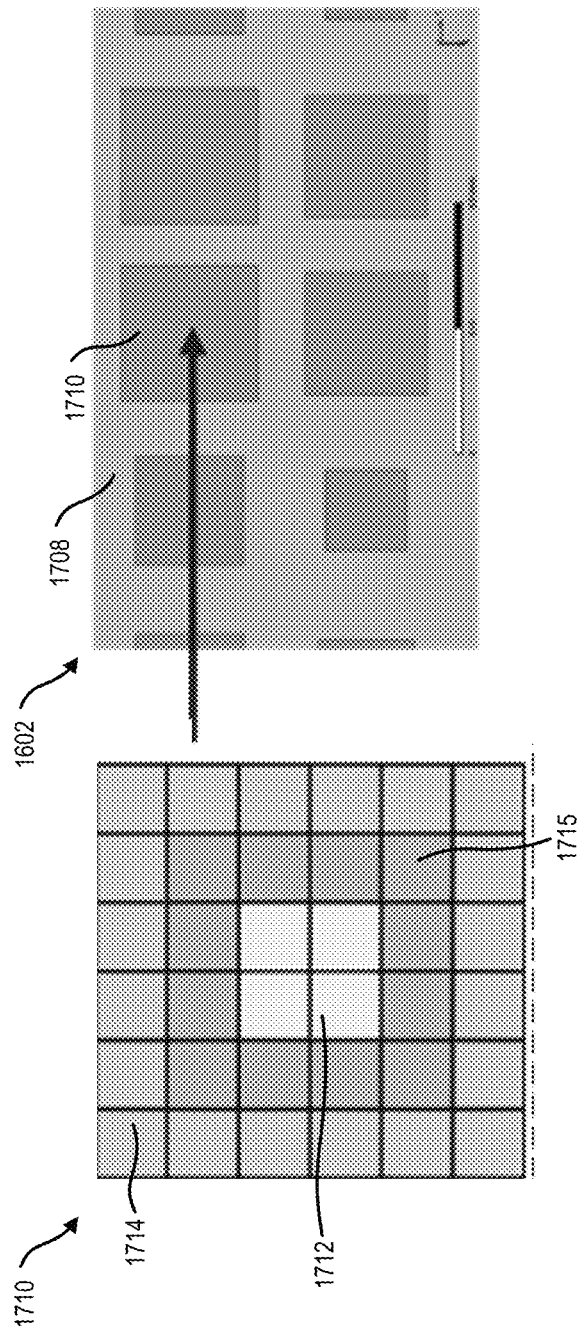
FIG. 18 illustrates a portion of the reconfigurable aperture of FIGS. 16-17.

FIG. 18 illustrates a portion of the reconfigurable aperture 1602 of FIGS. 16-17, in accordance with at least one aspect described in the present disclosure. The reconfigurable aperture 1602 may include multiple patches 1710. In FIG. 18, a single patch 1710 is numbered and discussed for simplicity of illustration and discussion. The reconfigurable aperture 1602 may include a surface 1708 on which the patch 1710 is physically positioned.

The patch 1710 may include a number of diodes that are positioned on the surface 1708. In FIG. 18, each block of the patch 1710 represents a different diode. The diodes may correspond to the diodes 1605 of FIGS. 16-17. The diodes may be arranged in a pattern on the surface 1708. For example, the diodes may be arranged in a pixelated pattern on the surface 1708.

The patch 1710 may include a first dynamic portion 1714, a second dynamic portion 1715, and a static portion 1712. In some aspects, the static portion 1712 may include a material that includes a constant impedance and cannot be reconfigured. In these and other aspects, the static portion 1712 may include diodes or some other material. The static portion 1712 may cause the reconfigurable aperture 1602 to provide the output beam as at least a minimum beam pattern.

The first dynamic portion 1714 and the second dynamic portion 1715 may be reconfigurable to change the impedance of the reconfigurable aperture 1602. In some aspects, the first dynamic portion 1714 may be set to an impedance level (e.g., a surface impedance) that is different than an impedance level of the second dynamic portion 1715. In other aspects, the first dynamic portion 1714 may be set to an impedance level that is the same as or similar to the impedance level of the second dynamic portion 1715.

In some aspects, the static portion 1712, the first dynamic portion 1714, and the second dynamic portion 1715 may form a pixelated patch. An impedance of the pixelated patch may vary based on whether the static portion 1712, the first dynamic portion 1714, and the second dynamic portion 1715 are in an on state or an off state. For example, if the static portion 1712 is in the on state and the first dynamic portion 1714 and the second dynamic portion 1715 are in the off state, the impedance of the pixelated patch may be equal to a first impedance level (e.g., the impedance of only the static portion 1712). As another example, if the static portion 1712 and the second dynamic portion 1715 are in the on state and the first dynamic portion 1714 is in the off state, the impedance of the pixelated patch may be equal to a second impedance level (e.g., the impedance of the static portion 1712 and the second dynamic portion 1715). As yet another example, if the static portion 1712, the first dynamic portion 1714, and the second dynamic portion 1715 are in the on state, the impedance of the pixelated patch may be equal to a third impedance level (e.g., the impedance of the static portion 1712, the first dynamic portion 1714, and the second dynamic portion 1715).

Figure 19:
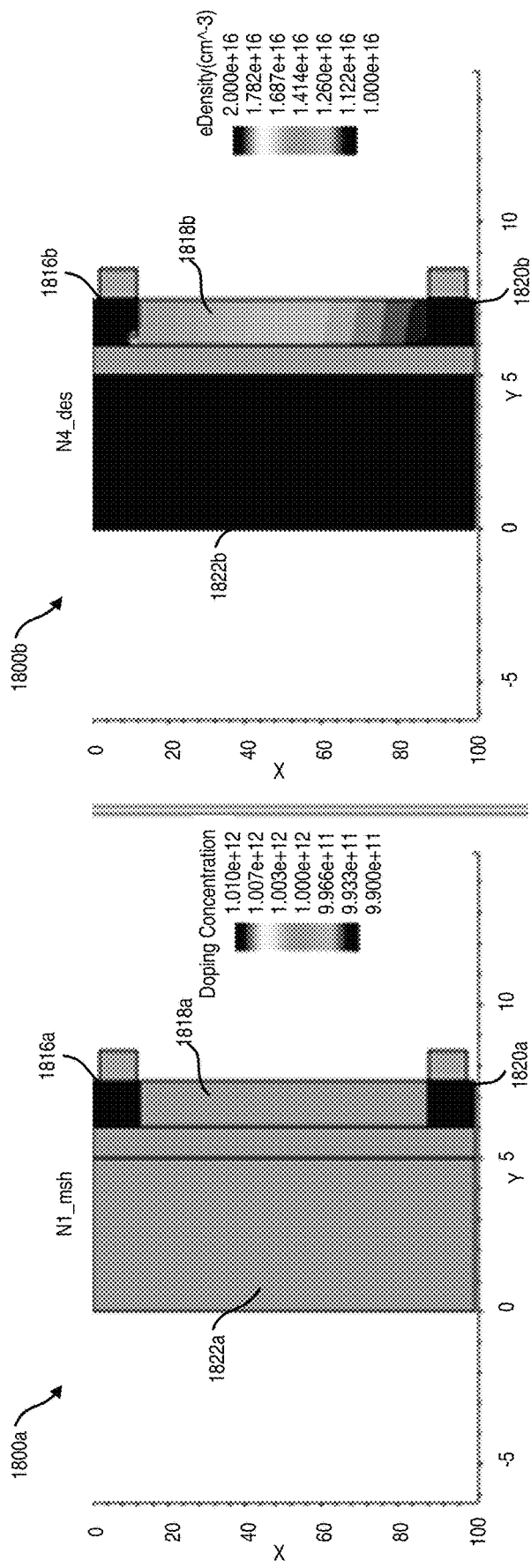
FIG. 19 illustrates example diodes that may be implemented in the lens antenna system of FIGS. 16-17.

FIG. 19 illustrates example diodes 1800*a-b* that may be implemented in the lens antenna system 1600 and 1700 of FIGS. 16-17, in accordance with at least one aspect described in the present disclosure. The diodes 1800*a-b* may correspond to the diodes 1605 of FIGS. 16-17. The diode 1800*a* may be illustrated in an off state and the diode 1800*b* may be illustrated in an on state. The diodes 1800*a-b* may include a P region 1816*a-b*, an I region 1818*a-b*, a N region 1820*a-b*, and a silicon substrate 1822*a-b*.

The I region 1818*a-b* may be physically positioned between the P region 1816*a-b* and the N region 1820*a-b*. In addition, the I region 1818*a-b* may physically extend (e.g., physically contacts) the P region 1816*a-b* to the N region 1820*a-b*. The P region 1816*a-b*, the I region 1818*a-b*, and the N region 1820*a-b* may be physically positioned on top of the silicon substrate 1822*a-b*.

The P region 1816*a-b* and the N region 1820*a-b* may be configured to be biased (e.g., by the control device 1604) to control an impedance of the I region 1818*a-b*. The control device 1604 may bias the P region 1816*a-b* and the N region 1820*a-b* to control the state of the diodes 1800*a-b*. For example, the control device 1604 may bias the P region 1816*a-b* and the N region 1820*a-b* 1818*a-b* to cause electrons within the N region 1820*a-b* and holes within the P region 1816*a-b* to flow into the I region 1818*a-b* to cause the diodes 1800*a-b* to transition between the off state (e.g., a second state) and the on state (e.g., a first state).

The diode 1800*a*, in the off state, may prevent the source beam from propagating the diode 1800*a*. In some aspects, the control device 1604 may bias the P region 1816*a* and the N region 1820*a* to cause a change of carrier concentration in the I region 1818*a*. For example, the control device 1604 may bias the P region 1816*a* and the N region 1820*a* to cause a carrier concentration of ten to the twelfth carriers per cubic centimeter (1e12 cm$^{-3}$) of the I-region 1818*a* so as to cause the diode 1800*a* to be in the off state. For example, if the diode 1800*a* includes a size of 100×100 squared micro meters, the control device 1604 may bias the P region 1816*a* and the N region 1820*a* to cause the diode 1800*a* to be in the off state (e.g., in an open bias condition). In the off state, the diode 1800 may include a conductivity that is less than one hundred siemens per meter.

The diode 1800*b*, in the on state, may permit at least a portion of the source beam to propagate. The control device 1604 may control the I region 1800*b* by injecting carriers into the I region 1818*b* via the P region 1816*b* and the N region 1820*b*. In some aspects, the control device 1604 may apply a forward bias on the diode 1800*b*. In the diode 1800*b*, for example, the P region 1816*b* and the N region 1820*b* may be biased such that carriers flow from the P region 1816*b* and the N region 1820*b* to the I region 1818*b* to cause the carrier concentration of the I region 1818*b* to become ten to the sixteenth carriers per cubic centimeter (1e16 cm$^{-3}$). In some aspects, carriers flowing to the I region 1818*b* may also cause the carrier concentration of the silicon substrate 1822*b* to change. The diode 1800*b* may permit the source beam to propagate from right to left (e.g., through the I region 1818*b* and the silicon substrate 1822*b*). In the on state, the diode 1800*b* may include a conductivity greater than one thousand siemens per meter.

Figure 20:
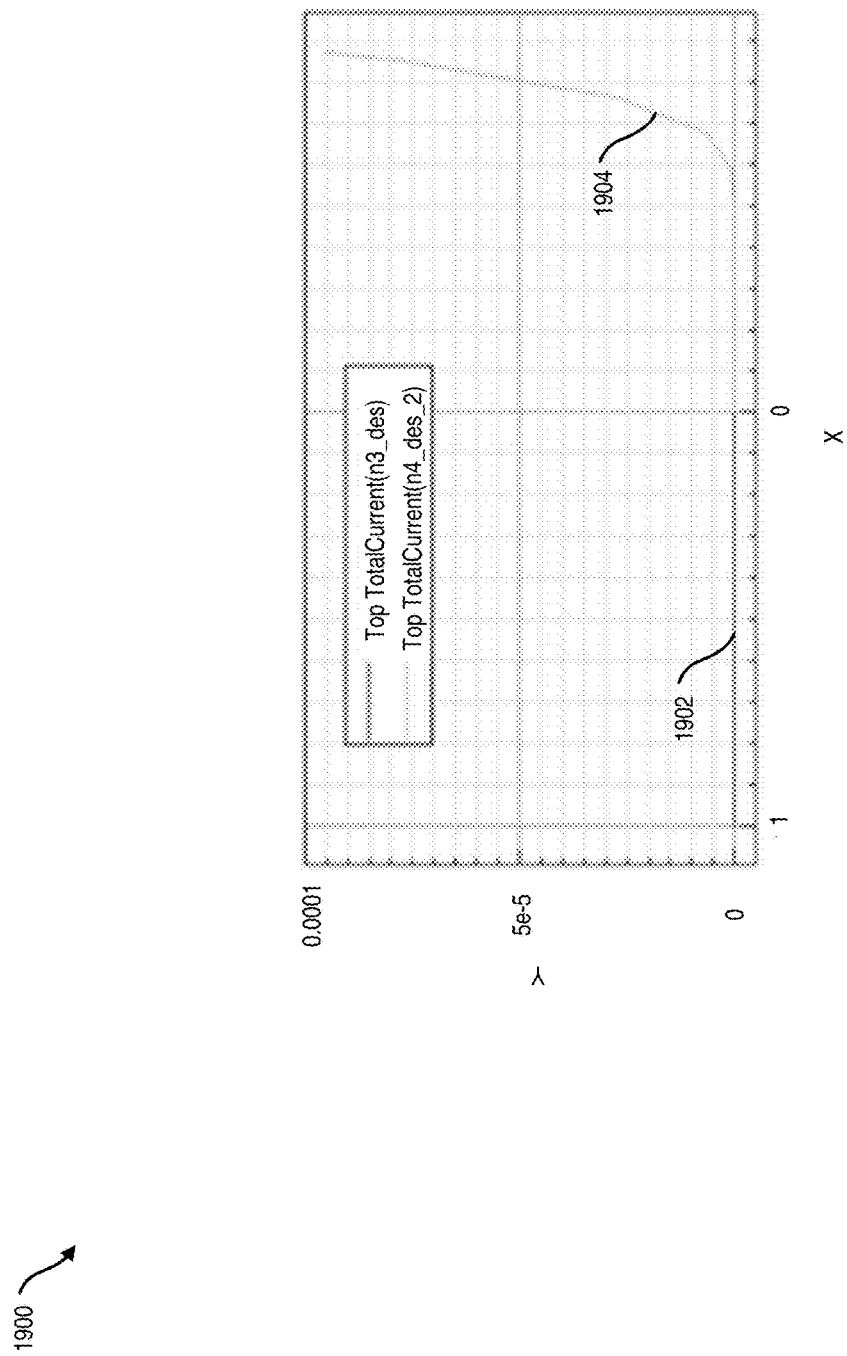
FIG. 20 illustrates a graphical representation of a simulation of current within the diodes of FIG. 19.

FIG. 20 illustrates a graphical representation 1900 of a simulation of current within the diodes 1800 of FIG. 19, in accordance with at least one aspect described in the present disclosure. Curves 1902 and 1904 represent current on the diodes 1800 in the off state and the on state, respectively. For the simulation, a temperature was set to room temperature and a power consumption of 0.08 milliwatts occurred at transition from the off state to the on state. During the simulation, a power consumption of up to 0.17 milliwatts was measured at temperatures between negative thirty-five Celsius and sixty-five Celsius.

Figure 21:
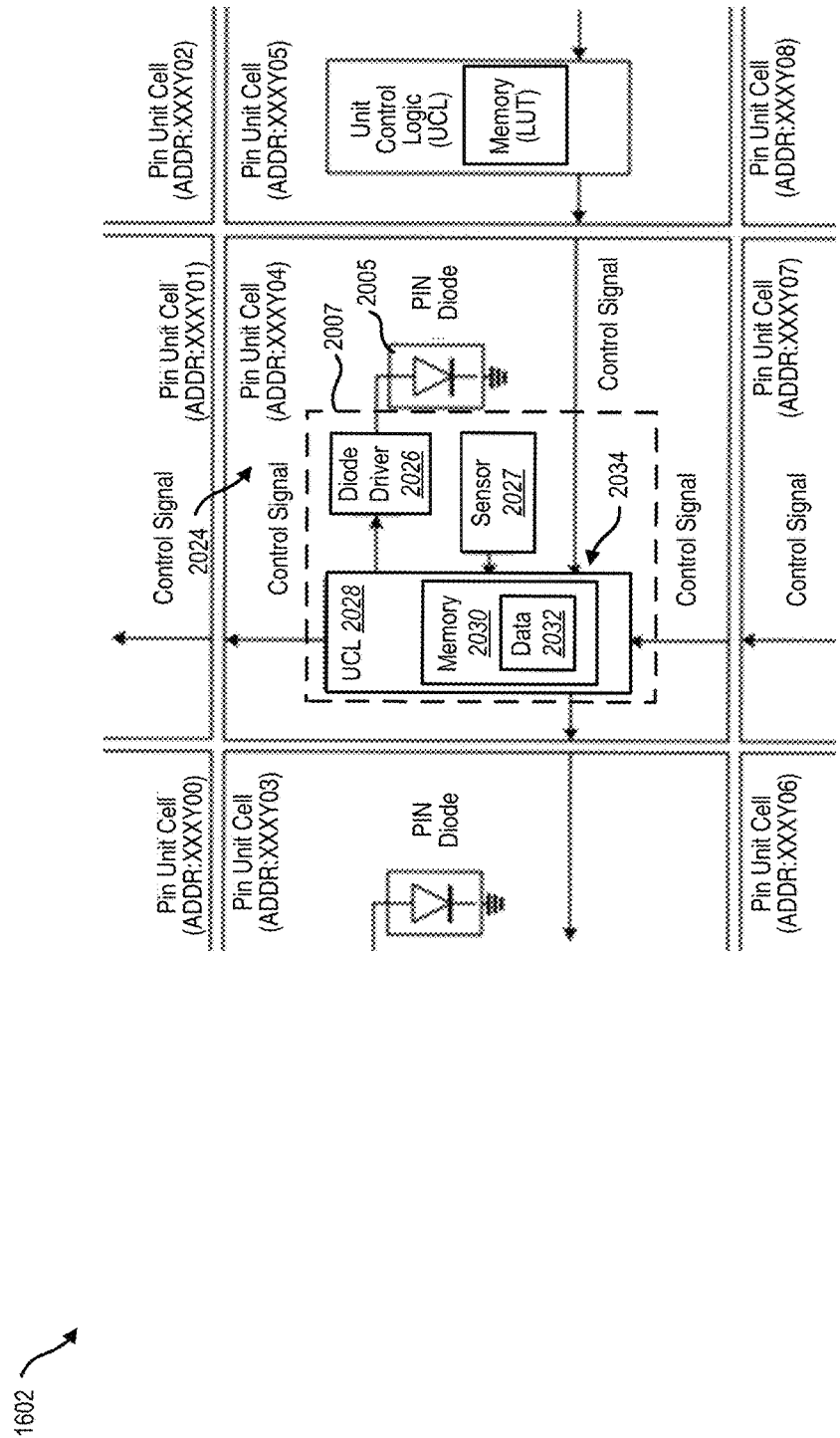
FIG. 21 illustrates an example pixel of the reconfigurable aperture.

FIG. 21 illustrates an example pixel 2024 of the reconfigurable aperture 1602, in accordance with at least one aspect described in the present disclosure. In FIG. 21, a single pixel 2024 is numbered and discussed for simplicity of illustration and discussion. The pixel 2024 may include a control circuit 2007 and a diode 2005. The control circuit 2007 may correspond to the control circuits 1607 described in the present disclosure. The diode 2005 may correspond to diodes 1605 and 1800a-b described in the present disclosure. The control circuit 2007 may include a diode driver 2026, a sensor 2027, and a unit control logic (UCL) 2028. The UCL 2028 may include a memory 2030 in which data 2032 may be stored.

The diode driver 2026 may be operatively coupled to the diode 2005. In some aspects, the sensor 2027 may be physically positioned proximate the diode 2005. The UCL 2028 may be operatively coupled to the diode driver 2026 and the sensor 2027. In addition, the UCL 2028 may include a communication interface 2034 that is operatively coupled to one or more UCLs of different pixels.

The UCL 2028 may provide a signal to the diode driver 2026 based on a control signal and various measurements corresponding to the diode 2005. The diode driver 2026 may generate a voltage signal based on the signal. The diode driver 2026 may generate the voltage signal as a control voltage based on the signal. In some aspects, the diode driver 2026 may generate the voltage signal as a control current. In some aspects, the diode driver 2026 may adjust a level of the voltage signal to change the impedance of the diode 2005 (e.g., to bias the diode 2005 as discussed above in relation to FIG. 19). The diode driver 2026 may provide the voltage signal to set the state of the diode 2005. As the diode driver 2026 changes the level of the voltage signal, the impedance of the diode 2005 may also change.

In some aspects, the data 2032 may include a temperature map associated with the diode 2005. The temperature map may indicate a change in operation of the diode 2005 as a temperature of the diode 2005 changes. For example, the temperature map may indicate how much an impedance rating of the diode 2005 changes as the temperature of the diode 2005 changes. In these and other aspects, the data 2032 may include a look up table that includes a table of impedance ratings associated with the diode 2005.

In some aspects, the sensor 2027 may include a temperature sensor. The sensor 2027 may detect the temperature of the diode 2005. In addition, the sensor 20227 may provide a temperature measurement of the diode 2005 to the UCL 2028. The UCL 2028 may compare the measured temperature of the diode 2005 to the temperature, the look up table, or some combination thereof. The UCL 2028 may adjust the signal based on the comparison of the temperature measurement to the temperature, the look up table, or some combination thereof. The UCL 2028 may adjust the signal based on the temperature measurement to maintain the impedance level of the diode 2005.

In some aspects, the sensor 2027 may include a current sensor. The sensor 2027 may detect a current, an impedance, or some combination thereof of the diode 2005. The sensor 2027 may provide an impedance measurement of the diode 2005. In some aspects, the UCL 2028 may determine a performance over process, voltage, and temperature (PVT) of the diode 2005 using the measured temperature of the diode 2005, the impedance of the diode 2005, or some combination thereof.

In some aspects, the control device 1604 (not illustrated in FIG. 21) may include a main control device operatively coupled to the communication interface 2034. The main control device may provide the control signal to the UCL 2028. In these and other aspects, the control signal may include the temperature map or the table of impedance ratings versus temperature associated with the diode 2005.

Figure 22:
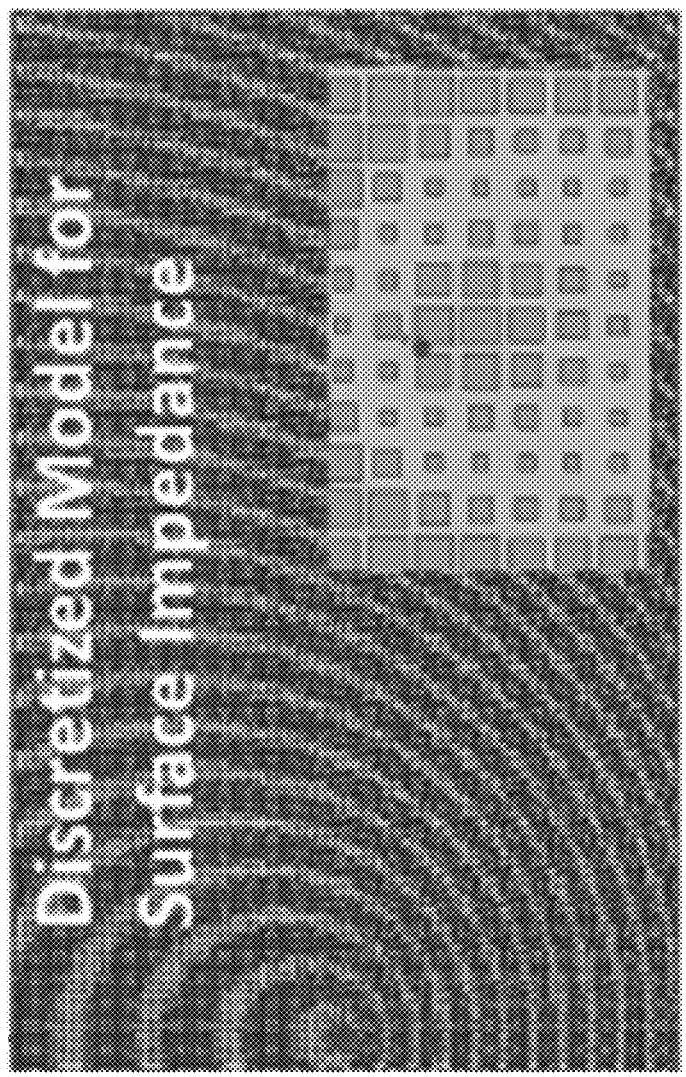
FIG. 22 illustrates an example discretized model for surface impedance.

FIG. 22 illustrates an example discretized model 2100 for surface impedance, in accordance with at least one aspect described in the present disclosure. The discretized model 2100 may be based on an impedance surface holographic pattern with different sizes of patches within the reconfigurable aperture 1602. The discretized model 2100 may illustrate elevation beam scanning at thirty degrees and a frequency of seventeen gigahertz.

Figure 23:
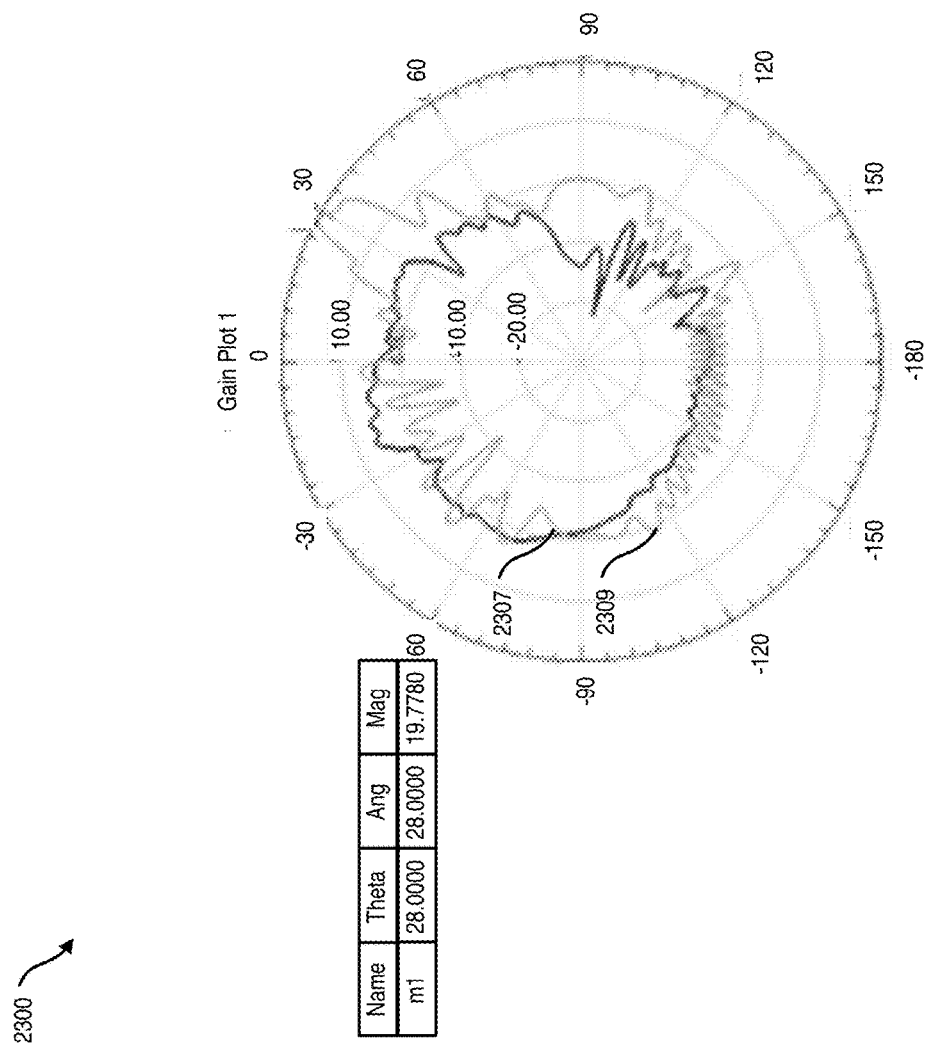
FIG. 23 illustrates a graphical representation of a gain plot for beam scanning in the elevation plane.

FIG. 23 illustrates a graphical representation 2300 of a gain plot for beam scanning in the elevation plane, in accordance with at least one aspect described in the present disclosure. Curves 2307 and 2309 represent a beam scanning pattern of the reconfigurable aperture 1602 at two different impedance levels. The gain plot was measured using simulated signals at seventeen gigahertz. As illustrated in FIG. 23, the radiation patterns of the reconfigurable aperture 1602 are different for the different impedance levels.

Figure 24:
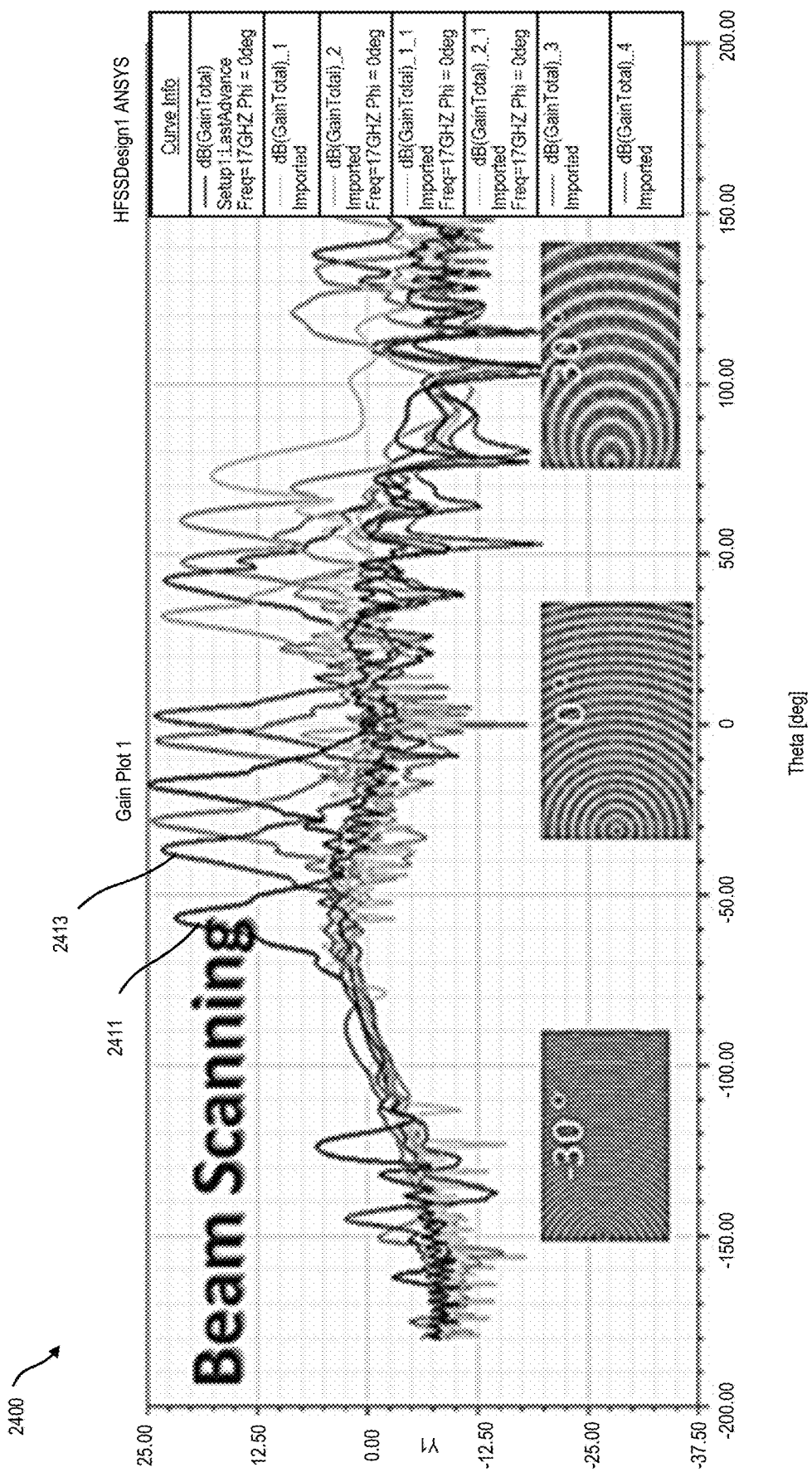
FIG. 24 illustrates a graphical representation of another gain plot for beam scanning in the elevation plane.

FIG. 24 illustrates a graphical representation 2400 of another gain plot for beam scanning in the elevation plane, in accordance with at least one aspect described in the present disclosure. Curves 2411 and 2413 represent a beam scanning pattern of the reconfigurable aperture 1602 at different impedance levels. In FIG. 24, only curve 2411 and 2413 are numbered for simplicity of illustration. As illustrated in FIG. 24, the radiation patterns of the reconfigurable aperture 1602 are different for the different impedance levels and for different angles of scanning.

Figure 25:
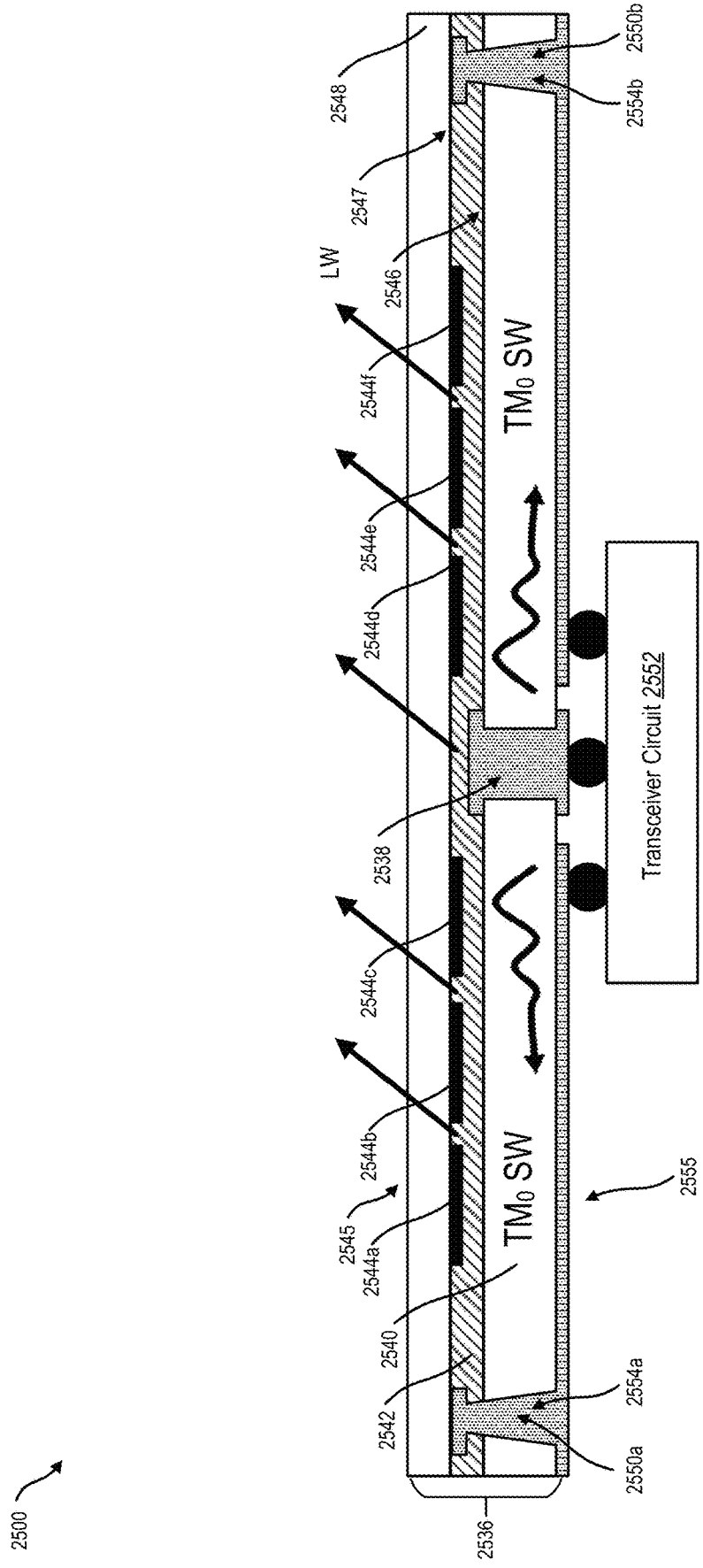
FIG. 25 illustrates a sectional view of an example system.

FIG. 25 illustrates a sectional view of an example system 2500, in accordance with at least one aspect described in the present disclosure. The system 2500 may include a packaged module 2536 and a transceiver circuit 2552. The system 2500 may also include the control device 1604 (not illustrated in FIG. 25). The packaged module 2536 may include a wave source 2538, a package substrate layer 2540, a bonding substrate layer 2542, a bottom layer 2555, a silicon substrate layer 2548, and control vias 2550a-b. A reconfigurable hologram layer 2545 may be formed by multiple device pixelated patches 2544a-f on the silicon substrate layer 2548. The silicon substrate layer 2548 may include control busses 2554a-b.

In some aspects, the bonding substrate layer 2542 may be physically attached to a surface 2546 of the package substrate layer 2540. The patches 2544a-f may be arranged in a pattern relative to the surface 2546 of the package substrate layer 2540, the bonding substrate layer 2542, or some combination thereof. The silicon substrate layer 2548 may be physically attached to a surface 2547 of the bonding substrate layer 2542.

The patches 2544a-f may include multiple diodes 1605 (not individually illustrated in FIG. 25) and the control busses 2554a-b may be operatively coupled to the diodes 1605. In addition, the control device 1604 may be operatively coupled to the reconfigurable hologram layer 2545 via the control busses 2554a-b and the control vias 2550a-b. The bottom layer 2555 may be physically positioned proximate the package substrate layer 2540 and may be grounded. The control vias 2554 may be physically positioned at a periphery of the packaged module 2536. In addition, the control vias 2554 may be operatively coupled to the control busses 2550a-b. The transceiver circuit 2552 may be electrically coupled to the wave source 2538.

The transceiver circuit 2552 may provide a radio frequency signal to the wave source 2538. The wave source 2538 may provide a surface wave based on the radio frequency signal. The surface wave may propagate predominantly at the non-grounded boundary 2546 of the package substrate layer 2540. The surface wave is illustrated in FIG. 25 as curved arrows pointed away from the wave source 2538 within the package substrate layer 2540. The reconfigurable hologram layer 2545 may receive the surface wave and provide a radiated leaky wave (e.g., the output beam). The reconfigurable hologram layer 2545 may provide the radiated leaky wave based on an impedance of the reconfigurable hologram layer 2545 (e.g., the impedance level of the diodes 1605 within the pixelated patches 2544a-f) and the surface wave. In FIG. 25, the radiated leaky wave is illustrated as diagonal arrows pointed away from the surface 2547 of the reconfigurable hologram layer 2545.

The control device 1604 may control the impedance of the diodes 1605 within the patches 2544a-f to configure and reconfigure the beam pattern of the output beam on the fly. In some aspects, the control device 1604 may control the diodes 1605 within the patches 2544a-f via the control busses 2554a-b. For example, the control vias 2550a-b may propagate control signals from the control device 1604 to the control busses 2554a-b, which may provide the control signals to the patches 25444a-f (e.g., the diodes 1605 within the patches 2544a-f).

Figure 26:
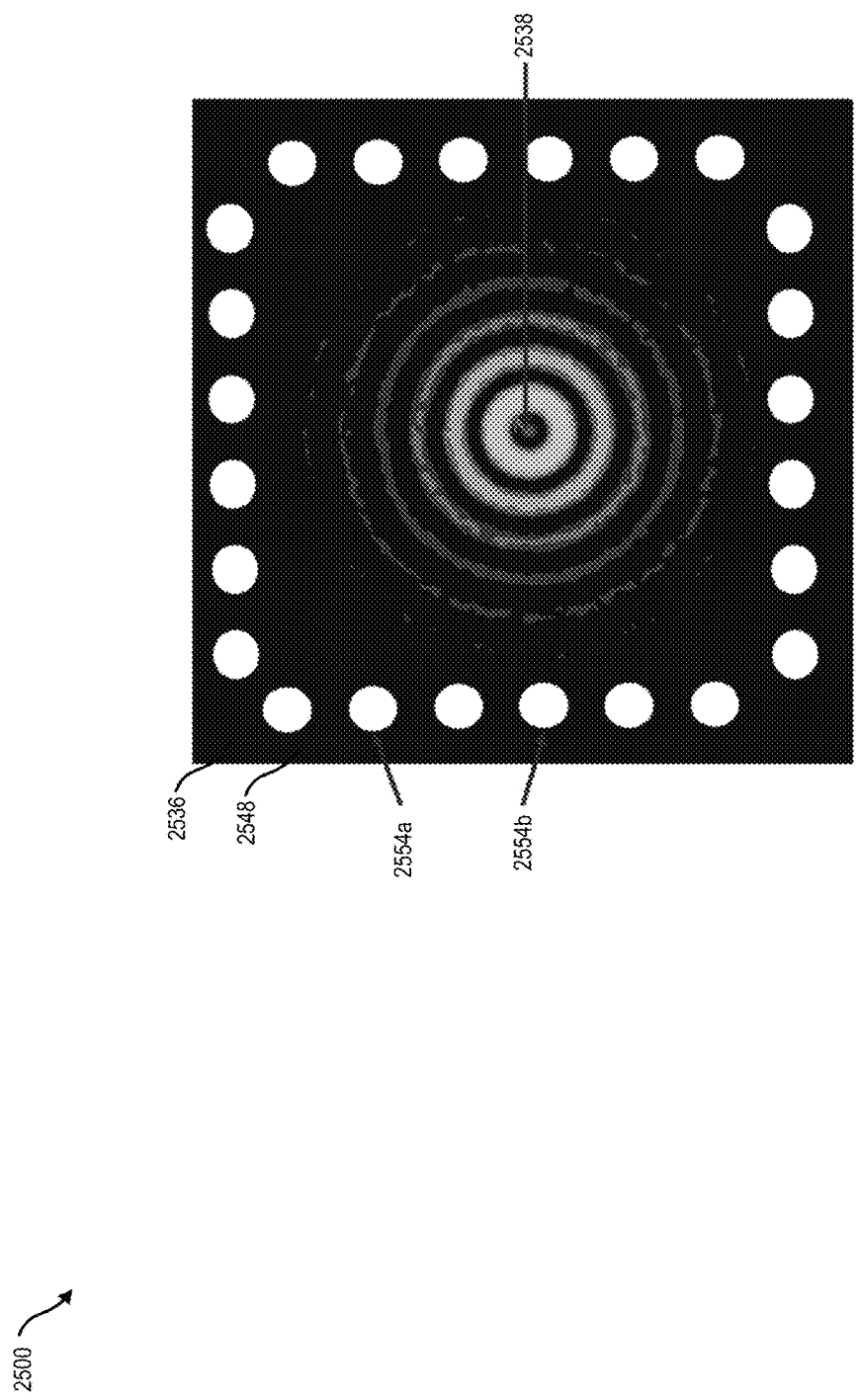
FIG. 26 illustrates a top view of the example system.

FIG. 26 illustrates a top view of the example system 2500, in accordance with at least one aspect described in the present disclosure. FIG. 26 illustrates the surface wave as a decaying magnetic field as the surface wave propagates predominantly at the non-grounded boundary 2546 of the package substrate layer 2540 away from the wave source 2538. The system 2500 may include the control busses 2554a-b proximate edges of the system 2500 to reduce interference caused by the control signals, the surface wave, or some combination thereof. In FIG. 26, only two control busses are numbered 2554a-b in FIG. 26 for ease of illustration.

Figure 27:
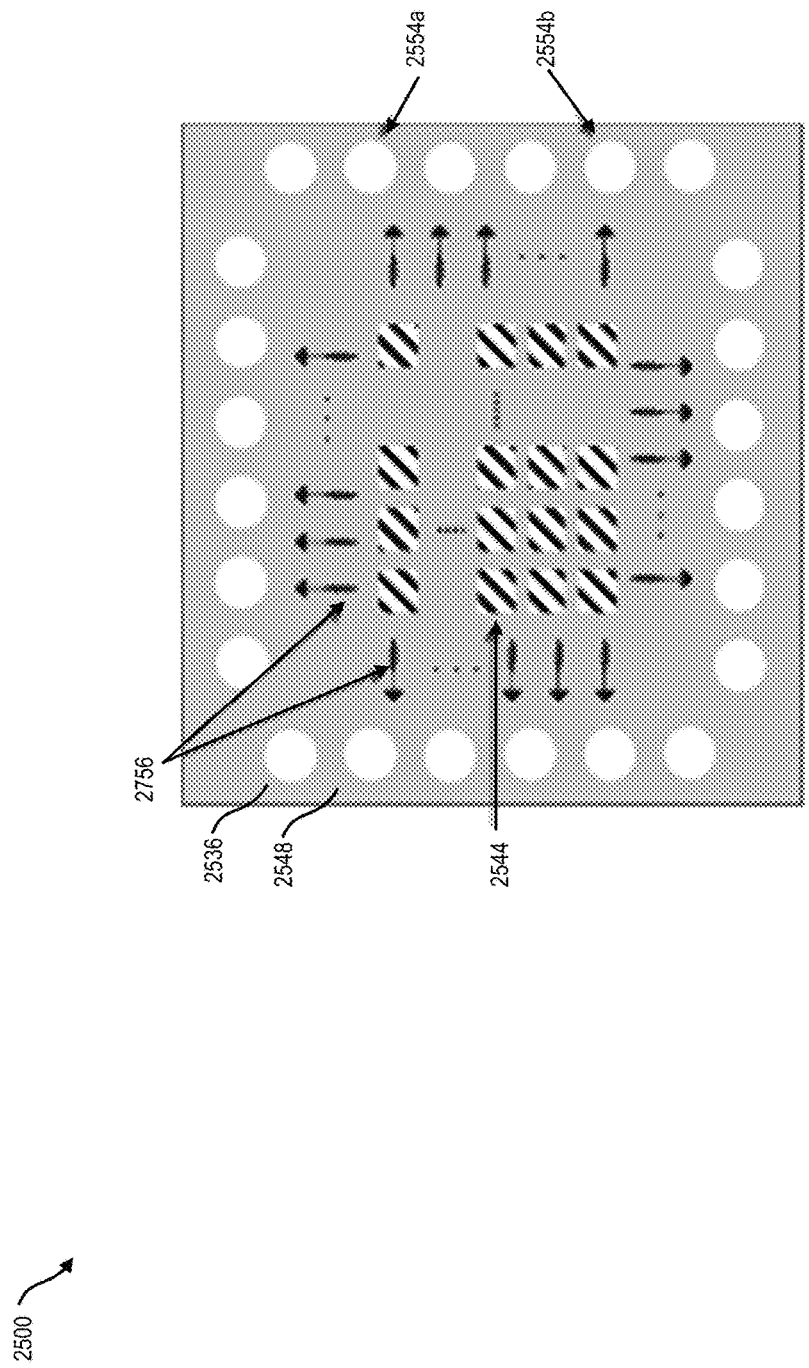
FIG. 27 illustrates a bottom view of the example system.

FIG. 27 illustrates a bottom view of the example system 2500, in accordance with at least one aspect described in the present disclosure. The system 2500 may also include termination resistors 2756. In FIG. 27, only two termination resistors 2756 are numbered for ease of illustration. The termination resistors 2756 may be physically positioned around the patches 2544 to terminate residual surface wave. In FIG. 27, a single patch 2544 is numbered for ease of illustration.

Figure 28:
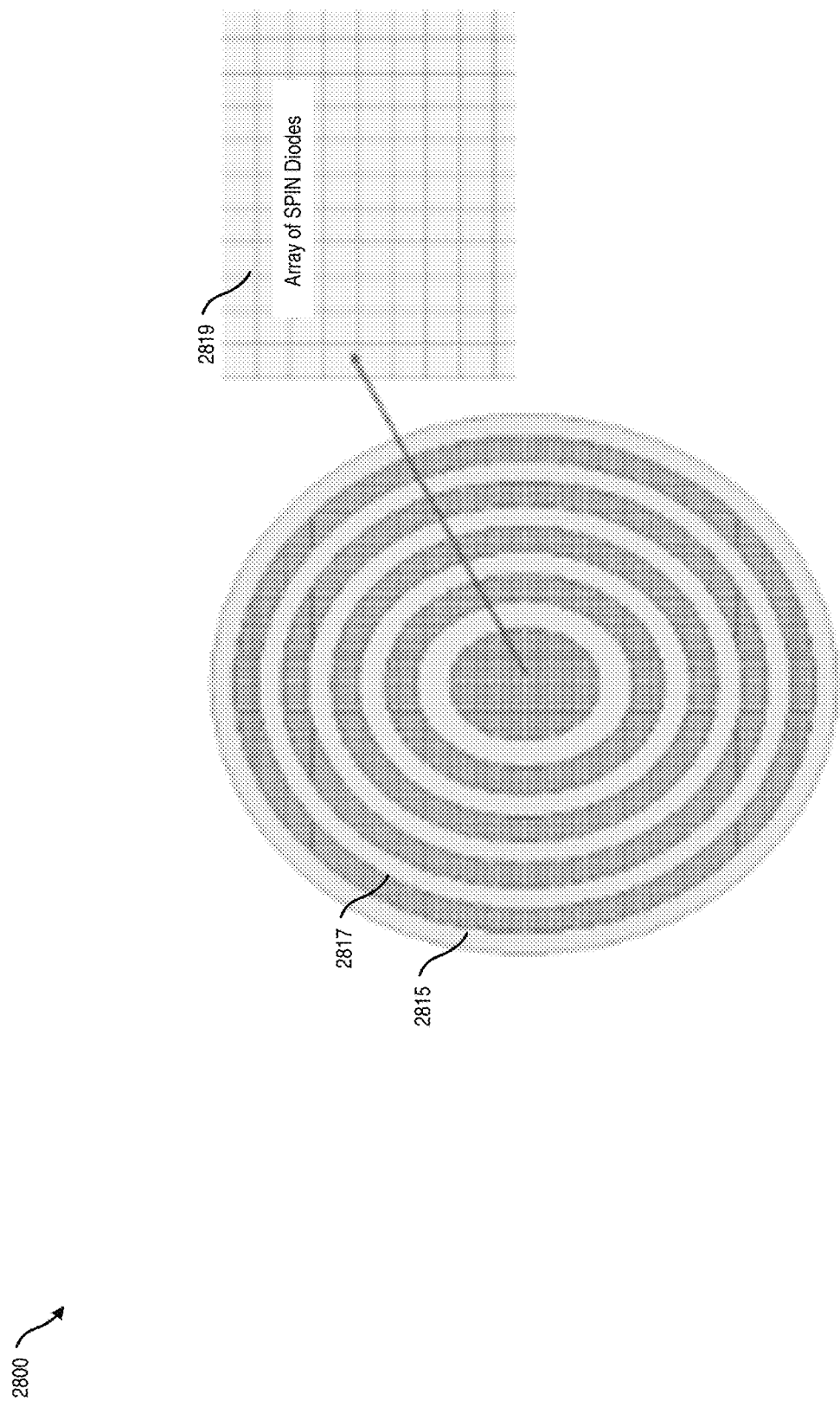
FIG. 28 illustrates an example reconfigurable aperture.

FIG. 28 illustrates an example reconfigurable aperture 2800, in accordance with at least one aspect described in the present disclosure. The reconfigurable aperture 2800 may correspond to the reconfigurable aperture 1602 or the reconfigurable hologram layer 2545 described in the present disclosure. The reconfigurable aperture 2800 may include dynamic portions 2815 at a first conductivity level and dynamic portions 2817 at a second conductivity level. In FIG. 28, a single dynamic portion 2815 at the first conductivity level and a single dynamic portion 2817 at the second conductivity level are numbered and discussed for simplicity of illustration and discussion.

The dynamic portions 2815 and 2817 may be arranged in elliptical patterns. Each of the dynamic portions 2815 and 2817 may include multiple diodes 1605 (not individually illustrated in FIG. 28) for the control device 1604 (not illustrated in FIG. 28) to configure and reconfigure conductivity of the dynamic portions 2815 and 2817. For example, the dynamic portion 2815 may include a conductivity of one thousand siemens per meter or higher and the dynamic portion 2817 may include a conductivity of one hundred siemens per meter or lower.

The reconfigurable aperture 2800 may provide broadside radiation of the output beam. Semi-major and semi-minor axis of the reconfigurable aperture 2800 may be positioned, shaped, sized, or some combination thereof based on a focal distance of a feeding antenna relative to the diffractive aperture and the beam-widths in Azimuth and Elevation Planes.

Figure 29:
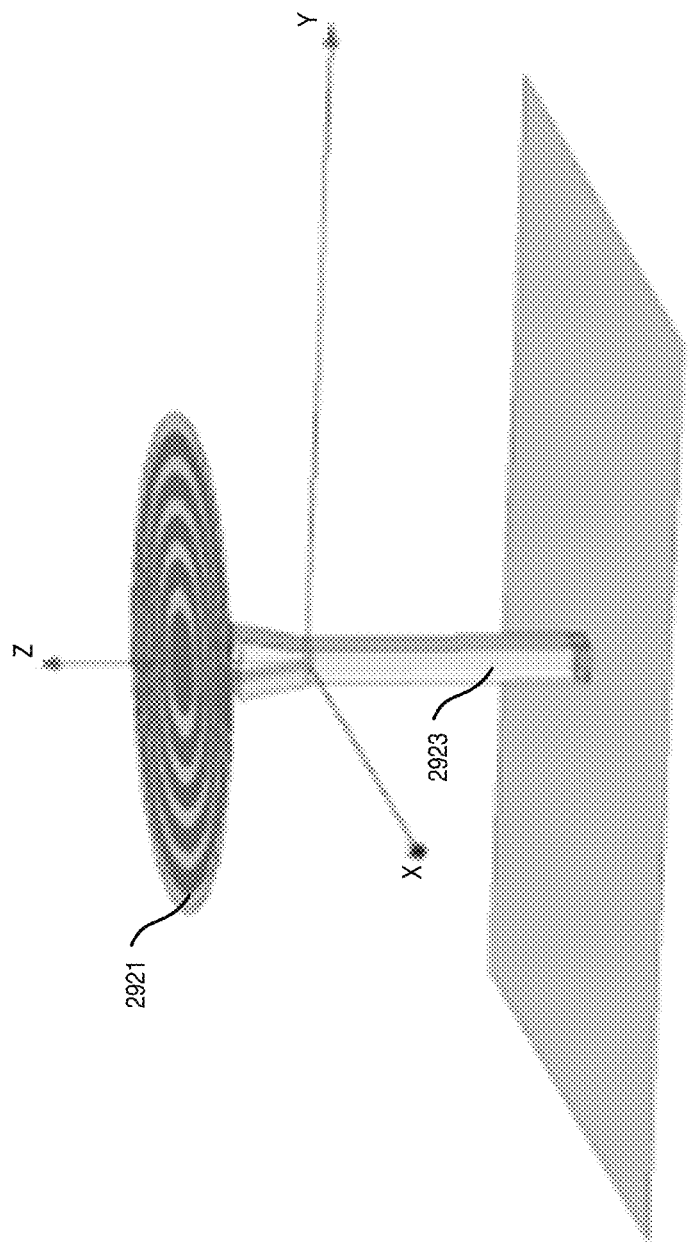
FIG. 29 illustrates an example reconfigurable aperture implemented with a horn antenna.

FIG. 29 illustrates an example reconfigurable aperture 2921 implemented with a horn antenna 2923, in accordance with at least one aspect described in the present disclosure. The reconfigurable aperture 2921 may correspond to the reconfigurable aperture 1602 or the reconfigurable hologram layer 2545 described in the present disclosure. The reconfigurable aperture 2921 may include dynamic portions at different conductivity levels similar to the reconfigurable layer 2800 discussed above.

Figure 30:
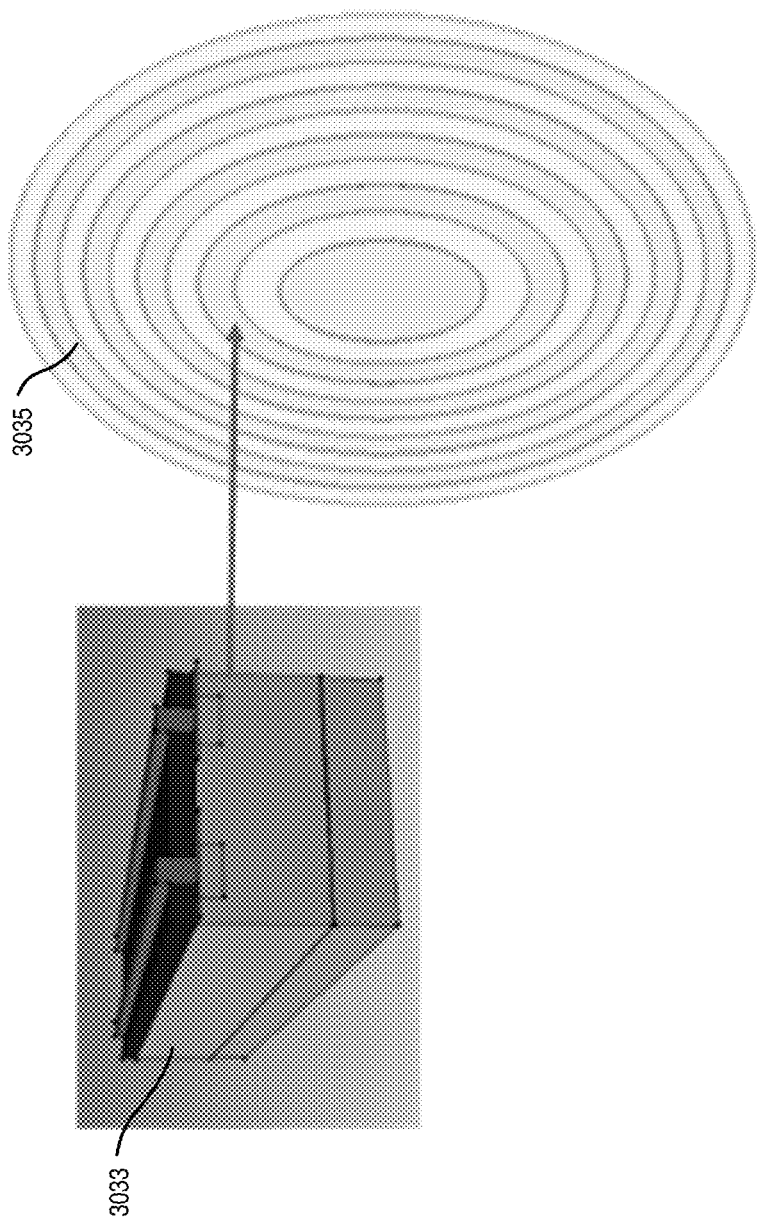
FIG. 30 illustrates an example sequence of integration of a reconfigurable aperture and a diode.

FIG. 30 illustrates an example sequence of integration of a reconfigurable aperture 3035 and a diode 3033, in accordance with at least one aspect described in the present disclosure. The reconfigurable aperture 3035 may correspond to the reconfigurable aperture 1602 or the reconfigurable hologram layer 2545 described in the present disclosure. The diode 3033 may correspond to the diodes 1605 described in the present disclosure. For the simulation, the reconfigurable aperture 3035 was configured to scan in the Elevation planes at a tiled angle of 10 degrees.

Figure 31:
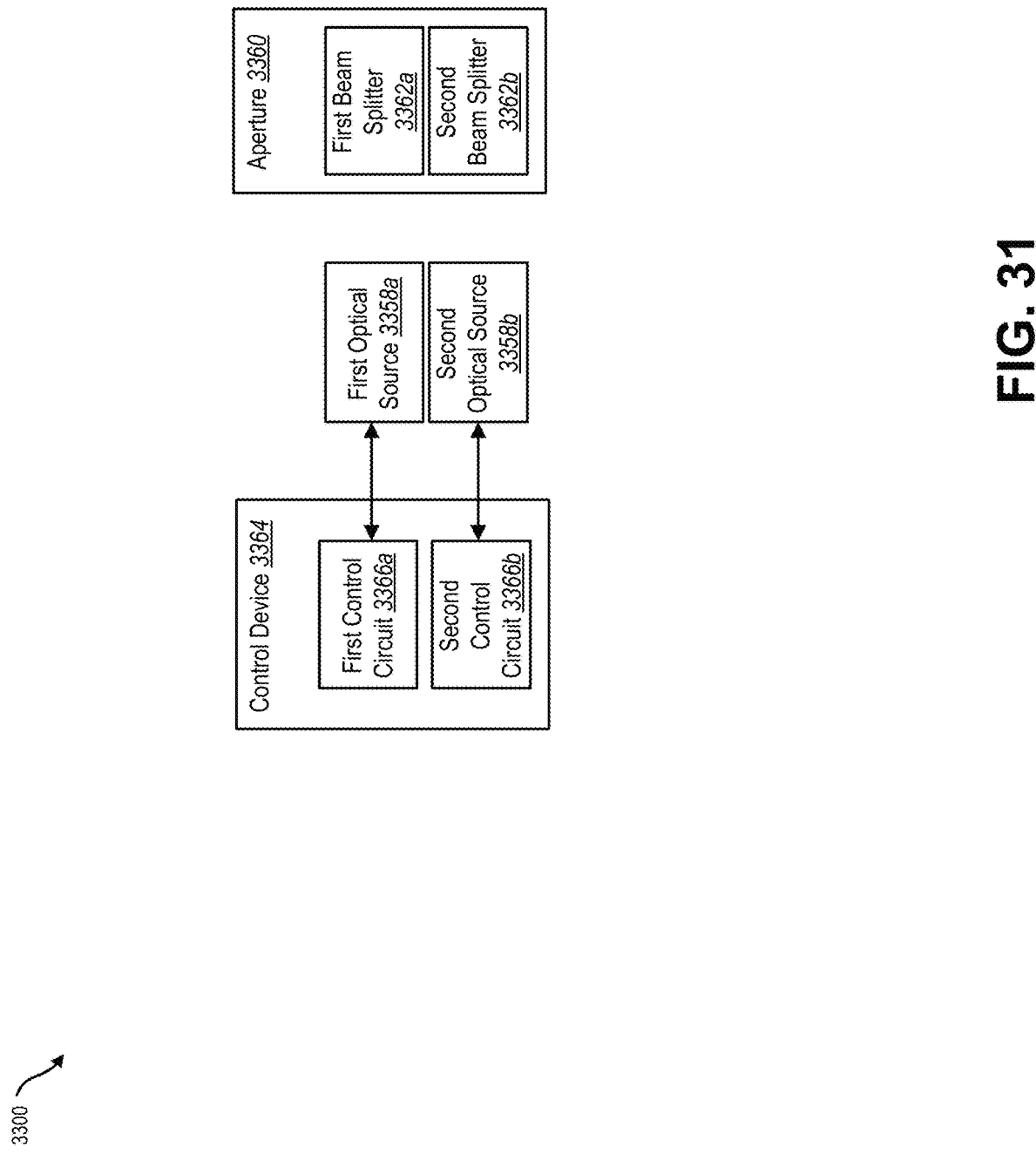
FIG. 31 illustrates a block diagram of an example lens antenna system.

FIG. 31 illustrates a block diagram of an example lens antenna system 3300, in accordance with at least one aspect described in the present disclosure. The lens antenna system 3300 may include a control device 3364, a first optical source 3358a, a second optical source 3358b, and an aperture 3360. The control device 3364 may include a first control circuit 3366a and a second control circuit 3366b (referenced collectively in the present disclosure as "control circuits 3366"). The aperture 3360 may include a first beam splitter 3362a and a second beam splitter 3362b (referenced collectively in the present disclosure as "beam splitters 3362"). The control device 3364 may operate the same as or similar to the control device 1604 described elsewhere in the present disclosure. In addition, the control circuits 3366 may operate the same as or similar to the control circuit 1607 described elsewhere in the present disclosure.

The aperture 3360 is illustrated as including only the first beam splitter 3362a and the second beam splitter 3362b for simplicity of illustration and discussion. The aperture 3360 may include any appropriate number of beam splitters 3362. In addition, the control device 3364 is illustrated as including only the first control circuit 3366a and the second control circuit 3366b for simplicity of illustration and discussion. The control device 3364 may include any appropriate number of control circuits 3366. The lens antenna system 3300 is illustrated as including only the first optical source 3358a and the second optical source 3358b for simplicity of illustration and discussion. The lens antenna system 3300 may include any appropriate number of optical sources 3358.

The control device 3364 may be operatively coupled to the optical sources 3358. The beam splitters 3362 may be physically positioned on a surface of the aperture 3360 and proximate the optical sources 3358. The optical sources 3358 may be arranged in a pixelated pattern and the beam splitters 3362 may be arranged in a corresponding pixelated pattern.

The optical sources 3358 may provide an optical source signal. The aperture 3360 (e.g., the beam splitters 3362) may receive the optical source signal and may provide an output optical signal. The aperture 3360 may provide the output optical signal based on a beam splitting configuration of the beam splitters 3362 and the optical source signal.

The control device 3364 may control the optical sources 3358 to configure and reconfigure a mode of the output optical signal on the fly. In addition, the beam splitters 3362 may include the beam splitting configuration and may permit at least a portion of the optical signal to propagate the aperture 3360 as the output optical signal.

Figure 32:
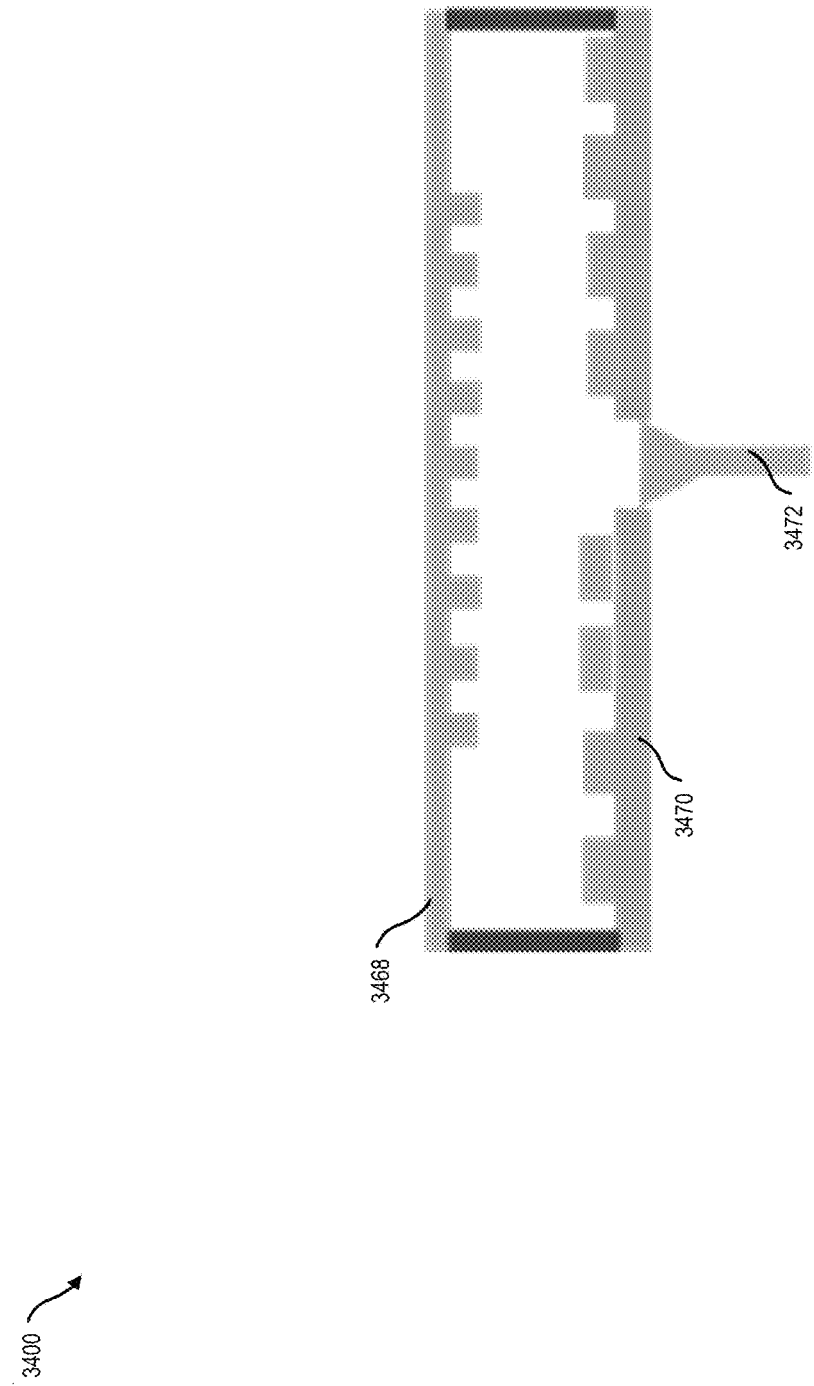
FIG. 32 illustrates a block diagram of an example lens antenna system.

FIG. 32 illustrates a block diagram of an example lens antenna system 3400, in accordance with at least one aspect described in the present disclosure. The lens antenna system 3400 may include an antenna 3472, a twister 3470, and a polarizer 3468. The polarizer 3468 may include strips of material to linearly polarize signals. The polarizer 3468 may permit waves orthogonal to the strips to propagate and radiate. In addition, the polarizer 3468 may block waves parallel to the strips. The twister 3470 may perform phase compensation of waves.

The antenna 3472 may provide the source beam. The twister 3470 may provide a polarized beam based on a phase configuration of the twister 3470 and the source beam. The polarizer 3468 may provide an output beam based on a polarization configuration of the polarizer 3468, the source beam, and the polarized beam. In some aspects, the phase configuration of the polarizer may include the configuration of the strips of material.

Figure 33:
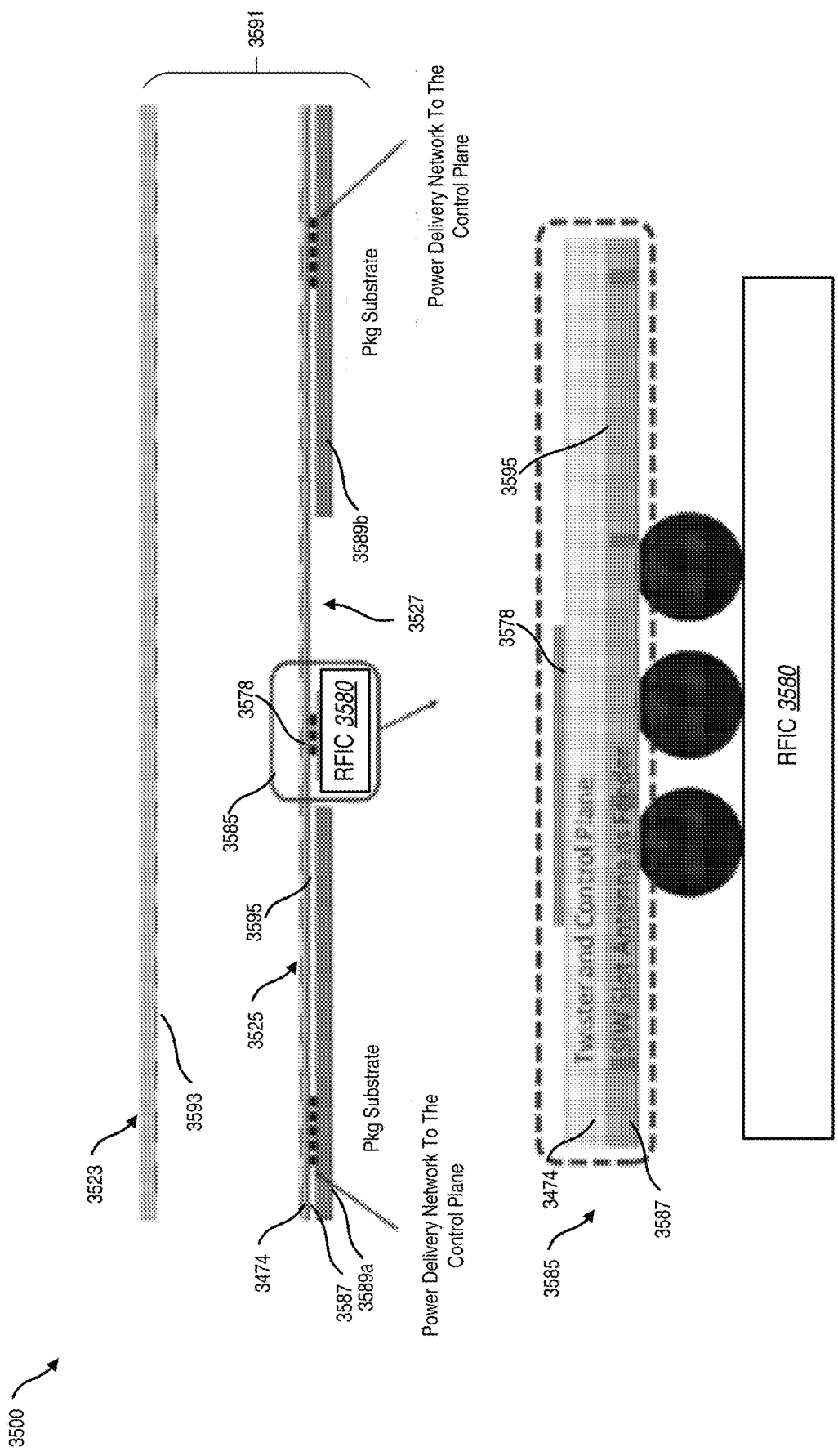
FIG. 33 illustrates a block diagram of an example lens antenna system.

FIG. 33 illustrates a block diagram of an example lens antenna system 3500, in accordance with at least one aspect described in the present disclosure. The lens antenna system 3500 may include an antenna 3527, a reconfigurable twister 3525, a polarizer 3523, and the control device 1604 (not illustrated in FIG. 33). The control device 1604 may be operatively coupled to the reconfigurable twister 3525. In some aspects, the control device 1604 may also be operatively coupled to the polarizer 3523.

The antenna 3527 may include multiple feeding antennas to support multiple FOVs. In addition, the reconfigurable twister 3525 may include the diodes 1605 (not individually illustrated in FIG. 33). The reconfigurable twister 3525 may include a phase configuration that is based on impedances of patches 3578 of the diodes 1605. In addition, the polarizer 3523 may include a polarization configuration based on strips of silicon 3593 within the polarizer 3523.

The polarizer 3523 may also include the diodes 1605 (not illustrated in FIG. 33). The polarizer 3523 may include a phase configuration that is based on impedances of patches of the diodes 1605. In addition, the polarizer 3523 may include a polarization configuration based on strips of silicon 3593 within the polarizer 3523.

The antenna 3527 may provide a source beam. The reconfigurable twister 3525 may receive the source beam and provide a polarized beam. The reconfigurable twister 3525 may provide the polarized beam based on the phase configuration and the source beam. The polarizer 3523 may receive the source beam and the polarized beam. In addition, the polarizer 3523 may provide an output beam based on the polarization configuration, the source beam, and the polarized beam.

The control device 1604 may control the impedance of the reconfigurable twister 3525 (e.g., may control the diodes 1605) to configure and reconfigure the phase configuration of the reconfigurable twister 3525 and the beam pattern of the output beam on the fly. In some aspects, the control device 1604 may bias the diodes 1605 within the patches 3578 as discussed above.

The control device 1604 may control the impedance of the polarizer 3523 (e.g., may control the diodes 1605) to configure and reconfigure the phase configuration of the polarizer 3523 and the beam pattern of the output beam on the fly. In some aspects, the control device 1604 may bias the diodes 1605 within the patches within the polarizer 3523 as discussed above.

In some aspects, the lens antenna system 3500 may include a chip assembly 3591. The chip assembly 3591 may include a RFIC 3580, the polarizer 3523, the antenna 3527, and the reconfigurable twister 3525. The polarizer 3523 may include a layer that includes the strips of silicon 3593. A single strip of silicon 3593 is numbered in FIG. 33 for ease of illustration. The chip assembly 3591 may also include a package substrate 3589*a-b* to provide power and operatively couple the control device 1604 to the chip assembly 3591.

The reconfigurable twister 3525 may include multiple patches of silicon 3578. A single patch of silicon 3578 is numbered in FIG. 33 for ease of illustration. In addition, the reconfigurable twister 3525 may include a twister layer 3474 physically positioned proximate the patches of silicon 3578. The twister layer 3474 may extend from the antenna 3527 towards to the strips of silicon 3593 of the polarizer 3523.

The antenna 3527 may include an antenna layer 3587. The antenna layer 3587 may include silicon on chip substrate integrated waveguides electrically coupled to the RFIC 3580. In addition, the antenna layer 3587 (e.g., the silicon on chip substrate integrated waveguides) may be physically positioned between the RFIC 3580 and the patches of silicon 3578. The chip assembly 3591 may also include a control plane 3595 operatively coupled to the twister layer 3474 and the control device 1604. The control plane 3595 may extend from the antenna to the twister layer 3474. A close up of a portion 3585 of the chip assembly 3591 is shown to provide more details of the various layers.

The RFIC 3580 may provide the source waveforms to the antenna 3527. In addition, the control plane 3595 may provide control signals from the control device 1604 to the diodes 1605 within the patches 3578 or the diodes 1605 within the polarizer 3523.

The lens antenna system 3500 may operate within multiple different phase states (e.g., the reconfigurable twister 3525 may operate within multiple different phase states).

Figure 34:
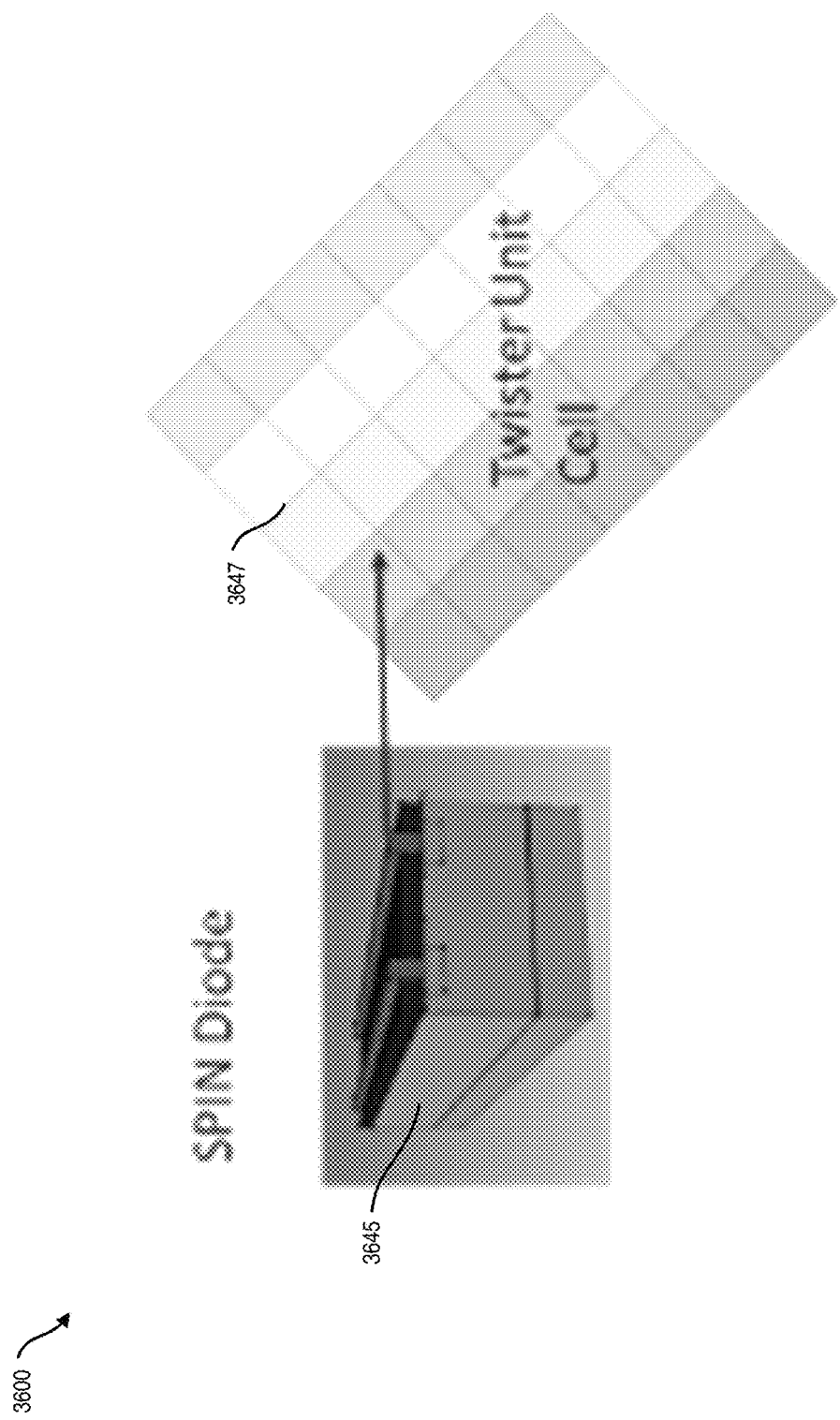
FIG. 34 illustrates an example sequence of integration of a reconfigurable patch and a diode.

FIG. 34 illustrates an example sequence of integration of a reconfigurable patch 3647 and a diode 3645, in accordance with at least one aspect described in the present disclosure. The reconfigurable patch 3647 may correspond to the patch 1710 or patches of silicon 3578 described in the present disclosure. The diode 3645 may correspond to the diodes 1605 described in the present disclosure. The control device 1604 may control each column, each row, or some combination of columns and rows of the patch 3647 to configure or reconfigure the impedance of the reconfigurable patch 3647.

Figure 35:
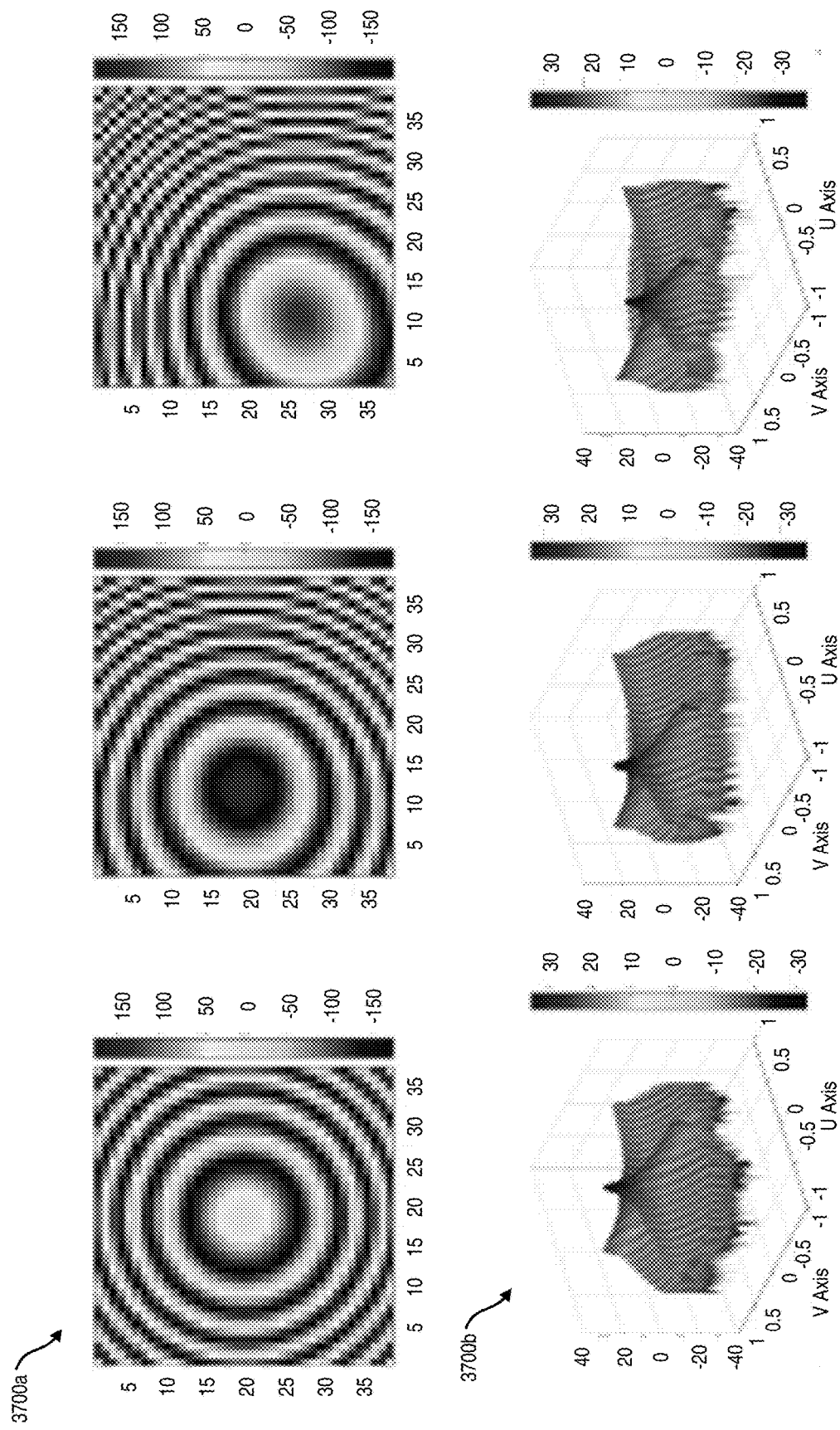
FIG. 35 illustrates graphical representations of FOVs and phase profiles of the reconfigurable aperture.

FIG. 35 illustrates graphical representations 3700*a-b* of FOVs and phase profiles 3700*b* of the reconfigurable aperture 1602, in accordance with at least one aspect described in the present disclosure.

Figure 36:
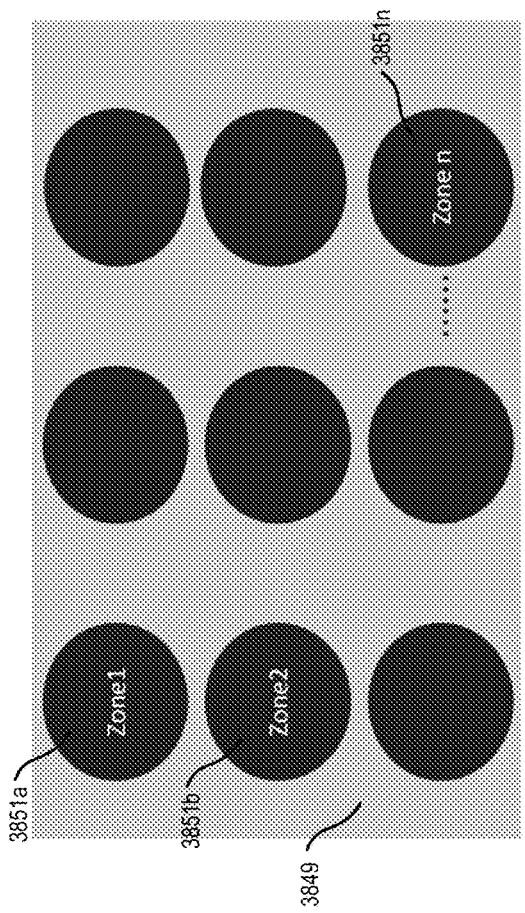
FIG. 36 illustrates an example reconfigurable aperture that includes different zones to reconfigure an impedance of the reconfigurable aperture.

FIG. 36 illustrates an example reconfigurable aperture 3800 that includes different zones 3851*a-n* to reconfigure an impedance of the reconfigurable aperture 3800, in accordance with at least one aspect described in the present disclosure. The reconfigurable aperture 3800 may correspond to the reconfigurable aperture 1602 described in the present disclosure. Each of the different zones 3851*a-n* may include the diodes 1605 (not individually illustrated in FIG. 36). The control device 1604 may control the diodes 1605 within the zones 3851*a-n* as described elsewhere in the present disclosure. The zones 3851*a-n* may be positioned in any appropriate pattern. The reconfigurable aperture 3800 may include any appropriate number of zones 3851*a-n*. In some aspects, the zones 3851*a-n* may physically contact each other. In other aspects, one or more of the zones 3851*a-n* may be electrically isolated from each other.

In some aspects, a lens antenna system may include a reconfigurable aperture or a reconfigurable twister along with a control device. The reconfigurable aperture or the reconfigurable twister may include diodes arranged a pixelated pattern. The control device may bias the diodes to control an impedance of the reconfigurable aperture or the reconfigurable twister. In some aspects, the reconfigurable aperture or the reconfigurable twister may be configured to generate an output beam with a spatial radiation beam pattern. The control device may control the impedance of the reconfigurable aperture or the reconfigurable twister to control the FOV, perform beam scanning, suppress sidelobes, perform null steering, or some combination thereof.

The lens antenna system may perform beam scanning to detect new devices within a wireless network. The reconfigurable aperture or the reconfigurable twister may receive a source beam and provide the output beam. The reconfigurable aperture or the reconfigurable twister may provide the output beam based on the impedance of the reconfigurable aperture or the reconfigurable twister and the source beam.

In some aspects, the reconfigurable aperture or the reconfigurable twister may include diodes physically positioned on a surface of the reconfigurable aperture or the reconfigurable twister. The diodes may be configured to receive the source beam and provide the output beam. The diodes may provide the output beam based on an impedance of the diodes and the source beam. The diodes may include PIN diodes (e.g., PIN diode unitcells) or any other appropriate diode. The type of the diodes may be based on a frequency of the source beam, the output beam, or some combination thereof.

The diodes may be arranged in a pixelated pattern on the surface of the reconfigurable aperture or the reconfigurable twister. In some aspects, the diodes may be arranged in a non-pixelated pattern on the surface of the reconfigurable aperture or the reconfigurable twister.

Each of the diodes may operate in different states independent of each other. One or more of the diodes may operate in different states dependent on other diodes. The diodes may be configured to operate in a first state that permits at least a portion of the source beam to propagate the corresponding diodes. The diodes may also be configured to operate in a second state that prevents the source beam from propagating the corresponding diodes.

The first state may include an on-state mode in a forward bias solid-state plasma condition of the corresponding diodes. The second state may include an off-state mode under open bias of the corresponding diodes.

The diodes (e.g., the PIN diode unitcells) may include off-state modes under open bias and on-state modes under forward bias solid-state plasma conditions. The diodes may include different carrier concentrations for each of the states. For example, the diodes may include a higher carrier concentration when in the on state and a lower carrier concentration when in the off state. The diodes including a higher carrier concentration may increase a conductivity of the diodes. The diodes including a lower carrier concentration may reduce a conductivity of the diodes. Higher conductivity of the diodes may cause the diodes to operate as a radiation source or as a reflector. In addition, lower conductivity of the diodes may cause the diodes to permit the RF waves to pass through the diodes.

The diodes may include a structure to support unit cell operation modes. Each of the diodes may include a P region, a N region, and an I region. The control device may bias the P regions and the N regions to control the impedance of the I region and the state of the corresponding diodes.

The I region may be physically positioned between the P region and the N-region. The I region may physically contact the P region and the N region. In some aspects, a range of impedance values of the impedance of the I region may be based on a distance between the P region and the N region. For example, when a fixed bias (e.g., 1.5 volts) is applied to cross the P region and the N region, the impedance of the I region may vary based on the distance between the P region and the N region (e.g., vary roughly 2.5 times between a distance of one hundred um compared to eighty um).

Each of the diodes may also include a buried oxide region physically positioned proximate the P region, the I region, and the N region. The range of impedance values of the impedance of the I region may be further based on a thickness of the P region, the N region, and the I region on top of the buried oxide region.

In some aspects, the I region may be increased to increase an impedance of the I region and to lower power consumption of the diodes in the on-state. For example, the diode structure may be designed to increase a separation between the P region and the N region by increasing a length of the I region. As another example, the diode structure may be designed to reduce the thickness of the P region, the N region, the I region, or some combination thereof on top of the buried oxide region.

In some aspects, a voltage for each diode in the on state may be substantially 1.2 volts. In these and other aspects, a voltage for each diode in the off state may be substantially zero volts.

In some aspects, for open bias of the diodes, the control device may provide a negative voltage to the P region and the N region to prevent current from flowing through the I region. In these and other aspects, for forward bias of the diodes, the control device may provide a positive voltage to the P region and the N region to permit current to flow through the I region.

In some aspects, the on state of the diodes may include an analog state. The analog state may include multiple intermediate impedance values to provide finer control of the reflectivity of the diodes.

As conductivity of the diodes change, an amount of the source beam that is reflected by the diodes may also change. Each diode may include a specific address to provide finer control of individual or groups of the diodes. For example, the addresses may associate the diodes with each other in patches. In some aspects, the patches may include a rectangular shape, a square shape, or any other appropriate shape.

The reconfigurable aperture may include a static portion. The static portion may include a fixed material that includes a static impedance. For example, the static portion may include a copper material. The static portion may cause the reconfigurable aperture to include at least a minimum impedance that is equal to the impedance of the static portion. In some aspects, the static portion may cause the reconfigurable aperture to provide the output beam as at least a minimum beam pattern when all of the diodes are in the off state.

The control device may be operatively coupled to the reconfigurable aperture. The control device may control the impedance of the reconfigurable aperture to configure and reconfigure the beam pattern of the output beam on the fly.

In some aspects, the control device may control each of the diodes within the reconfigurable aperture to control the impedance of the reconfigurable aperture.

The control device may control the diodes to configure and reconfigure a FOV, perform beam scanning, suppress side-lobes of the output beam, perform null steering, or some combination thereof. The control device may control the impedance of the reconfigurable aperture to permit at least a portion of the source beam to propagate the reconfigurable aperture as the output beam.

The control device may control the impedance of the diodes to configure and reconfigure the beam pattern of the output beam on the fly. The control device may bias each of the diodes individually or in groups to control the impedance of the reconfigurable aperture. In some aspects, the control device may bias each of the diodes to configure and reconfigure the beam pattern of the output beam on the fly. In addition, the control device may bias each of the diodes to control the state of each of the diodes.

In some aspects, the control device may control a level of voltage signals, current signals, or some combination thereof provided to the diodes to change the impedance of the reconfigurable aperture. The control device may control each of the diodes to synthesize a spatial radiation beam pattern of the output beam.

The control device may include scalable control circuitry that includes a modular architecture for true scalability. In addition, the control circuitry may support temperature compensation and dual-mode programmability of each of the diodes to increase a rate of control of the diodes. In some aspects, each of the control circuits may be operatively coupled to a different diode. Each control circuit may include a diode driver, a sensor, and a UCL. The control device may control each of the diodes (e.g., each pixel within the patches) individually. In some aspects, the control device may include a different control circuit for each diode.

The diode drivers may be operatively coupled to the corresponding diodes. The diode drivers may provide the voltage signals, the current signals, or some combination thereof to set the state of the corresponding diodes. In some aspects, the diode drivers may receive signals from the UCLs to set the state of the corresponding diode (e.g., to bias the corresponding diodes) by applying the voltage signals based on the signals. The diode drivers may provide the voltage signal at various voltage levels to enable fine impedance control of the corresponding diodes. The diode drivers may change the level of the voltage signals, the current signals, or some combination thereof to control the impedance of the corresponding diodes.

The UCLs may be operatively coupled to the corresponding diode drivers and the corresponding sensors. The UCLs may include memories and communication interfaces. The UCLs may provide the signals to the diode drivers based on corresponding temperature measurements, corresponding impedance measurements, and a control signal. Each of the communication interfaces may communicatively couple the corresponding UCLs to other control circuits. The UCLs may operate according to a direct addressable mode or an automatic repeater mode.

In the direct addressable mode, the control device may directly program or control the UCLs. The UCLs may be programmed or controlled by receiving the control signal. The UCLs may be instructed to read or write to the memories or perform initial calibration of the corresponding diodes. In some aspects, the control device may include a main control device operatively coupled to the communication interfaces. The main control device and the UCLs (e.g., the communication interfaces) may operate according to the direct addressable mode. The UCLs may receive the control signal from the main control device.

The UCLs operating according to the automatic-repeater mode may permit faster propagation of a configuration of all of the UCLs in the control circuits. The UCLs may store the received control signal and calibration information included in the control signal in the corresponding memories. In some aspects, the UCLs may forward the control signal to other UCLs. The UCLs operating according to the automatic-repeater mode may reduce configuration time of the control circuits according to O such that configuration time of the UCLs may increases proportional to (sqrt(N)) instead of from O(linearly with N), where N is total number diodes. In some aspects, the automatic-repeater mode may be called a cascade mode. In the cascade mode, the UCLs may store data (e.g., the calibration information) for configuration and operation and then cascade that data to other UCLs.

In the automatic repeater mode, one or more of the UCLs may receive the control signal and then forward the control signal to other UCLs. For example, first UCL of a row or a column of the control circuits may receive the control signal from the main control device and may provide the control signal to a second UCL of the row or column of the control circuits.

The sensors may be physically positioned proximate the corresponding diodes. For example, the sensors may be thermally close to the corresponding diodes. In some aspects, the sensors may include temperature sensors to detect temperatures of the corresponding diodes. The sensors may provide the temperature measurements to the corresponding UCLs. The sensors may provide the temperature measurements as part of feedback loops to maintain the impedance level of the corresponding diodes.

In some aspects, the sensors may include current sensors to measure, in conjunction with the diode drivers, impedances of the corresponding diodes. The control device (e.g., the control circuits) may perform PVT of aging of the corresponding diodes using the impedance measurements.

Each of the diodes may include an impedance rating that is different as the temperature of the diodes change. The UCLs may adjust the signals to the diode drivers to cause the diode drivers to set the state of the corresponding diodes to maintain the impedance of the corresponding diodes during operation. In some aspects, the control signal may include a temperature map, a table of impedance ratings versus temperature associated with the corresponding diodes, a look up table, or some combination thereof.

The UCLs may store the look up tables in the memories. The look up tables may provide mapping of temperature performance of the corresponding diodes. The UCLs may determine PVT of the corresponding diodes using closed-loop control using the temperature measurement and the impedance measurement associated with the corresponding diodes.

The UCLs may compare the temperature measurement of the corresponding diodes to the temperature maps to adjust the signals to the diode drivers accordingly. The UCLs may compare the temperature measurements of the corresponding diodes to the tables of impedance ratings versus temperature to adjust the signals to the diode drivers accordingly.

The antennas (e.g., antenna elements) may be physically positioned proximate the reconfigurable aperture. The antennas may generate and provide the source beam.

In some aspects, the lens antenna system may include a surface wave source (e.g., a wave source), a reconfigurable hologram layer, and a control device. In these and other aspects, the lens antenna system may include a packaged module that includes the surface wave source, the reconfigurable hologram layer, the control device, or some combination thereof.

The surface wave source may provide a surface wave. In some aspects, the surface wave source may include a center plated through hole (PTH) via. In these and other aspects, the surface wave source may operate as a monopole surface wave launcher. In addition, the lens antenna system may be vertically polarized to launch the surface wave as a cylindrical wave.

The packaged module may include a package substrate layer. The grounded package substrate layer may propagate the surface wave. In addition, the reconfigurable hologram layer may be physically attached to a surface of the package substrate layer. In some aspects, the reconfigurable hologram layer may include patches arranged in a pattern. Each of the patches may include diodes.

The reconfigurable hologram layer may receive the surface wave from the package substrate layer. In some aspects, the reconfigurable hologram layer may be coupled to the surface wave from the package substrate layer. The reconfigurable hologram layer may provide the output beam (e.g., a leaky wave). The reconfigurable hologram layer may provide the output beam based on an impedance of the reconfigurable hologram layer, the surface wave, or some combination thereof. In some aspects, the reconfigurable hologram layer may provide the output beam with the beam pattern between −70 degrees and 70 degrees.

In some aspects, the reconfigurable hologram layer or the reconfigurable aperture may provide the output beam with the beam pattern in an azimuth plane (e.g., dimension). In other aspects, the reconfigurable hologram layer or the reconfigurable aperture may provide the output beam with the beam pattern in an elevation plane (e.g., dimension). In these and other aspects, the reconfigurable hologram layer or the reconfigurable aperture may provide the output beam with the beam pattern configured in both an azimuth plane (e.g., dimension) and an elevation plane (e.g., dimension). In some aspects, the reconfigurable hologram layer or the reconfigurable aperture may provide the output beam with adjusted beam patterns in the azimuth plane, the elevation plane, or some combination thereof. For example, the reconfigurable hologram layer or the reconfigurable aperture may provide the output beam with a narrower beam pattern in the azimuth plane and a wider beam pattern in the elevation plane. As another example, the reconfigurable hologram layer or the reconfigurable aperture may provide the output beam with a wider beam pattern in the azimuth plane and a narrower beam pattern in the elevation plane. As another example, the reconfigurable hologram layer or the reconfigurable aperture may provide the output beam with a beam pattern pointing toward an arbitrary azimuth angle and an arbitrary elevation angle that is pre-determined according to the reconfigurable hologram layer.

In some aspects, the reconfigurable hologram layer or the reconfigurable aperture may include concentric elliptical zones. In other aspects, the reconfigurable hologram layer or the reconfigurable aperture may include eccentric elliptical zones. In some aspects, the reconfigurable hologram layer or the reconfigurable aperture may include elliptical zones that include equal area sizes. In other aspects, the reconfigurable hologram layer or the reconfigurable aperture may include elliptical zones and two or more of the elliptical zones include different area sizes.

The packaged module may include a bottom layer. The bottom layer may be physically positioned proximate the package substrate layer (e.g., a bonding substrate layer on which the pixelated patches are attached). In addition, the bottom layer may be grounded to support propagation of the surface wave along the interface of the package substrate layer and the bonding substrate layer to excite the leaky wave propagating along the pixelated patches. In some aspect, the bottom layer may be mostly grounded to support propagation of the surface wave along the package substrate layer and the bonding substrate layer.

In some aspects, the packaged substrate layer may include a two-layer substrate (e.g., a top layer and a bottom layer). The bottom layer may operate as ground for the package substrate layer. The top layer may include metallization operating as a lens for radiating. The top layer may include the metallization as part of the surface wave launcher. The diodes may be physically attached to the top layer. In some aspects, the diodes may be physically positioned face down to cause the I region to face the package substrate layer. In the on state, the diodes may operate as metal. The surface wave may propagate along the surface due to the metallized diodes.

The packaged module may include a silicon substrate layer. The silicon substrate layer may be physically attached to a surface of the reconfigurable hologram layer. The silicon substrate layer may include one or more control busses. The control busses may be operatively coupled to the diodes within the reconfigurable hologram layer.

The packaged module may include control vias. The control vias may be physically positioned at a periphery of the packaged module. In addition, the control vias may be operatively coupled to the control busses. The control vias may propagate the control signals from the control device to the control busses. The control busses may provide the control signals to the diodes to adjust the beam pattern of the output beam.

In some aspects, a periphery of the packaged module may include the control vias that provide the control signals to the control bus within the silicon substrate layer. The control bus may provide the voltage signals to bias the diodes that are within the reconfigurable hologram layer. The control vias may route the control signals at the periphery of the packaged module where surface wave currents are very weak. The control vias routing the control signals at the periphery of the packaged module may prevent or reduce interactions between the control signals and the surface wave within the packaged module.

The control device may be operatively coupled to the reconfigurable hologram layer. The control device may control the impedance of the reconfigurable hologram layer to configure and reconfigure the beam pattern of the output beam on the fly. In some aspects, the control device may control the diodes to adjust a size or shape of the patches to adjust the beam pattern of the output beam. For example, the control device may cause a portion of the diodes to be in the on state and another portion of the diodes to be in an off state to cause the size of the patches to be particular sizes.

The lens antenna system may include a transceiver circuit. The transceiver circuit may be electrically coupled to the surface wave source. The transceiver circuit may provide a radio frequency signal to the surface wave source. In some aspects, the surface wave source may provide the surface wave based on the radio frequency signal. In some aspects, the transceiver circuit may include a millimeter wave transceiver (e.g., a RFIC). The transceiver circuit may be mechanically coupled to the bottom layer of the packaged module.

The lens antenna system may include one or more termination resistors. The termination resistors may terminate (e.g., ground) residual surface currents created by the surface wave. In some aspects, the surface wave currents may be scattered from the reconfigurable hologram layer to synthesize arbitrary beam patterns.

The lens antenna system may include an optical source, an aperture, and the control device. The optical source may include one or more light emitting diodes (LEDs). The LEDs may be arranged in a pattern on a surface of the aperture. For example, the LEDs may be arranged in a pixelated pattern on the surface of the aperture. The aperture may include beam splitters physically positioned proximate the optical source. Each of the beam splitters may be physically positioned proximate one or more of the LEDs. The beam splitters may be arranged in a pattern corresponding to the pattern of the LEDs. The control device may be operatively coupled to the optical source. The control device may be operatively coupled to each of the LEDs.

The optical source may provide an optical source signal. In some aspects, the LEDs may provide the optical source signal. The aperture may receive the optical source signal and provide an output optical signal. The aperture may provide the output optical signal based on a beam splitting configuration of the aperture and the optical source signal. In some aspects, the beam splitters may control the beam splitting configuration of the aperture. In these and other aspects, the beam splitters may receive the optical source signal and may permit at least a portion of the optical source to propagate the beam splitters as the output optical signal.

The control device may control the optical source. The control device may control a mode, an optical power strength, or any appropriate aspect of the optical source signal. The control device may control the optical source signal to configure and reconfigure the mode of the output optical signal on the fly.

The lens antenna system may include an antenna, a reconfigurable twister reflector, a polarize, and the control device. The antenna may include multiple feeding antennas to support multiple FOVs. The reconfigurable twister reflector may include the diodes. In some aspects, the diodes may include SPIN diodes. The control device may be operatively coupled to the reconfigurable twister reflector.

The antenna may provide a source beam. The reconfigurable twister reflector may receive the source beam and provide a polarized beam. The reconfigurable twister reflector may provide the polarized beam based on a phase configuration of the reconfigurable twister reflector and the source beam. The polarizer may receive the source beam and the polarized beam. The polarizer may provide an output beam. The polarizer may provide the output beam based on a polarization configuration of the polarizer, the source beam, and the polarized beam.

The control device may control the impedance of the reconfigurable twister reflector. The control device may control the impedance of the reconfigurable twister reflector to configure and reconfigure the phase configuration of the reconfigurable twister reflector on the fly. In addition, the control device may control the impedance of the reconfigurable twister reflector to control a beam pattern of the output beam.

The control device may control (e.g., bias0 the diodes within the reconfigurable twister reflector to control the impedance of the reconfigurable twister reflector. In some aspects, the reconfigurable twister reflector may operate in different phase configurations. For example, the reconfigurable twister reflector may operate in seven different phase configurations. The control device may control impedances of patches of silicon (e.g., patches of silicon that include the diodes) within the reconfigurable twister reflector to control a current phase configuration of the reconfigurable twister reflector.

In some aspects, the lens antenna system may include a chip assembly. The lens antenna system may also include a RFIC. In some aspects, the RFIC may provide the source waveforms to the antenna. The reconfigurable twister reflector may include the patches of silicon that include the diodes. The polarizer may include strips of silicon. The reconfigurable twister reflector may extend from the antenna towards the strips of silicon of the polarizer. The reconfigurable twister reflector may include a twister layer. The twister layer may be physically positioned proximate the patches of silicon.

The antenna may include multiple integrated silicon on chip substrate integrated waveguides. The integrated silicon on chip substrate integrated waveguides may be electrically coupled to the RFIC. In addition, the integrated silicon on chip substrate integrated waveguides may be physically positioned between the RFIC and the patches of silicon of the reconfigurable twister reflector.

The chip assembly may include a control plane. The control plane may be operatively coupled to the twister layer and the control device. The control plane may extend from the antenna to the twister layer. The control plane may provide the control signals (e.g., the voltage signals) from the control device to the twister layer. The control signals may control the state of the diodes within the patches of silicon.

As discussed above MIMO radar devices, such as radar device in FIG. 3, may implement a virtual antenna array. The virtual antenna array may include an aperture size that is larger than that of physical antenna arrays. In addition, as the ability of the MIMO radar devices to detect objects increases (e.g., the angular resolution of the MIMO radar devices increases) or for imaging implementations of the MIMO radar devices, the size of the data storage and the processing complexity within the MIMO radar devices may become unwieldy and difficult to implement. Further, as discussed above, the MIMO radar devices may be susceptible to multipath interference.

Some aspects described in the present disclosure may include a MIMO radar device that reduces the size of data storage, the processing complexity, or some combination thereof compared to other MIMO radar devices. The MIMO radar device, according to some aspects described in the present disclosure, may reduce the size of the data storage, the processing complexity, or some combination thereof while maintaining the increased aperture size of the virtual antenna array compared to physical antenna arrays.

In some aspects, in some aspects, each transmitter chain may perform reconfigurable beam forming using switched passive beamformers. The transmitter chains may include subarrays that reconfigure the output beam in a field of view of the MIMO radar device. In these and other aspects, the receiver chains may be configured as omnidirectional subarrays.

In some aspects, a radar device may include a DAC stage, an ADC stage, the transmitter chains, and the receiver chains. The DAC stage may be electrically coupled to each of the transmitter chains. Each of the transmitter chains may include a transmit chain portion and a transmit switched analog BFN. The transmit chain portions may be electrically coupled to the DAC stage. Each of the transmit switched analog BFNs may be electrically coupled to a different transmit chain portion.

The DAC stage may generate a different analog Tx signal for each transmitter chain. The DAC stage may generate each of the analog Tx signals representative of a single digital Tx signal. Each Tx chain portion may generate intermediate analog Tx signals representative of the corresponding analog Tx signal. In addition, each switched analog Tx BFN may generate multiple analog Tx signals for one or more of the intermediate analog Tx signals. Further, each switched analog Tx BFN may form a beam of the corresponding analog Tx signals in accordance with a state of the switched analog Tx BFN.

The ADC stage may be electrically coupled to the receiver chains. Each of the receiver chains may include LNAs and receive chain portions. Each of the receive chain portions may be electrically to a different LNA. In addition, the LNAs may be electrically coupled to the ADC stage. The LNAs may generate intermediate analog signals based on receive signals. The receive chain portions may generate analog signals. Each analog signal may represent a different intermediate analog signal.

In some aspects, each transmitter chain and each receiver chain may perform reconfigurable beam forming using active beamformers. The transmitter chains and the receiver chains may include subarrays that reconfigure the output beam or the beam of the receive signals.

A radar device may include a DAC stage, transmitter chains, receiver chains, and an ADC stage. The DAC stage may generate analog signals. In some aspects, the DAC stage may generate a different analog signal for each transmitter chain. In addition, each analog signal may represent a single digital signal. Each of the transmitter chains may include a transmit chain portion and an active BFN. Each of the transmit chain portions may generate intermediate analog signals representative of the corresponding analog signal. Each of the active BFNs may generate analog transmit signals. The active BFNs may generate each analog transmit signal based on a different intermediate analog signal. The analog transmit signals may include a beam formed in accordance with a configuration of the active BFN.

Each of the receiver chains may include a receive active BFN and a receive chain portion. Each of the receive active BFNs may generate intermediate Rx analog signals based on receive signals. The receive active BFNs may generate the intermediate Rx analog signals including a beam formed in accordance with a configuration of the receive active BFN. Each of the receive chain portions may generate a single Rx analog signal representative of the corresponding intermediate Rx analog signals. The ADC stage may generate digital signals based on the Rx analog signals. The ADC stage may generate a digital signal for each of the receiver chains. In addition, the ADC stage may generate each digital signal representative of a different Rx analog signal.

In some aspects, a number of digital chains within the MIMO radar device described in the present disclosure may be reduced by a factor of N×M compared to other MIMO radar devices. In addition, in some aspects, the size of the data storage, the processing complexity, or some combination thereof of the MIMO radar device described in the present disclosure may be reduced by a factor of $(1+QM)/(1+Q)$ compared to other MIMO radar devices. In some aspects, Q may represent a number of receiver chains within the MIMO radar device and M may represent a number of inputs and outputs of the active BFNs. Further, a circuit footprint of the MIMO radar device described in the present disclosure may be smaller compared analog radar devices while maintaining the same or similar angular resolution as analog radar devices.

Accordingly, one or more aspect described in the present disclosure may permit the MIMO radar device to increase the aperture size of the virtual antenna array while reducing the size of the data storage, the processing complexity, or some combination thereof. Various differences, advantages, and benefits of the MIMO radar device described in the present disclosure are listed in Table II.

TABLE II

| Parameters | Analog array | Digital array | MIMO array | Tx subarray MIMO | Tx/Rx subarray MIMO |
|---|---|---|---|---|---|
| # physical antenna | $(P \times Q) \times (N \times M)$ | $(P \times Q) \times (N \times M)$ | $(P + Q) \times (N + M)$ | $(P + Q) \times (N + M)$ | $(P + Q) \times (N \times M)$ |
| # of digital Tx chains | 1 | $(P \times Q) \times (N \times M)$ | $(P \times N)$ | $(P \times N)$ | P |
| # of digital Rx chains | 1 | $(P \times Q) \times (N \times M)$ | $(Q \times M)$ | $(Q \times M)$ | Q |
| Physical array size | $(P \times Q) \times (N \times M)$ | $(P \times Q) \times (N \times M)$ | $\geq \frac{(P \times Q) \times (N \times M)}{2}$ | $\geq \frac{(P \times Q) \times (N \times M)}{2}$ | $\geq \frac{(P \times Q) \times (N \times M)}{2}$ |
| Angular resolution | $\frac{1}{P \times N} \times \frac{1}{Q \times M}$ | $\frac{1}{P \times N} \times \frac{1}{Q \times M}$ | $\frac{1}{P \times N} \times \frac{1}{Q \times M}$ | $\frac{1}{P \times N} \times \frac{1}{Q \times M}$ | $\frac{1}{P \times N} \times \frac{1}{Q \times M}$ |
| # analog beams per subarray | — | — | — | — | (NM) |
| # digital beams per sector | — | — | — | — | K |
| # Tx beams per digital Rx chain | K × (NM) | K × (NM) | K × (NM) | K × (NM) | K × (NM) |

TABLE II-continued

| Parameters | Analog array | Digital array | MIMO array | Tx subarray MIMO | Tx/Rx subarray MIMO |
|---|---|---|---|---|---|
| # Tx beams total | K × (NM) | K × (NM) × [(PQ) × (NM)] | K × (NM) × (QM) | K × (NM) × (QM) | K × (NM) × Q |
| # Rx beams | K × (NM) | K × (NM) | K × (NM) | K × (NM) | K × (NM) |
| # beams total | 2K × (NM) | K × (NM) × [1 + (PQ) × (NM)] | K × (NM) × [1 + (QM)] | K × (NM) × [1 + (QM)] | K × (NM) × [1 + Q] |
| Memory/processing complexity (compared to analog array) | 1 | (1 + (PQ) × (NM))/2 | $\frac{1 + (QM)}{2}$ | $\frac{1 + (QM)}{2}$ | $\frac{1 + Q}{2}$ |
| Tx array ambiguity | Full-not ambiguous | Full-not ambiguous | Thin-Ambiguous Full-Not Ambiguous | Partially full/thin | Partially full/thin |
| Rx array ambiguity | Full-not ambiguous | Full-not ambiguous | Thin-Ambiguous Full-Not Ambiguous | Full-not ambiguous | Partially full/thin |
| Multipath Immunity | ++ | ++ | — | +− | +− |

Accordingly, at least one aspect described in the present disclosure may reduce power consumption compared to other MIMO radar devices by reducing the number of digital chains within the MIMO radar device. In addition, at least one aspect described in the present disclosure may reduce the memory and processing complexity within the MIMO radar device compared to other MIMO radar devices. Further, at least one aspect described in the present disclosure may reduce the circuit footprint of the MIMO radar device compared to analog MIMO radar devices.

In addition, at least one aspect described in the present disclosure may provide better immunity to multipath interference compared to other MIMO radar devices by implementing the switch BFNs. Further, at least one aspect described in the present disclosure may reduce a production cost and operational cost compared to other MIMO radar devices.

Figure 37:
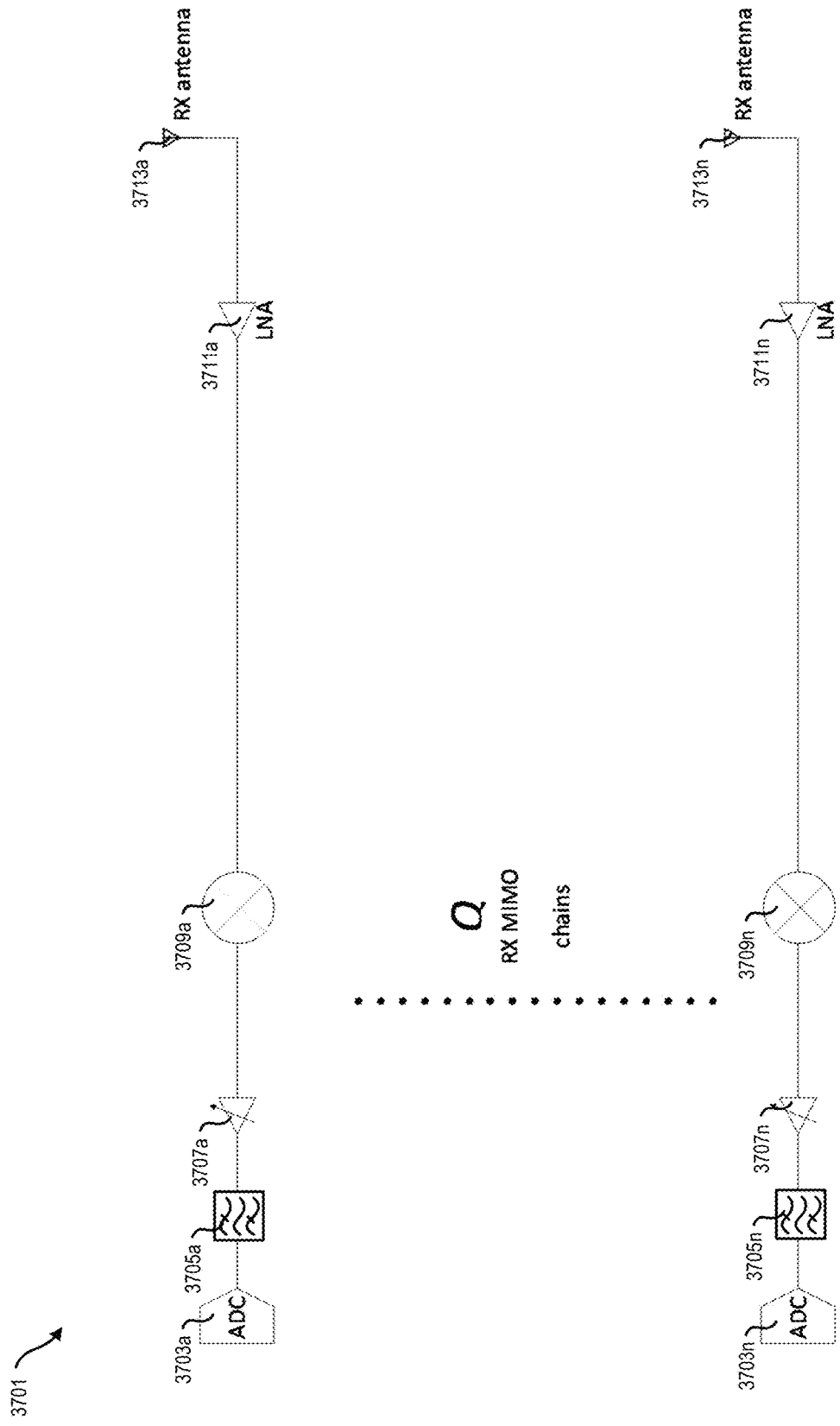
FIG. 37 illustrates another example Rx MIMO portion of a MIMO radar device.

FIG. 37 illustrates another example Rx MIMO portion 3701 of a MIMO radar device, in accordance with at least one aspect described in the present disclosure. In some aspects, the Rx MIMO portion 3701 may be implemented with the Tx MIMO portion 1400 described above in relation to FIG. 14. In addition, the Rx MIMO portion 3701 may correspond to at least a portion of the radar frontends 103, 211, and 304, described above in relation to FIGS. 1, 2, and 3.

The Rx MIMO portion 3701 may include ADCs 3703a-n, filters 3705a-n, VGAs 3707a-n, mixers 3709a-n, LNAs 3711a-n, and antennas 3713a-n. Each of the LNAs 3711a-n may be electrically coupled between a different antenna of the antennas 3713a-n and a different mixer of the mixers 3709a-n. In addition, each of the VGAs 3707a-n may be electrically coupled between a different mixer of the mixers 3709a-n and a different filter of the filters 3705a-n. Further, each of the ADCs 3703a-n may be electrically coupled to a different filter of the filters 3705a-n.

The Rx MIMO portion 3701 may include receiver chains that each include a single ADC of the ADCs 3703a-n, a single filter of the filters 3705a-n, a single VGA of the VGAs 3707a-n, a single mixer of the mixers 3709a-n, a single LNA of the LNAs 3711a-n, and a single antenna of the antennas 3713a-n. For example, a first receiver chain may include a first ADC 3703a, a first filter 3705a, a first VGA 3707a, a first mixer 3709a, a first LNA 3711a, and a first antenna 3713a. As indicated by the ellipsis, the Rx MIMO portion 3701 may include any appropriate number of receiver chains.

Operation of a first receiver chain (e.g., the first ADC 3703a, the first filter 3705a, the first VGA 3707a, the first mixer 3709a, the first LNA 3711a, and the first antenna 3713a) is now discussed. Each of the receiver chains may operate accordingly.

The first antenna 3713a may receive a Rx signal and provide the Rx signal to the first LNA 3711a. The first LNA 3711a may generate an amplified signal by amplifying a power level of the corresponding Rx signal. The first mixer 3709a may mix the amplified signal to generate a mixed signal at a different frequency than the amplified signal. The first VGA 3707a may amplify a power level of the mixed signal to generate an amplified mixed signal. The first filter 3705a may receive the amplified mixed signal. The first filter 3705a may prevent portions of the amplified mixed signal from propagating the first filter 3705a and may provide a filtered signal based on the amplified mixed signal. The first ADC 3703a may receive the filtered signal and generate a digital signal representative of the filtered signal.

Figure 38:
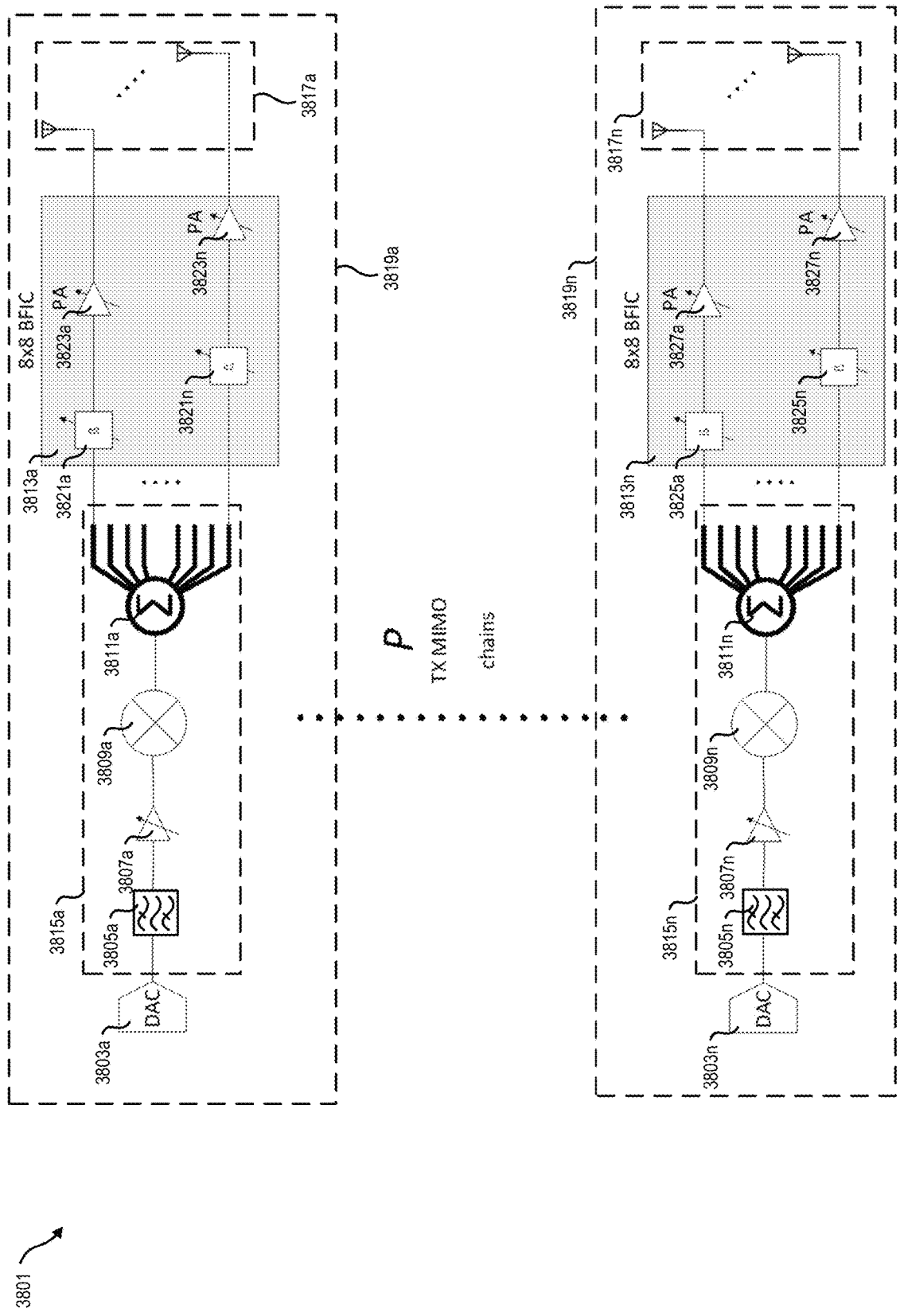
FIG. 38 illustrates another example Tx MIMO portion of a MIMO radar device.

FIG. 38 illustrates another example Tx MIMO portion 3801 of a MIMO radar device, in accordance with at least one aspect described in the present disclosure. The Tx MIMO portion 3801 may correspond to at least a portion of the radar frontends 103, 211, and 304, described above in relation to FIGS. 1, 2, and 3. The Tx MIMO portion 3801 may include transmitter chains 3819a-n (referenced collectively in the present disclosure as "transmitter chains 3819").

The transmitter chains 3819 may include DACs 3803a-n (also referred to in the present disclosure collectively as a DAC stage), Tx chain portions 3815a-n, active BFNs 3813a-n, and Tx antenna arrays 3817a-n. Each of the Tx chain portions 3815a-n may be electrically coupled between a different DAC of the DACs 3803a-n and a different active BFN of the active BFNs 3813a-n. Each of the active BFNs 3813a-n may be electrically coupled to a different Tx antenna array of the Tx antenna arrays 3817a-n.

The Tx chain portions 3815a-n may include Tx filters 3805a-n, Tx VGAs 3807a-n, Tx mixers 3809a-n, and splitters 3811a-n. Each of the Tx VGAs 3807a-n may be electrically coupled between a different Tx filter of the Tx filters 3805a-n and a different Tx mixer of the Tx mixers 3809a-n. For example, a first Tx VGA 3807a may be electrically coupled between a first Tx filter 3805a and a first Tx mixer 3809a. In addition, each of the splitters 3811a-n may be electrically coupled to a different Tx mixer of the Tx mixers 3809a-n. For example, a first splitter 3811a may be electrically coupled to the first Tx mixer 3809a.

The active BFNs 3813a-n may include phase shifters 3821a-n and PAs 3823a-n. Each of the phase shifters 3821a-n may be electrically coupled between a different output of the corresponding splitter of the splitters 3811a-n and a different PA of the PAs 3823a-n. For example, a first phase shifter 3821a may be electrically coupled to a first output of the first splitter 3811a and a first PA 3823a. Each of the PAs 3823a-n may be electrically coupled to a different Tx antenna of the Tx antenna arrays 3817a-n. As indicated by the ellipsis, the Tx MIMO portion 3801 may include any appropriate number of transmitter chains 3819.

The DAC stage (e.g., the DACs 3803a-n) may generate a different analog Tx signal for each of the transmitter chains 3819. In some aspects, the DAC stage may generate each of the different analog Tx signals representative of a single digital Tx signal.

Operation of a first transmitter chain 3819a is now discussed. Each of the transmitter chains 3819a-n may operate accordingly. The first DAC 3803a may receive a digital Tx signal to be transmitted. The first DAC 3803a may generate the analog Tx signal representative of the digital Tx signal.

The first Tx filter 3805a may receive the analog Tx signal and may prevent portions of the analog Tx signal from propagating the first Tx filter 3805a. The first Tx filter 3805a may provide a filtered analog Tx signal based on the analog Tx signal. The first Tx VGA 3807a may amplify a power level of the filtered analog Tx signal to generate an amplified analog Tx signal. In some aspects, the first Tx VGA 3807a may generate the amplified analog Tx signals based on the filtered Tx signal.

The first Tx mixer 3809a may mix the amplified analog Tx signal to generate a mixed analog Tx signal based on the amplified analog Tx signal. In some aspects, the first Tx mixer 3809a may generate the mixed analog Tx signal at a different frequency than the amplified analog Tx signal.

The first splitter 3811a may receive the mixed Tx signal. In addition, the first splitter 3811a may generate multiple intermediate analog Tx signals based on the mixed analog Tx signal. In some aspects, the first splitter 3811a may generate each of the intermediate analog Tx signals the same as or similar to the mixed Tx signal (e.g., the intermediate analog Tx signals may include copies of the mixed analog Tx signal). As indicated by the ellipsis, the first splitter 3811a may include any appropriate number of outputs and may generate any appropriate number of intermediate analog Tx signals. The first splitter 3811a may generate a number of intermediate analog Tx signals that corresponds to a number of the phase shifters 3821a-n in the first active BFN 3813a.

The phase shifters 3821a-n may receive the intermediate analog Tx signals. Each of the phase shifters 3821a-n may generate a phase shifted Tx signal by adjusting a phase of a corresponding intermediate analog Tx signal. The phase shifters 3821a-n may provide the corresponding phase shifted Tx signals to the PAs 3823a-n with the phases being different than the phase of the corresponding intermediate analog Tx signals. Each of the PAs 3823a-n may generate an amplified Tx signal by amplifying a power level (e.g., an amplitude) of the corresponding phase shifted Tx signal.

The first Tx antenna array 3817a may transmit signals representative of the corresponding analog Tx signals. Each antenna of the first Tx antenna array 3817a may transmit a signal representative of a different analog Tx signal.

Figure 39:
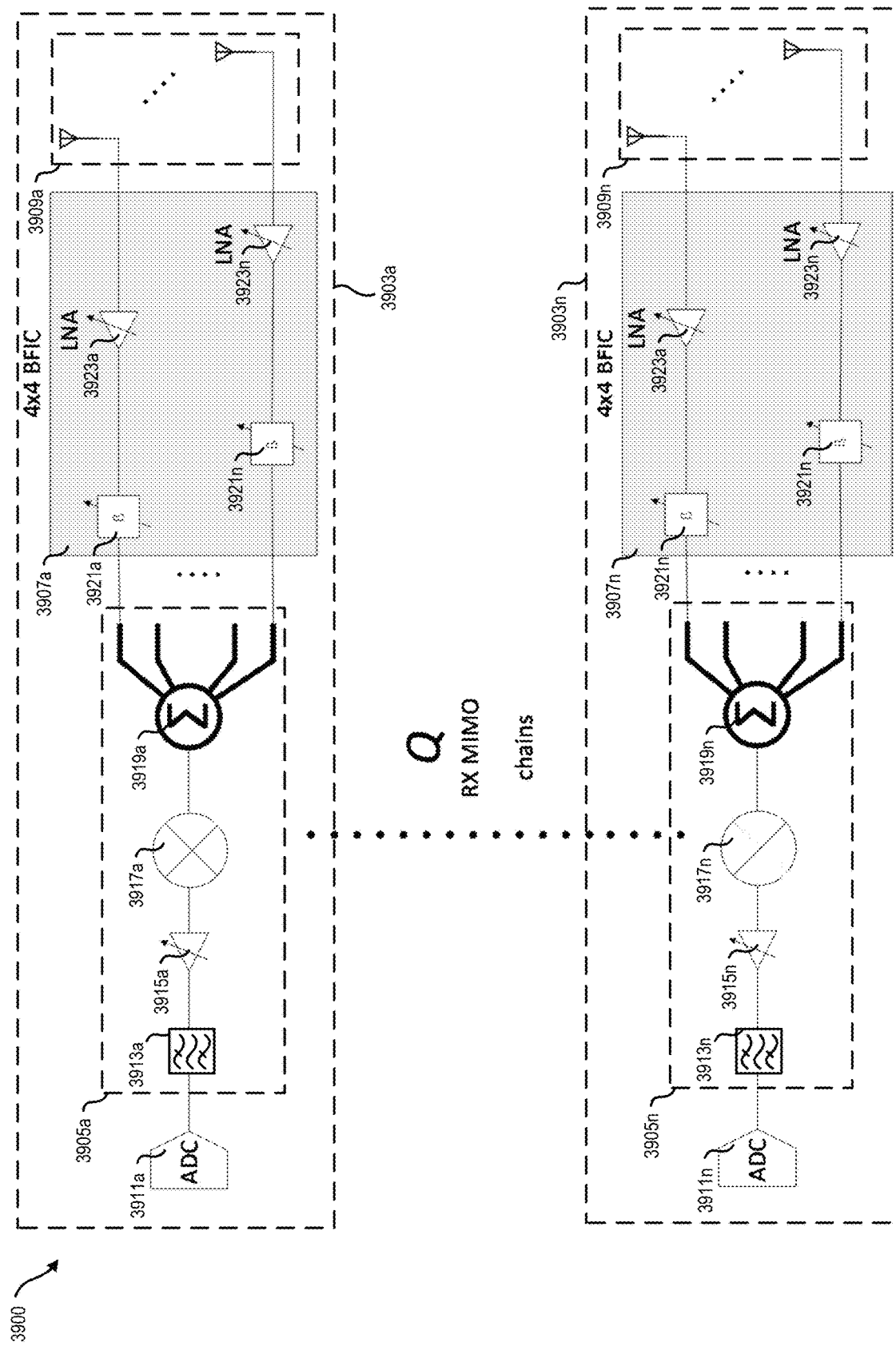
FIG. 39 illustrates yet another example Rx MIMO portion of a MIMO radar device.

FIG. 39 illustrates yet another example Rx MIMO 3900 portion of a MIMO radar device, in accordance with at least one aspect described in the present disclosure. The Rx MIMO portion 3900 may correspond to at least a portion of the radar frontends 103, 211, and 304, described above in relation to FIGS. 1, 2, and 3. The Rx MIMO portion 3900 may include receiver chains 3903a-n (referenced collectively in the present disclosure as "receiver chains 3903").

The receiver chains 3903 may include ADCs 3911a-n (also referred to in the present disclosure collectively as an ADC stage), Rx chain portions 3905a-n, active Rx BFNs 3907a-n, and Rx antenna arrays 3909a-n. Each of the Rx chain portions 3905a-n may be electrically coupled between a different ADC of the ADCs 3911a-n and a different active BFN of the active Rx BFNs 3907a-n. Each of the active Rx BFNs 3907a-n may be electrically coupled to a different Rx antenna array of the RX antenna arrays 3909a-n.

The Rx chain portions 3905a-n may include Rx filters 3913a-n, Rx VGAs 3915a-n, RX mixers 3917a-n, and combiners 3919a-n. Each of the Rx VGAs 3915a-n may be electrically coupled between a different Rx filter of the RX filters 3913a-n and a different Rx mixer of the Rx mixers 3917a-n. For example, a first Rx VGA 3915a may be electrically coupled between a first Rx filter 3913a and a first Rx mixer 3917a. In addition, each of the combiners 3919a-n may be electrically coupled to a different Rx mixer of the Rx mixers 3917a-n. For example, a first combiner 3919a may be electrically coupled to the first Rx mixer 3917a.

The active Rx BFNs 3907a-n may include phase shifters 3921a-n and LNAs 3923a-n. Each of the phase shifters 3921a-n may be electrically coupled between a different input of the corresponding combiner of the combiners 3919a-n and a different LNA of the LNAs 3923a-n. For example, a first phase shifter 3921a may be electrically coupled to a first input of the first combiner 3919a and a first LNA 3923a. Each of the LNAs 3923a-n may be electrically coupled to a different Rx antenna of the Rx antenna arrays 3909a-n. As indicated by the ellipsis, the Rx MIMO portion 3900 may include any appropriate number of receiver chains 3903.

The active Rx BFNs 3907a-n may generate intermediate analog Rx signals based on receive signals received from the Rx antenna arrays 3909a-n. Operation of a first receiver chain 3903a is now discussed. Each of the receiver chains 3903a-n may operate accordingly.

The first Rx antenna array 3903a may receive Rx signals and provide the Rx signals to the LNAs 3923a-n. The LNAs 3923a-n may generate amplified Rx signals by amplifying a power level of corresponding Rx signals. The phase shifters 3921a-n may receive the amplified Rx signals. Each of the phase shifters 3921a-n may generate an intermediate analog Rx signal by adjusting a phase of a corresponding amplified Rx signal. The phase shifters 3921a-n may provide the intermediate analog Rx signals to the first combiner 3919a with the phases being different than the phase of the corresponding amplified Rx signals.

The first combiner 3919a may generate a combined analog Rx signal by combining each of the intermediate analog Rx signals received by the first combiner 3919a. The first Rx mixer 3917a may mix the combined Rx signal to generate a mixed analog Rx signal at a different frequency than the combined analog Rx signal. The first Rx VGA 3915a may amplify a power level of the mixed analog Rx signal to generate an amplified analog Rx signal.

The first Rx filter 3913a may receive the amplified analog Rx signal and may prevent portions of the amplified analog Rx signal from propagating the first Rx filter 3913a. The first Rx filter 3913a may provide a filtered analog Rx signal based on the amplified analog Rx signal. The first ADC 3911a may receive the filtered analog Rx signal and may generate a digital Rx signal representative of the filtered Rx signal.

Figure 40A:
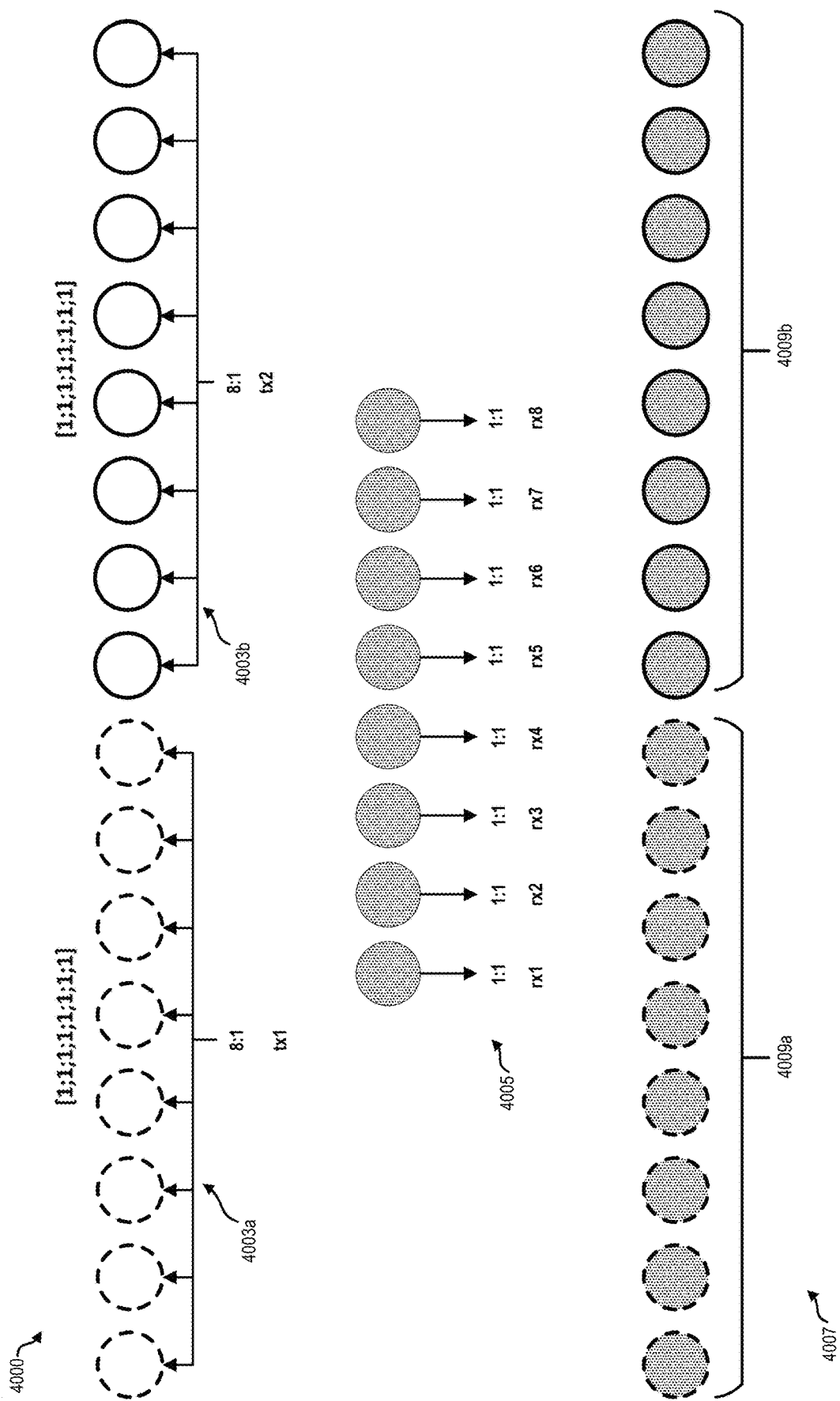
FIGS. 40A-40C illustrate example subarray configurations of the Tx MIMO portions and the Rx MIMO portions.
Figure 40B:
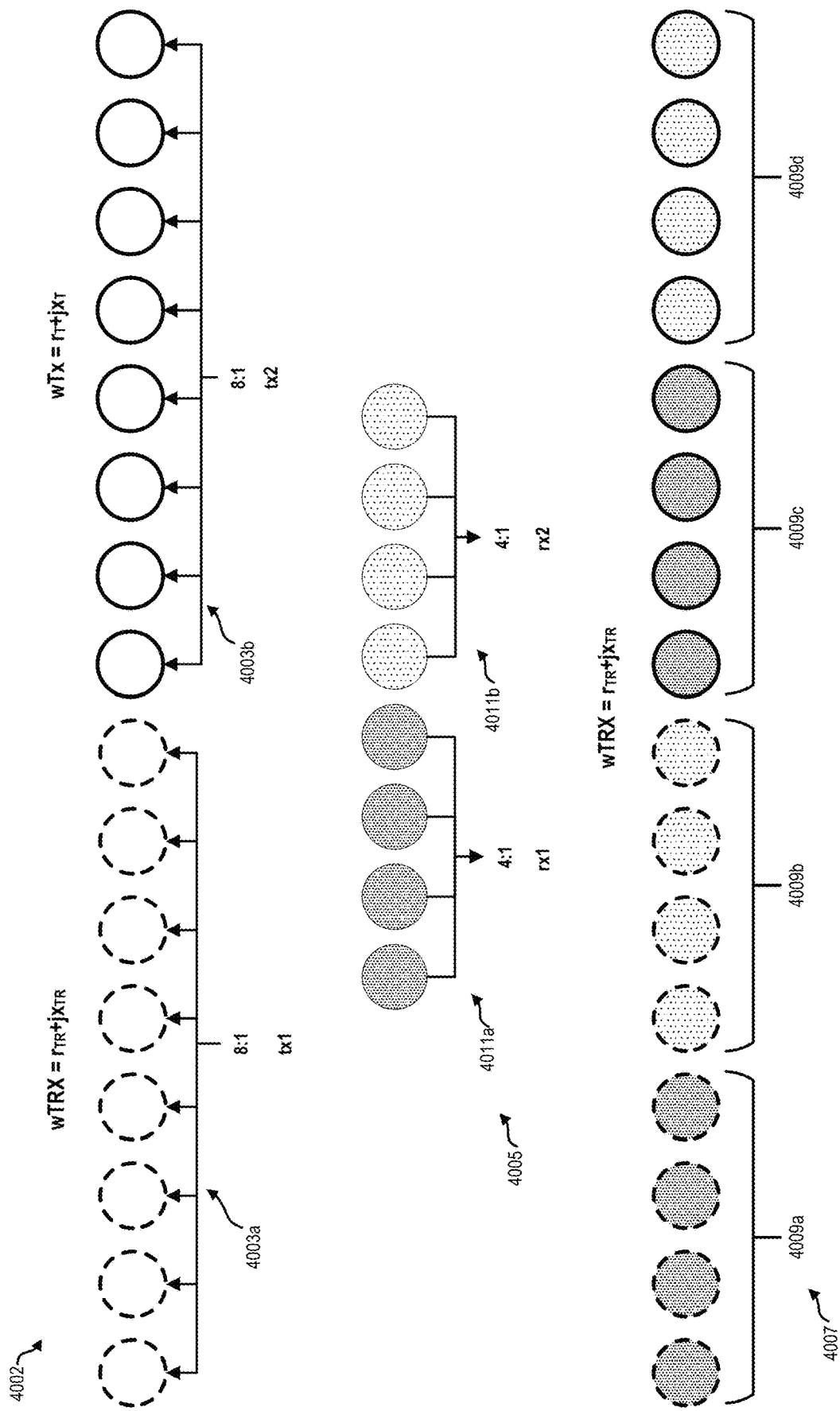
Figure 40C:
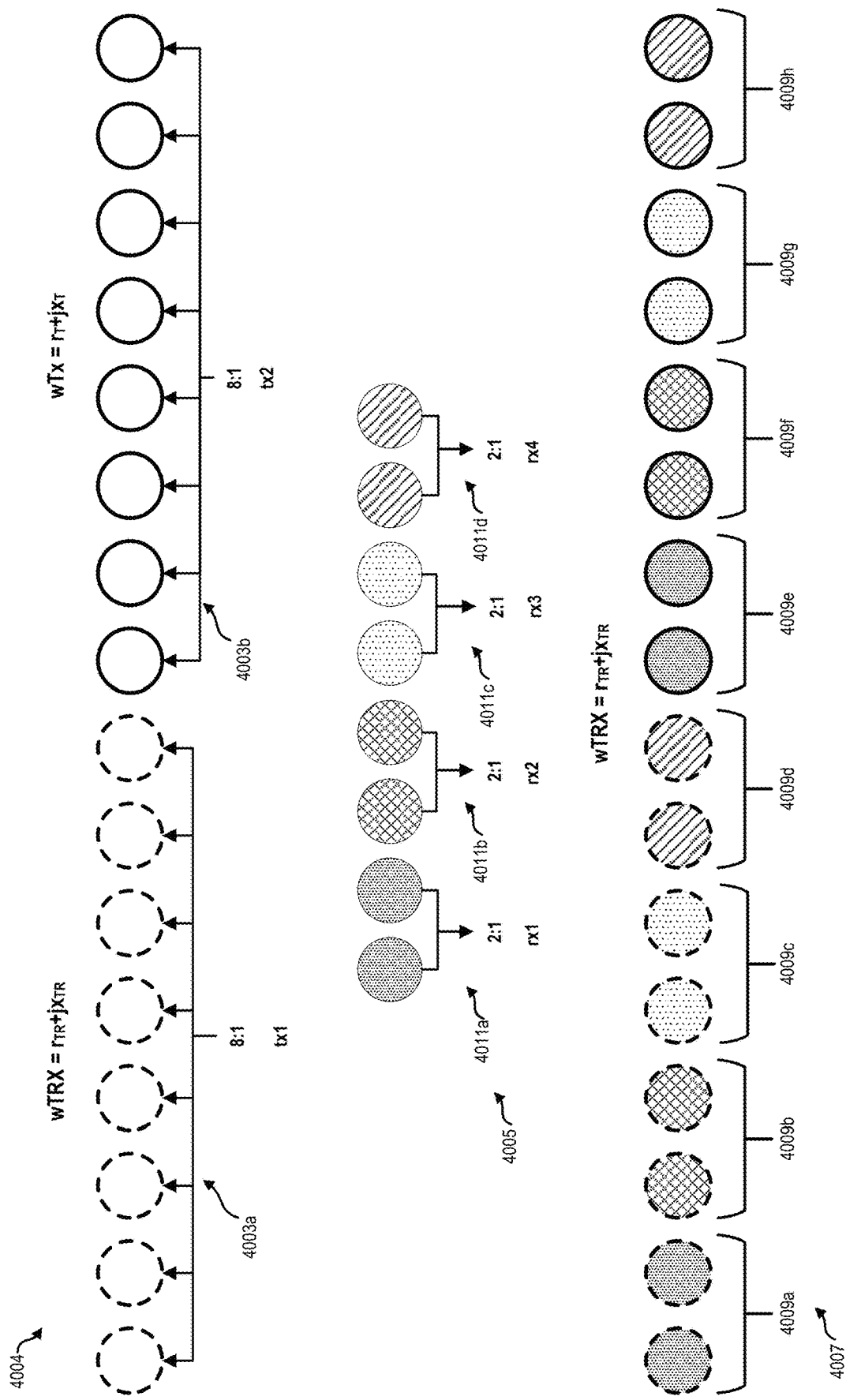

FIGS. 40A-40C illustrate example uniformly spaced subarray configurations 4000, 4002, and 4004 of the Tx MIMO portions 4003a-b and the Rx MIMO portions 4005, in accordance with at least one aspect described in the present disclosure. The uniformly spaced subarrays 4000, 4002, and 4004 may include transmit subarrays 4003a-b and a receive subarray 4005. The transmit subarrays 4003a-b may correspond to the Tx MIMO portions 1400 and 3801 described above. The receive subarray 4005 may correspond to the Rx MIMO portions 1500, 3701, and 3900 described above.

The transmit subarrays 4003a-b may include transmitter chains and the receive subarray 4005 may include receiver chains. The transmitter chains and the receiver chains are illustrated in FIGS. 40A-40C as circles. The transmitter chains and the receiver chains may be uniformly spaced relative to each other. In addition, in some aspects, the transmit subarrays 4003a-b may include eight to one transmitter chains. The transmit subarrays 4003a-b and the receive subarray 4005 may form a virtual subarray 4007 in accordance with at least one aspect described in the present disclosure.

Each of the transmit subarrays 4003a-b and the receive subarray 4005 may include antennas. Each of the antennas may be electrically coupled to active BFNs (e.g., active BFNs 3813a-n and active Rx BFNs 3907a-n) to form a beam in accordance with at least one aspects described in the present disclosure.

With reference to FIG. 40A, the receive subarray 4005 may include a single Rx portion that includes multiple one to one receive chains. The transmit subarrays 4003a-b and the receive subarray 4005 may form the virtual subarray 4007 including two subarray portions 4009a-b. The first subarray portion 4009a may be formed by combining the first transmit subarray 4003a with the receive subarray 4005. The second subarray portion 4009b may be formed by combining the second transmit subarray 4003b with the receive subarray 4005.

With reference to FIG. 40B, the receive subarray 4005 may include two four to one receiver chain portions 4011a-b. The transmit subarrays 4003a-b and the receive subarray 4005 may form the virtual subarray 4007 including four subarray portions 4009a-d. The first subarray portion 4009a may be formed by combining the first transmit subarray 4003a with the first receiver chain portion 4011a. The second subarray portion 4009b may be formed by combining the first transmit subarray 4003a with the second receiver chain portion 4011b. The third subarray portion 4009c may be formed by combining the second transmit subarray 4003b with the first receiver chain portion 4011a. The fourth subarray portion 4009d may be formed by combining the second transmit subarray 4003b with the second receiver chain portion 4011b.

With reference to FIG. 40C, the receive subarray 4005 may include four two to one receiver chain portions 4011a-d. The transmit subarrays 4003a-b and the receive subarray 4005 may form the virtual subarray 4007 including eight subarray portions 4009a-h. The first subarray portion 4009a may be formed by combining the first transmit subarray 4003a with the first receiver chain portion 4011a. The second subarray portion 4009b may be formed by combining the first transmit subarray 4003a with the second receiver chain portion 4011b. The third subarray portion 4009c may be formed by combining the first transmit subarray 4003a with the third receiver chain portion 4011c. The fourth subarray portion 4009d may be formed by combining the first transmit subarray 4003a with the fourth receiver chain portion 4011d.

The fifth subarray portion 4009e may be formed by combining the second transmit subarray 4003b with the first receiver chain portion 4011a. The sixth subarray portion 4009f may be formed by combining the second transmit subarray 4003b with the second receiver chain portion 4011b. The seventh subarray portion 4009g may be formed by combining the second transmit subarray 4003b with the third receiver chain portion 4011c. The eighth subarray portion 4009h may be formed by combining the second transmit subarray 4003b with the fourth receiver chain portion 4011d.

Figure 41:
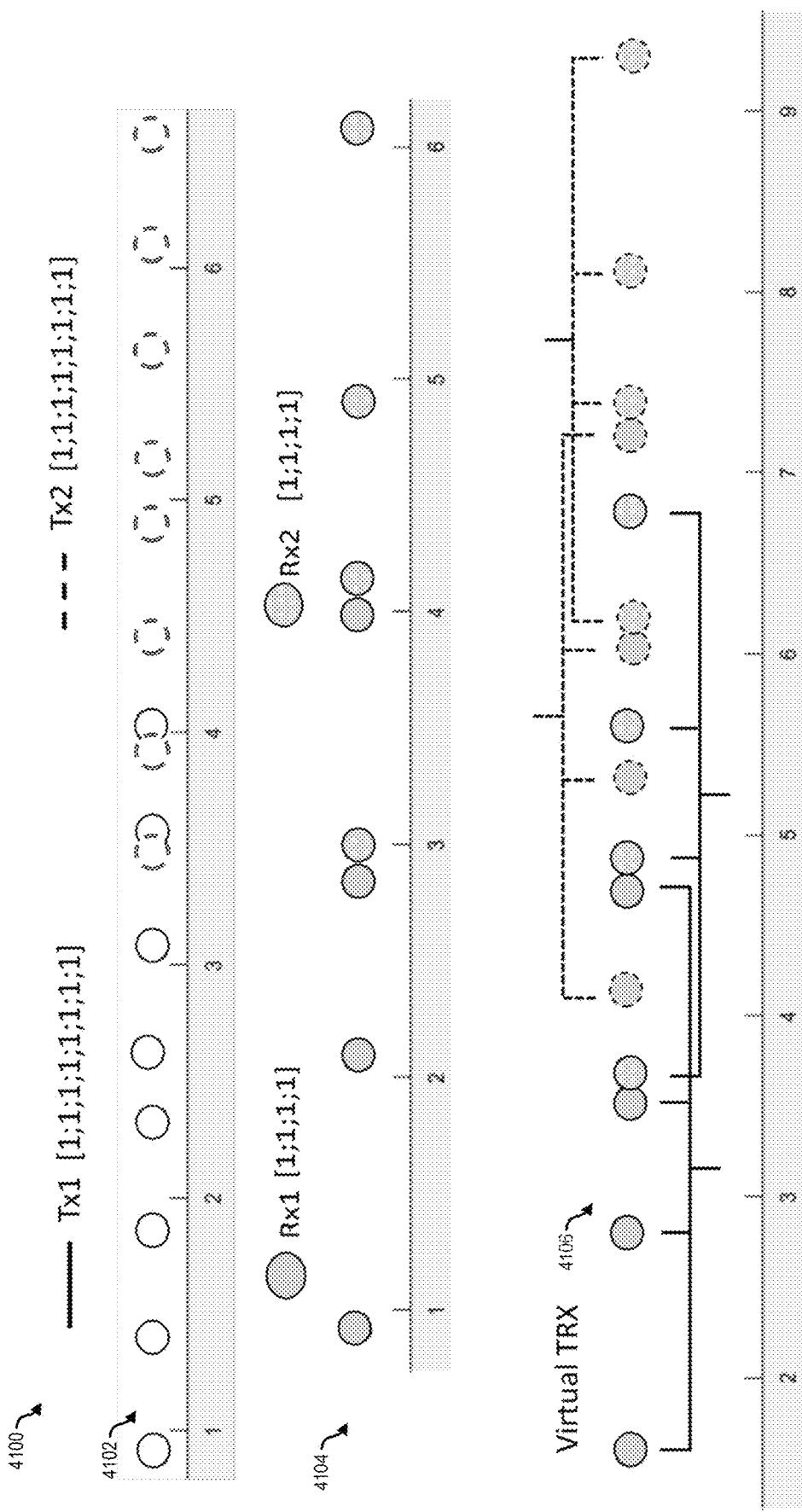
FIG. 41 illustrates an example non-uniformly spaced subarray configuration of the Tx MIMO portions and the Rx MIMO portions.

FIG. 41 illustrates an example non-uniformly spaced subarray configuration 4100 of the Tx MIMO portions 4104 and the Rx MIMO portions 4102, in accordance with at least one aspect described in the present disclosure. The non-uniformly spaced subarray configuration 4100 may include transmit subarrays 4104 and receive subarrays 4102. The transmit subarrays 4104 may correspond to the Tx MIMO portions 1400 and 3801 described above. The receive subarrays 41025 may correspond to the Rx MIMO portions 1500, 3701, and 3900 described above.

The transmit subarrays 4104 may include transmitter chains and the receive subarrays 4102 may include receiver chains. The transmitter chains and the receiver chains are illustrated in FIG. 41 as circles. The transmitter chains and the receiver chains may be non-uniformly spaced relative to each other.

As illustrated in FIG. 41, the receive subarrays 4102 may be physically positioned at non-uniform distances equal to 2.5λ and 4.6λ relative to a receive reference point. The value for λ is equal to a wavelength of signals to be received by the receive subarrays 4102. In addition, the receive subarrays 4102 may include receiver chains physically positioned at non-uniform distances equal to 0.9λ, 2.1λ, 2.8λ, 3λ, 4λ, 4.2λ, 4.9λ, and 6.1λ relative to the receive reference point.

As illustrated in FIG. 41, the transmit subarrays 4104 may be physically positioned at non-uniform distances equal to 2.3λ and 4.8λ relative to a transmit reference point. The value for λ is equal to a wavelength of signals to be transmitted by the transmit subarrays 4104. In addition, the transmit subarrays 4104 may include transmitter chains physically positioned at non-uniform distances equal to 0.9λ, 1.4λ, 1.9λ, 2.3λ, 2.6λ, 3.1λ, 3.5λ, 4λ, 4.4λ, 4.9λ, 5.2λ, 5.6λ, 6.1λ, and 6.6λ relative to the transmit reference point.

The transmit subarrays 4104 and the receive subarrays 4102 may form a virtual subarray 4106 in accordance with at least one aspect described in the present disclosure. The virtual subarray 4106 may include portions physically positioned at non-uniform distances equal to 4.8λ, 6.8λ, 7.3λ, and 9.4λ relative to a subarray reference point. The value for λ is equal to the wavelength of signals to be received, transmitted, or some combination thereof by the virtual subarray 4106. In addition, the virtual subarray 4106 may include receiver chains and transmitter chains physically positioned at non-uniform distances equal to 1.6λ, 2.8λ, 3.5λ, 3.7λ, 4.2λ, 4.7λ, 4.9λ, 5.4λ, 5.6λ, 6.1λ, 6.3λ, 6.8λ, 7.3λ, 7.5λ, 8.2λ, and 9.4λ relative to the subarray reference point.

The distances illustrated in and described in relation to FIG. 41 are provided for example purposes. The distances between the receive subarrays 4102, the transmit subarrays 4104, the virtual subarray 4106, or some combination thereof may include any appropriate distance without departing from the spirit and scope of the present disclosure.

Figure 42:
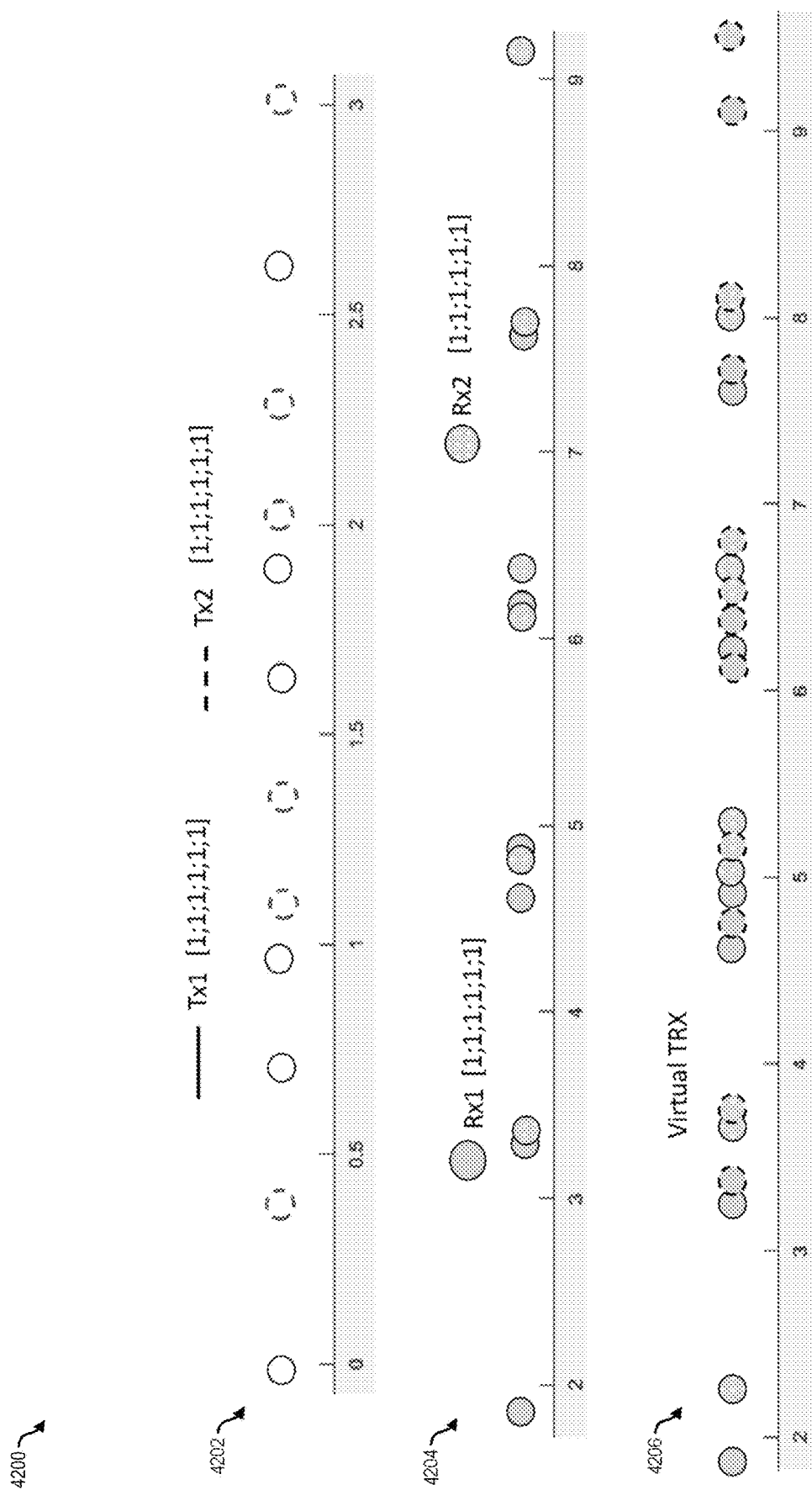
FIG. 42 illustrates another example non-uniformly spaced subarray configuration of the Tx MIMO portions and the Rx MIMO portions.

FIG. 42 illustrates another example non-uniformly spaced subarray configuration 4200 of the Tx MIMO portions 4202 and the Rx MIMO portions 4204, in accordance with at least one aspect described in the present disclosure. The non-uniformly spaced subarray configuration 4200 may include transmit subarrays 4202 and receive subarrays 4204. The transmit subarrays 4202 may correspond to the Tx MIMO portions 1400 and 3801 described above. The receive subarray 4204 may correspond to the Rx MIMO portions 1500, 3701, and 3900 described above.

The transmit subarrays 4202 may include transmitter chains and the receive subarrays 4204 may include receiver chains. The transmitter chains and the receiver chains are illustrated in FIG. 42 as circles. The transmitter chains and the receiver chains may be non-uniformly spaced relative to each other.

As illustrated in FIG. 42, the transmit subarrays 4202 may be physically positioned at non-uniform distances equal to 1.4λ and 1.8λ relative to a transmit reference point. The value for λ is equal to a wavelength of signals to be transmitted by the transmit subarrays 4202. In addition, the transmit subarrays 4202 may include transmitter chains physically positioned at non-uniform distances equal to 0λ, 0.4λ, 0.7λ, 1λ, 1.1λ, 1.3λ, 1.7λ, 1.9λ, 2λ, 2.3λ, 2.6λ, and 3λ relative to the transmit reference point.

As illustrated in FIG. 42, the receive subarrays 4204 may be physically positioned at non-uniform distances equal to 5.2λ and 6.6λ relative to a receive reference point. The value for λ is equal to a wavelength of signals to be received by the receive subarrays 4204. In addition, the receive subarrays 4204 may include receiver chains physically positioned at non-uniform distances equal to 1.9λ, 3.3λ, 3.3λ, 4.6λ, 4.9λ, 6.1λ, 6.2λ, 6.4λ, 7.7λ, 7.7λ, and 9.1λ relative to the receive reference point.

The transmit subarrays 4202 and the receive subarrays 4204 may form a virtual subarray 4206 in accordance with at least one aspect described in the present disclosure. The virtual subarray 4206 may include portions physically positioned at non-uniform distances equal to 5.2λ, 5.6λ, 6.7λ, and 7.1λ relative to a subarray reference point. The value for λ is equal to the wavelength of signals to be received, transmitted, or some combination thereof by the virtual subarray 4206. In addition, the virtual subarray 4206 may include receiver chains and transmitter chains physically positioned at non-uniform distances equal to 1.9λ, 2.3λ, 3.4λ, 3.4λ, 3.8λ, 3.8λ, 4.7λ, 4.8λ, 5λ, 5.1λ, 5.2λ, 5.3λ, 6.2λ, 6.3λ, 6.4λ, 6.5λ, 6.7λ, 6.8λ, 7.7λ, 7.7λ, 8.1λ, 8.1λ, 9.2λ, and 9.6λ relative to the subarray reference point.

The distances illustrated in and described in relation to FIG. 42 are provided for example purposes. The distances between the receive subarrays 4204, the transmit subarrays 4202, the virtual subarray 4206, or some combination thereof may include any appropriate distance without departing from the spirit and scope of the present disclosure.

In some aspects, a radar device may include receiver chains and transmitter chains. The radar device may include a P number of transmitter chains and a Q number of receiver chains. Each of the transmitter chains may include an analog N×M subarray configured to form up to N×M beams. In addition, the transmitter chains may include a first passive BFN and a second passive BFN to form the beams in different angular dimensions. The transmitter chains may form the beams as a contiguous beam or as a spoiled beam. The second passive BFN may include VGAs to maximize transmit output power and to control sidelobe levels of the beam. In some aspects, the VGAs may window a corresponding antenna element. The first passive BFN may include VGAs to drive the second passive BFN to compensate for losses in the first passive BFN, the second passive BFN, or some combination thereof and to control sidelobe levels of the beam. In some aspects, the VGAs may window the corresponding second passive BFNs. At least one aspect described in the present disclosure may be configured to adjust peak sidelobe level at the virtual array in the digital domain.

A radar device may include receiver chains and an ADC stage. The receiver chain may include a subarray formed by receive antennas. Each of the receiver chains may include LNAs and receive chain portions. The LNAs may generate intermediate analog signals based on receive signals received by the receive antennas. The LNAs may generate each of the intermediate analog signals representative of a different receive signal. In addition, the LNAs and the receive antennas may operate as a spatial analog filter to reduce channel multipath and interference.

The receive chain portions may generate analog signals. The receive chain portions may generate each analog signal representative of a different intermediate analog signal. In some aspects, each of the receive chain portions may include a mixer, a VGA, and a filter. The mixers may generate mixed analog signals based on corresponding intermediate analog signals. The VGAs may generate amplified analog signals based on the corresponding mixed analog signals. The filters may generate the analog signals based on the amplified signals.

The ADC may generate digital signals based on the analog signals. The ADC stage may generate a different digital signal for each of the receive chain portions. The ADC stage may generate each digital signal representative of a corresponding analog signal.

In some aspects, the radar device may also include a P number of transmitter chains. The receiver chains may include a Q number of receiver chains. In these and other aspects, Q may be less than P. In addition, in some aspects, Q may be equal to or greater than P.

A radar device may include a DAC stage, transmitter chains, an ADC stage, and receiver chains. The DAC stage may be electrically coupled to the transmitter chains. The DAC stage may generate a digital signal for each of the transmitter chains.

Each of the transmitter chains may include a transmit chain portion and a transmit switch analog BFN. The transmit chain portions may be electrically coupled to the DAC stage. Each of the transmit chain portions may include a transmit filter, a transmit VGA, a transmit mixer, and a transmit splitter. The transmit filters may be electrically coupled to the DAC stage. The transmit VGAs may be electrically coupled to the corresponding transmit filters. The transmit mixers may be electrically coupled to the corresponding transmit VGAs. The transmit splitters may be electrically coupled to the corresponding transmit mixers.

The transmit switched analog BFNs may be electrically coupled to the corresponding transmit chain portions. The transmit switched analog BFNs may generate analog transmit signals that include a beam formed in accordance with a state of the transmit switched analog BFNs.

Each of the transmit switched analog BFNs may include a M×M BFN, VGAs, splitters, N×N BFNs, PAs, a first set of switches, and a second set of switches. The M×M BFNs may be electrically coupled to the corresponding transmit switched analog BFNs. The VGAs may be electrically coupled to the corresponding M×M BFNs. Each of the splitters may be electrically coupled to a different VGA. Each of the N×N BFNs may be electrically coupled to a different splitter. Each of the PAs may be electrically coupled to a different output of the corresponding N×N BFNs.

Each switch of the first set of switches may be electrically coupled between a different output of the corresponding transmit chain portion and the corresponding M×M BFN. Each switch of the second set of switches may be electrically coupled between a different splitter and a different input of the corresponding N×N BFN.

In some aspects, the transmit switched analog BFNs may include N×N BFNs and PAs. The transmitter chains may include subarrays formed by transmit antennas electrically coupled to the corresponding transmit switched analog BFNs.

The receive chain may include receive antennas, LNAs, and receive chain portions. The receive antennas may be electrically coupled to the LNAs. The LNAs may generate intermediate analog signals based on receive signals received by the receive antennas. Each of the receive chain portions may be electrically coupled to the corresponding LNAs. The receive chain portions may generate analog signals. The receive chain portions may generate each analog signal representative of a different intermediate analog signal.

The receive chain portion may include a mixer, a VGA, and a filter. The mixers may generate mixed analog signals based on the corresponding intermediate analog signals. The VGAs may generate amplified analog signals based on the corresponding mixed analog signals. The filters may generate the analog signals based on the corresponding amplified signals.

In some aspects, a radar device may include receiver chains and transmitter chains that both may be reconfigured. Each transmitter chain may include an analog N number of elements subarray to form an arbitrary number of beams. The receiver chains may include an analog M number of elements subarray to form an arbitrary number of beams.

The radar device may include a DAC stage, transmitter chains, receiver chains, and an ADC stage. The DAC stage may generate analog signals. The DAC stage may generate a different analog signal for each of the transmitter chains. The DAC stage may generate each of the analog signals representative of a single digital signal.

Each of the transmitter chains may include a transmit chain portion and an active BFN. The transmit chain portions may generate intermediate analog signals representative of the corresponding analog signals. The transmit chain portion may include a filter, a VGA, a mixer, and a splitter.

The filters may generate filtered analog signals based on the corresponding analog signals. The VGAs may generate amplified analog signals based on the corresponding filtered analog signals. The mixers may generate mixed analog signals based on the corresponding amplified analog signals. The splitters may generate the intermediate analog signals based on the corresponding mixed analog signals.

In some aspects, the transmit chain portions may generate the intermediate analog signals according to a uniform gain value associated with the transmit chain portions.

The active BFNs may generate analog transmit signals. The active BFNs may generate each of the analog transmit signals based on a different intermediate analog signal. The active BFNs may generate the analog transmit signals to include a beam formed in accordance with a configuration of the active BFNs. In some aspects, the active BFNs may generate the analog transmit signals according to a uniform gain value associated with the active BFNs.

Each of the active BFNs may include phase shifters and variable PAs. The phase shifters may shift a phase of each of the intermediate analog signals to generate phase shifted analog signals. The phase shifters may generate each phase shifted analog signal based on a different intermediate analog signal. The variable PAs may generate the analog transmit signals. The variable PAs may generate each analog transmit signal based on a different phase shifted analog signal. The variable PAs may maximize transmit output power of the analog transmit signals, control sidelobe levels of the subarray formed by the analog transmit signals, or some combination thereof. In addition, the variable PAs may include variable gain settings.

Each of the active BFNs may include the phase shifters and fixed PAs. The fixed PAs may generate the analog transmit signals. The fixed PAs may generate each of the analog transmit signals based on a different phase shifted analog signal. In addition, the fixed PAs may include fixed gain settings.

The active BFNs may form the analog transmit signals as a spoiled beam. The active BFNs may form the analog transmit signals as a contiguous beam. In some aspects, the active BFN and the subarray antenna aperture may operate as a spatial filter to reduce channel multipath and interference.

In some aspects, the active BFN may include a one dimensional array. In other aspects, the active BFN may include a two dimensional array.

In some aspects, the transmitter chains may include subarrays formed by transmit antennas. The transmit antennas may transmit signals representative of the analog transmit signals. Each of the transmit antennas may transmit a signal representative of a different analog transmit signal.

Each of the receive chains may include a receive active BFN and a receive chain portion. The receive active BFN may generate intermediate Rx analog signals based on the receive signals. The intermediate Rx analog signals may include a beam formed in accordance with a configuration of the receive active BFNs. Each of the receive active BFNs may include LNAs and variable phase shifters. The LNAs may generate amplified analog signals based on the receive signals. The variable phase shifters may variably shift a phase of each of the amplified analog signals to generate the intermediate analog signals. The variable phase shifters may generate each of the intermediate analog signals based on a different amplified analog signal.

In some aspects, the receive active BFN and the subarray aperture may operate as a spatial filter to reduce channel multipath and interference. The active receive BFNs may generate each of the intermediate analog signals representative of a different receive signal.

Each of the receive chain portions may generate a single Rx analog signal representative of the corresponding intermediate Rx analog signals. The receive chain portions may perform beamforming using the digital signal. Each of the receive chain portions may include a receive combiner, a mixer, a VGA, and a filter. The receive combiners may each generate a single combined analog signal based on the corresponding intermediate analog signals. The mixers may generate mixed analog signals based on the corresponding single combined analog signals. The VGAs may generate amplified analog signals based on the corresponding mixed analog signals. The filters may generate the single analog signals based on the corresponding amplified signals. In some aspects, a number of traces electrically coupling the active BFNs and the receive chain portions may be based on a wavelength of the intermediate analog signals.

The ADC stage may generate digital signals based on the Rx analog signals. The ADC stage may generate a different digital signal for each of the receiver chains. the ADC stage may generate each digital signal representative of a different Rx analog signal.

The transmitter chains may include a P number of transmitter chains and the receiver chains may include a Q number of receiver chains.

In some aspects, the active BFN, the active receive BFN, or some combination thereof may synthesize arbitrary gain and arbitrary phase to shape nulls in the beam of the receive signal, the transmit signal, or some combination thereof. The active BFN, the active receive BFN, or some combination thereof may form the beam to control sidelobe levels. In addition, the active BFN, the active receive BFN, or some combination thereof may form the beam to increase a dynamic range of the radar device for detecting objects.

In some aspects, the active BFNs may create arbitrary analog complex weights to shape the nulls in the beam pattern, to control sidelobe levels of the virtual antenna array, or some combination thereof. In these and other aspects, the active BFNs may generate the analog complex weights or the digital complex weights to optimize sidelobe peak levels while the radar device is scanning an environment.

In some aspects, the beam of the analog transmit signals and the beam of the receive signals may be formed to control sidelobe levels of the amplified formed analog signals and the receive signals through multiplication of the beam of the analog transmit signals and the beam of the receive signals. In addition, the beam of the analog transmit signals and the beam of the receive signals may be formed to increase a dynamic range of the radar device for detecting objects in the environment.

In some aspects, the receiver chains and the transmitter chains may be equally spaced (e.g., uniformly spaced). For example, the receive antennas and the transmit antennas may be equally spaced. The active BFNs may generate arbitrary complex weights to shape nulls in the beam pattern of the transmit signals from the transmit antennas.

In some aspects, the transmit antennas may be separated from each other according to a quotient of a wavelength of the analog transmit signals divided by a scaling factor between one and two. In these and other aspects, the transmit antennas may be uniformly spaced relative to each other. In addition, the receive antennas may be uniformly separated relative to each other.

The receiver chain may include a subarray formed by receive antennas to receive the receive signals. The receive antennas may be separated from each other according to a quotient of a wavelength of the analog transmit signals divided by a scaling factor between one and two.

In some aspects, the receiver chains and the transmitter chains may not be equally spaced (e.g., non-uniformly spaced). In these and other aspects, the active BFNs may only include the phase shifters (e.g., the LNAs and PAs may be omitted). In aspects that include non-uniformly spaced elements, the beam patterns and the sidelobe levels may be synthesized via optimized distribution of relative positions of antenna elements and subarrays. In addition, each of the transmit antennas may be excited at maximum power (based on pre-defined setting within the radar device or the transmit antennas) to cause maximum transceiver gain. The transmitter chains may control sector beam directions using analog phasing of the subarrays elements. The transceiver may perform beam scanning within the sectors digitally by phasing the transmitter chains, the receiver chains, or some combination thereof.

In some aspects, the transmitter chain may include transmit antennas configured to transmit signals representative of the analog transmit signals. Each of the transmit antennas may transmit a signal representative of a different analog transmit signal. In addition, the transmit antennas may be non-uniformly spaced relative to each other. In some aspects, the transmit antennas are non-uniformly spaced to generate minimum side-lobe-levels according to a distribution determined according to a classic global optimization method that includes at least one of a Genetic Algorithm, a Particle Swarm Optimization, and a Simulated Annealing, Gradient descent, or some combination thereof.

In some aspects, the transmitter chains (e.g., the transmit chain portions and the active BFNs) may be non-uniformly spaced relative to each other. The transmitter chains may be non-uniformly spaced to generate minimum side-lobe-levels according to a distribution determined according to a classic global optimization method that includes at least one of a Genetic Algorithm, a Particle Swarm Optimization, and a Simulated Annealing, Gradient descent, or some combination thereof.

In the following, various aspects of the present disclosure will be illustrated:

Example 1 may include A radar device that includes a DAC stage configured to generate a plurality of analog signals, the DAC stage generating a different analog signal for each transmitter chain of a plurality of transmitter chains, each analog signal of the plurality of analog signals representative of a single digital signal; and each transmitter chain of the plurality of transmitter chains includes a transmit chain portion configured to generate a plurality of intermediate analog signals representative of the corresponding analog signal; and a switched analog BFN configured to generate a plurality of analog transmit signals for one or more intermediate analog signals of the plurality of intermediate analog signals, the plurality of analog transmit signals including a beam formed in accordance with a state of the switched analog BFN.

Example 2 may include the radar device of example 1, wherein the transmitter chain further includes a plurality of transmit antennas configured to transmit a plurality of signals representative of the plurality of analog transmit signals.

Example 3 may include the radar device of example 2, wherein each transmit antenna of the plurality of transmit antennas is configured to transmit a signal representative of a different analog transmit signal of the plurality of analog transmit signals.

Example 4 may include the radar device of any of examples 1-3, wherein the transmit chain portion is further configured to perform beamforming using the digital signal.

Example 5 may include the radar device of any of examples 1-4, wherein the transmit chain portion includes a filter configured to generate a filtered analog signal based on the corresponding analog signal; a VGA configured to generate an amplified analog signal based on the filtered analog signal; a mixer configured to generate a mixed analog signal based on the amplified analog signal; and a splitter configured to generate the plurality of intermediate analog signals based on the mixed analog signal.

Example 6 may include the radar device of any of examples 1-5, wherein the switched analog BFN includes a first M×M BFN configured to generate a plurality of formed analog signals for one or more intermediate analog signals of the plurality of intermediate analog signals; a plurality of VGAs configured to generate an amplified formed analog signal for each formed analog signal of the plurality of formed analog signals; a plurality of splitters configured to generate a plurality of split analog signals for each amplified formed analog signal of the plurality of amplified formed analog signals; a second plurality of N×N BFNs configured to generate a plurality of additional analog signals for one or more split analog signals of the plurality of split analog signals; and a plurality of PAs configured to generate the plurality of analog transmit signals based on the plurality of additional analog signals.

Example 7 may include the radar device of example 6, wherein the first M×M BFN is configured to generate the plurality of formed analog signals formed in a first angular dimension.

Example 8 may include the radar device of example 7, wherein each N×N BFN of the second plurality of N×N BFNs is configured to generate the plurality of additional analog signals formed in a second angular dimension.

Example 9 may include the radar device of any of examples 1-8, wherein the switched analog BFN further includes a first plurality of switches and a second plurality of switches, the radar device further including a control circuit configured to control the first plurality of switches to cause the first M×M BFN to generate the plurality of formed analog signals as a particular number of analog signals; and control the second plurality of switches to cause each N×N BFN of the second plurality of N×N BFNs to generate the corresponding plurality of additional analog signals as a particular number of analog signals, wherein the state of the switched analog BFN includes a state of the first plurality of switches and a state of the second plurality of switches.

Example 10 may include the radar device of any of examples 1-9, wherein the switched analog BFN is configured to form the plurality of analog transmit signals as a contiguous beam.

Example 11 may include the radar device of any of examples 1-10, wherein the switched analog BFN is configured to form the plurality of analog transmit signals as a spoiled beam.

Example 12 may include the radar device of any of examples 1-11, wherein the switched analog BFN is configured to operate as a pre-select filter to reduce multipath interference.

Example 13 may include the radar device of example 6, wherein the plurality of PAs are configured to set a receiver noise figure, maximize transmit output power of the plurality of analog transmit signals, and to control sidelobe levels of the plurality of analog transmit signals.

Example 14 may include the radar device of example 6, wherein the plurality of VGAs are configured to window each amplified formed analog signal of the plurality of amplified formed analog signals in a particular angular dimension.

Example 15 may include the radar device of example 8, wherein the first angular dimension includes an azimuth dimension and the second angular dimension includes an elevation dimension.

Example 16 may include the radar device of example 6, wherein the plurality of VGAs are configured to act as driver amplifiers, compensate for losses in the first M×M BFN, and to control sidelobe levels of the plurality of amplified formed analog signals.

Example 17 may include the radar device of any of examples 1-4, wherein the switched analog BFN includes a second plurality of N×N BFNs configured to generate a plurality of formed analog signals for one or more intermediate analog signals of the plurality of intermediate analog signals; and a plurality of PAs configured to generate the plurality of analog transmit signals based on the plurality of formed analog signals.

Example 18 may include the radar device of any of examples 1-17 further including a plurality of receiver chains, wherein the plurality of transmitter chains include a P number of transmitter chains and the plurality of receiver chains include a Q number of receiver chains.

Example 19 may include a radar device that includes a plurality of receiver chains, each receiver chain includes a switched analog BFN configured to generate a plurality of intermediate analog signals based on a plurality of receive signals, the plurality of intermediate analog signals including a beam formed in accordance with a state of the switched analog BFN; and a receive chain portion configured to generate a single analog signal representative of the plurality of intermediate analog signals; and an ADC stage configured to generate a plurality of digital signals based on analog signals, the ADC stage generating a digital signal of the plurality of digital signals for each receiver chain of the plurality of receiver chains, each digital signal representative of a corresponding analog signal.

Example 20 may include the radar device of example 19, wherein the receiver chain further includes a plurality of receive antennas configured to receive the plurality of receive signals.

Example 21 may include the radar device of example 20, wherein the switched analog BFN is configured to generate each intermediate analog signal of the plurality of intermediate analog signals representative of a different receive signal of the plurality of receive signals.

Example 22 may include the radar device of any of examples 19-21, wherein the receive chain portion is further configured to perform beamforming using the digital signal.

Example 23 may include the radar device of any of examples 19-22, wherein the switched analog BFN includes a plurality of LNAs configured to generate a plurality of amplified analog signals based on the plurality of receive signals; a second plurality of N×N BFNs configured to generate a plurality of formed analog signals for each amplified analog signal of the plurality of amplified analog signals; a plurality of combiners configured to generate a plurality of combined analog signals based on at least a portion of the plurality of formed analog signals; a plurality of VGAs configured to generate a plurality of combined amplified analog signals, the plurality of VGAs configured to generate a combined amplified analog signal for each combined analog signal; and a first M×M BFN configured to generate the plurality of intermediate analog signals based at least a portion of the plurality of combined amplified analog signals.

Example 24 may include the radar device of example 23, wherein the first M×M BFN is configured to generate the plurality of intermediate analog signals formed in a first angular dimension.

Example 25 may include the radar device of example 24, wherein the second plurality of N×N BFNs are configured to generate the plurality of formed analog signals formed in a second angular dimension.

Example 26 may include the radar device of any of examples 23-25, wherein the switched analog BFN further includes a first plurality of switches and a second plurality of switches, the radar device further including a control circuit configured to control the first plurality of switches to cause the plurality of combiners to generate the plurality of combined analog signals for a particular number of formed analog signals of the plurality of formed analog signals; and control the second plurality of switches to cause the plurality of intermediate analog signals to be a particular number of analog signals.

Example 27 may include the radar device of any of examples 19-26, wherein the receive chain portion includes a receive combiner configured to generate a single combined analog signal based on the plurality of intermediate analog signals; a mixer configured to generate a mixed analog signal based on the single combined analog signal; a VGA configured to generate an amplified analog signal based on the mixed analog signal; and a filter configured to generate the single analog signal based on the amplified signal.

Example 28 may include the radar device of any of examples 19-27, wherein the switched analog BFN is configured to operate as a pre-select filter to reduce multipath interference.

Example 29 may include the radar device of example 25, wherein the first angular dimension includes an azimuth dimension and the second angular dimension includes an elevation dimension.

Example 30 may include the radar device of any of examples 19-29, further including a plurality of transmitter chains, wherein the plurality of transmitter chains include a P number of transmitter chains and the plurality of receiver chains include a Q number of receiver chains.

Example 31 may include a radar device that includes a DAC stage electrically coupled to a plurality of transmitter chains, each transmitter chain of the plurality of transmitter chains includes a transmit chain portion electrically coupled to the DAC stage; and a transmit switched analog BFN electrically coupled to the transmit chain portion, the transmit switched analog BFN configured to generate a plurality of analog transmit signals including a beam formed in accordance with a state of the transmit switched analog BFN; and an ADC stage electrically coupled to a plurality of receiver chains, each receiver chain of the plurality of receiver chains includes a receive switched analog BFN configured to generate a plurality of intermediate analog signals including a beam formed in accordance with a state of the receive switched analog BFN; and a receive chain portion electrically coupled to the receive switched analog BFN and the ADC stage.

Example 32 may include the radar device of example 31, wherein the transmitter chain further includes a plurality of transmit antennas electrically coupled to the transmit switched analog BFN.

Example 33 may include the radar device of any of examples 31 and 32, wherein each receiver chain further includes a plurality of receive antennas electrically coupled to the receive switched analog BFN.

Example 34 may include the radar device of any of examples 31-33, wherein the transmit switched analog BFN includes a transmit filter electrically coupled to the DAC stage; a transmit VGA electrically coupled to the transmit filter; a transmit mixer electrically coupled to the transmit VGA; and a transmit splitter electrically coupled to the transmit mixer.

Example 35 may include the radar device of any of examples 31-34, wherein the transmit switched analog BFN includes a first M×M BFN electrically coupled to the transmit switched analog BFN; a plurality of VGAs electrically coupled to the first M×M BFN; a plurality of splitters, each splitter of the plurality of splitters electrically coupled to a different VGA of the plurality of VGAs; a second plurality of N×N BFNs, each N×N BFN of the second plurality of N×N BFNs electrically coupled to a different splitter of the plurality of splitters; and a plurality of PAs, each PA of the plurality of PAs electrically coupled to a different output of the second plurality of N×N BFNs.

Example 36 may include the radar device of example 35, wherein the transmit switched analog BFN further includes a first plurality of switches, each switch of the first plurality of switches electrically coupled between a different output of the transmit chain portion and the first M×M BFN; and a second plurality of switches, each switch of the second plurality of switches electrically coupled between a different splitter of the plurality of splitters and a different input of the second plurality of N×N BFNs.

Example 37 may include the radar device of any of examples 31-36, wherein the receive switched analog BFN includes a plurality of LNAs, a second plurality of receive N×N BFNs, each input of the second plurality of receive N×N BFNs electrically coupled to a different LNA of the plurality of LNAs; a plurality of combiners, each combiner of the plurality of combiners electrically coupled to a different output of the second plurality of receive N×N BFNs; a plurality of receive VGAs, each receive VGA of the plurality of receive VGAs electrically coupled to a different combiner of the plurality of combiners; and a first receive M×M BFN electrically coupled to the plurality of receive VGAs.

Example 38 may include the radar device of example 37, wherein the receive switched analog BFN further includes a third plurality of switches, each switch of the third plurality of switches electrically coupled between a different output of the first receive M×M BFN and the receive chain portion; and a fourth plurality of switches, each switch of the fourth plurality of switches electrically coupled between an output of the second plurality of N×N BFNs and a different combiner of the plurality of combiners.

Example 39 may include the radar device of any of examples 31-38, wherein the receive chain portion includes a receive combiner electrically coupled to the receive switched analog BFN; a receive mixer electrically coupled to the receive combiner; a receive VGA electrically coupled to the receive mixer; and a receive filter electrically coupled to the receive VGA.

Example 40 may include the radar device of any of examples 31-34, wherein the transmit switched analog BFN includes a second plurality of N×N BFNs coupled to the transmit chain portion; and a plurality of PAs, each PA of the plurality of PAs electrically coupled to a different output of the second plurality of N×N BFNs.

Example 41 may include the radar device of any of examples 31-40, wherein the plurality of transmitter chains include a P number of transmitter chains and the plurality of receiver chains include a Q number of receiver chains.

Example 42 may include a radar device that includes means to generate a plurality of analog signals, each analog signal of the plurality of analog signals representative of a single digital signal; means to generate a plurality of intermediate analog signals representative of a corresponding analog signal; and means to generate a plurality of analog transmit signals for one or more intermediate analog signals of the plurality of intermediate analog signals, the plurality of analog transmit signals including a beam formed in accordance with a state of the means to generate the plurality of analog transmit signals.

Example 43 may include a radar device that includes means to generate a plurality of intermediate analog signals based on a plurality of receive signals, the plurality of intermediate analog signals including a beam formed in accordance with a state of the means to generate the plurality of intermediate analog signals; means to generate a single analog signal representative of the plurality of intermediate analog signals; and means to generate a plurality of digital signals based on analog signals, the means generating a digital signal of the plurality of digital signals for each means to generate the single analog signal, each digital signal representative of a corresponding analog signal.

Example 44 may include a lens antenna system that includes a reconfigurable aperture configured to receive a source beam; and provide an output beam based on an impedance of the reconfigurable aperture and the received source beam; and a control device operatively coupled to the reconfigurable aperture, wherein the control device is configured to control the impedance of the reconfigurable aperture to configure and reconfigure a beam pattern of the output beam.

Example 45 may include the lens antenna system of example 44 further including a plurality of antenna elements physically positioned proximate the reconfigurable aperture, wherein the plurality of antennas are configured to generate the source beam.

Example 46 may include the lens antenna system of any of examples 44 and 45, wherein the control device is configured to control the surface impedance distribution of the reconfigurable aperture to permit at least a portion of the received source beam to propagate the reconfigurable aperture as the output beam.

Example 47 may include the lens antenna system of any of examples 44-46, wherein the reconfigurable aperture includes a plurality of diodes physically positioned on a surface of the reconfigurable aperture and the control device is configured to bias the plurality of diodes to control the impedance of the reconfigurable aperture.

Example 48 may include the lens antenna system of example 47, wherein the plurality of diodes are arranged in a pixelated pattern on the surface of the reconfigurable aperture.

Example 49 may include the lens antenna system of any of examples 47 and 48, wherein each diode of the plurality of diodes are configured to operate in states including a first state that permits at least a portion of the source beam propagate the corresponding diode; and a second state that prevents the source beam from propagating the corresponding diode.

Example 50 may include the lens antenna system of any of examples 47-49, wherein the control device is configured to bias each diode of the plurality of diodes to configure and reconfigure the beam pattern of the output beam.

Example 51 may include the lens antenna system of any of examples 47-49, wherein the control device is configured to bias each diode of the plurality of diodes to control the state of each diode of the plurality of diodes.

Example 52 may include the lens antenna system of example 49, wherein the first state includes an analog state and the control device is configured to control a level of voltage signals provided to the plurality of diodes to change the impedance of the reconfigurable aperture.

Example 53 may include the lens antenna system of any of examples 49-52, wherein the first state includes an on-state mode in a forward bias solid-state plasma condition of the corresponding diode of the plurality of diodes; and the second state includes an off-state mode under open bias of the corresponding diode of the plurality of diodes.

Example 54 may include the lens antenna system of any of examples 49-53, wherein each diode of the plurality diodes includes a P region, a N region, and an I region, and the P region and the N region are configured to be biased to control an impedance of the I region and the state of the corresponding diode.

Example 55 may include the lens antenna system of example 54, wherein the I region is physically positioned between the P region and the N region and the I region physically contacts the P region and the N region, wherein a range of impedance values of the impedance of the I region is based on a distance between the P region and the N region.

Example 56 may include the lens antenna system of example 55, wherein each diode of the plurality of diodes further includes a buried oxide region and the range of impedance values of the impedance of the I region is further based on a thickness of the P region, the N region, and the I region on top of the buried oxide region.

Example 57 may include the lens antenna system of any of examples 47-56, wherein the plurality of diodes include a plurality of PIN diodes.

Example 58 may include the lens antenna system of any of examples 48-57, wherein the control device is configured to control each diode of the plurality of diodes.

Example 59 may include the lens antenna system of any of examples 49-58, wherein the reconfigurable aperture further includes a static portion, the static portion causing the reconfigurable aperture to provide the output beam as at least a minimum beam pattern when the state of the plurality of diodes are the second state.

Example 60 may include a lens antenna system that includes a reconfigurable aperture including a plurality of diodes configured to receive a source beam; and provide an output beam based on an impedance of the plurality of diodes and the received source beam; and a control device operatively coupled to the plurality of diodes, wherein the control device is configured to control the impedance of the plurality of diodes to configure and reconfigure a beam pattern of the output beam.

Example 61 may include the lens antenna system of example 60 further including a plurality of antenna elements physically positioned proximate the plurality of diodes, wherein the plurality of antenna elements are configured to generate the source beam.

Example 62 may include the lens antenna system of example 61, wherein the control device include a plurality of control circuits and each control circuit is operatively coupled to a different diode of the plurality of diodes.

Example 63 may include the lens antenna system of example 62, wherein each control circuit includes a diode driver operatively coupled to the corresponding diode and configured to set a state of the corresponding diode; a temperature sensor physically positioned proximate the corresponding diode and configured to detect a temperature of the corresponding diode; and a UCL operatively coupled to the diode driver and the temperature sensor, the UCL configured to provide a signal to the diode driver based on a control signal and the temperature of the corresponding diode.

Example 64 may include the lens antenna system of example 63, wherein the diode driver is configured to set the state of the corresponding diode by providing a voltage signal to the corresponding diode based on the signal from the UCL.

Example 65 may include the lens antenna system of Example 64, wherein the diode driver changes a level of the voltage signal to control the impedance of the corresponding diode.

Example 66 may include the lens antenna system of any of examples 63-65, wherein the temperature sensor provides a temperature measurement of the corresponding diode to the UCL as a feedback loop.

Example 67 may include the lens antenna system of any of examples 63-66, wherein an impedance rating of the corresponding diode changes as the temperature of the corresponding diode changes and the UCL adjusts the signal to the diode driver to cause the diode driver to set the state of the corresponding diode to maintain the impedance of the corresponding diode during operation.

Example 68 may include the lens antenna system of any of Examples 63-66, wherein the UCL includes a memory block that includes a temperature map associated with the corresponding diode and the UCL is configured to compare the temperature of the corresponding diode to the temperature map to adjust the signal to the diode driver accordingly.

Example 69 may include the lens antenna system of any of examples 63-68, wherein the UCL includes a look up table that includes a table of impedance ratings versus temperature associated with the corresponding diode and the UCL is configured to compare the temperature of the corresponding diode to the table of impedance ratings versus temperature to adjust the signal to the diode driver accordingly.

Example 70 may include the lens antenna system of any of examples 63-69, wherein the UCL includes a communication interface operatively coupled to one or more UCLs of other control circuits of the plurality of control circuits.

Example 71 may include the lens antenna system of example 70, wherein the control device further includes a main control device operatively coupled to the communication interface and the communication interface is configured to operate according to a direct addressable mode and each UCL of the plurality of control circuits receives the control signal from the main control device.

Example 72 may include the lens antenna system of example 71, wherein the control signal includes the temperature map or the table of impedance ratings versus temperature associated with the corresponding diode.

Example 73 may include the lens antenna system of example 70, wherein the control device further includes a main control device operatively coupled to each communication interface of the plurality of control circuits; the communication interfaces are configured to operate according to an automatic repeater mode; a first UCL of a row or column of the plurality of control circuits receives the control signal from the main control device; and the first UCL provides the control signal to a second UCL of the row or column of the plurality of control circuits.

Example 74 may include the lens antenna system of any of examples 63-73, wherein the control circuit further includes a current sensor configured to detect an impedance of the corresponding diode and the UCL is configured to determine performance over process, PVT of the corresponding diode using closed-loop control using the temperature of the corresponding diode and the impedance of the corresponding diode.

Example 75 may include the lens antenna system of any of examples 61-74, wherein the control device controls the plurality of diodes to synthesize a spatial radiation beam pattern of the output beam.

Example 76 may include the lens antenna system of any of examples 61-75, wherein the control device controls the plurality of diodes to configure and reconfigure a field of view, perform scanning, suppress side-lobes, perform null-steering, or some combination thereof.

Example 77 may include a lens antenna system for beam scanning, that includes a packaged module that includes a surface wave source configured to provide a surface wave; a package substrate layer configured to propagate the surface wave; a reconfigurable hologram layer physically attached to a surface of the package substrate layer, the reconfigurable hologram layer configured to receive the surface wave; and provide an output beam based on an impedance of the reconfigurable hologram layer and the surface wave; and a control device operatively coupled to the reconfigurable hologram layer, wherein the control device is configured to control the impedance of the reconfigurable hologram layer to configure and reconfigure a beam pattern of the output beam.

Example 78 may include the lens antenna system for beam scanning of example 77, wherein the packaged module further includes a bottom layer physically positioned proximate the package substrate layer that is grounded to support propagation of the surface wave within the package substrate layer.

Example 79 may include the lens antenna system for beam scanning of any of examples 77 and 78, wherein the surface wave source includes a center PTH via.

Example 80 may include the lens antenna system for beam scanning of any of examples 77-79, wherein the surface wave source operates as a monopole surface wave launcher.

Example 81 may include the lens antenna system for beam scanning of any of examples 77-80, wherein the reconfigurable hologram layer includes a plurality of patches arranged in a pattern.

Example 82 may include the lens antenna system for beam scanning of example 81, wherein each patch of the plurality of patches includes a plurality of diodes and the control device is configured to adjust a size or shape of the patches to adjust the beam pattern of the output beam.

Example 83 may include the lens antenna system for beam scanning of example 82, wherein the packaged module further includes a silicon substrate layer physically attached to a surface of the reconfigurable hologram layer, the silicon substrate layer including one or more control buses operatively coupled to the plurality of diodes; and a plurality of control vias physically positioned at a periphery of the packaged module and operatively coupled to the control busses, the control vias configured to propagate signals from the control device to the control buses, wherein the control busses are configured to provide the control signals to the plurality of diodes to adjust the beam pattern of the output beam.

Example 84 may include the lens antenna system for beam scanning of example 83, wherein the silicon substrate layer includes a flip-chip silicon wafer.

Example 85 may include the lens antenna system for beam scanning of any of examples 77-84 further including a transceiver circuit electrically coupled to the surface wave source, the transceiver circuit provides a radio frequency signal to the surface wave source and the surface wave source provides the surface wave based on the radio frequency signal.

Example 86 may include the lens antenna system for beam scanning of any of examples 77-85, wherein the reconfigurable hologram layer is configured to provide the output beam with the beam pattern between −70 degrees and 70 degrees.

Example 87 may include the lens antenna system for beam scanning of any of examples 77-86 further including a plurality of termination resistors configured to terminate residual surface currents caused by the surface wave.

Example 88 may include the lens antenna system for beam scanning of any of example 77-87, wherein the reconfigurable hologram layer is configured to provide the output beam with the beam pattern in an azimuth dimension.

Example 89 may include the lens antenna system for beam scanning of any of examples 77-87, wherein the reconfigurable hologram layer is configured to provide the output beam with the beam pattern in an elevation dimension.

Example 90 may include the lens antenna system for beam scanning of any of examples 77-89, wherein the reconfigurable aperture includes a plurality of elliptical zones and the elliptical zones are concentric.

Example 91 may include the lens antenna system for beam scanning of any of examples 77-89, wherein the reconfigurable aperture includes a plurality of elliptical zones and the elliptical zones are eccentric.

Example 92 may include the lens antenna system for beam scanning of any of examples 77-91, wherein the reconfigurable aperture includes a plurality of elliptical zones and each elliptical zone of the plurality of elliptical zones includes an equal area size.

Example 93 may include the lens antenna system for beam scanning of any of example 77-91, wherein the reconfigurable aperture includes a plurality of elliptical zones and two or more of the elliptical zones of the plurality of elliptical zones include different area sizes.

Example 94 may include a lens antenna system that includes an optical source configured to provide an optical source signal; an aperture configured to receive the optical source signal; and provide an output optical signal based on an beam splitting configuration of the aperture and the received optical source signal; and a control device operatively coupled to the optical source, wherein the control device is configured to control the optical source providing the optical source signal to configure and reconfigure a mode of the output optical signal.

Example 95 may include the lens antenna system of example 94, wherein the aperture includes a plurality of beam splitters physically positioned proximate the optical source and the plurality of beam splitters include the beam splitting configuration and permit at least a portion of the received optical source to propagate the aperture as the output optical signal.

Example 96 may include the lens antenna system of any of example 94 and 95, wherein the optical source includes a plurality of light emitting diodes configured to provide the optical source signal.

Example 97 may include the lens antenna system of any of examples 95 and 96, wherein the plurality of light emitting diodes are arranged in a pixelated pattern and the plurality of beam splitters are arranged in a corresponding pixelated pattern on a surface of the aperture.

Example 98 may include a lens antenna system that includes an antenna configured to provide a source beam; a reconfigurable twister reflector configured to receive the source beam; and provide a polarized beam based on a phase configuration of the reconfigurable twister reflector and the source beam; and a polarizer configured to receive the source beam and the polarized beam; provide an output beam based on a polarization configuration of the polarizer, the source beam, and the polarized beam; and a control device operatively coupled to the reconfigurable twister reflector, wherein the control device is configured to control the impedance of the reconfigurable twister reflector to configure and reconfigure the phase configuration of the reconfigurable twister reflector and a beam pattern of the output beam.

Example 99 may include the lens antenna system of example 98, wherein the reconfigurable twister reflector includes a plurality of diodes and the control device is configured to bias the plurality of diodes to control the impedance of the reconfigurable twister.

Example 100 may include the lens antenna system of example 99, wherein the plurality of diodes include a plurality of SPIN diodes Example 101 may include the lens antenna system of any of examples 98-100, wherein the antenna includes a plurality of feeding antennas configured to support a plurality of fields of views Example 102 may include the lens antenna system of any of examples 98-101, wherein the reconfigurable twister reflector is configured to operate in seven different phase configurations.

Example 103 may include the lens antenna system of example 102, wherein a current phase configuration of the reconfigurable twister reflector is controlled by impedances of a plurality of patches, each patch of the plurality of patches includes a plurality of diodes.

Example 104 may include the lens antenna system of any of examples 98-103, wherein the lens antenna system includes a chip assembly and the lens antenna system further includes a RFIC, wherein the RFIC is configured to provide the source beam to the antenna; the polarizer includes a plurality of strips of silicon; the reconfigurable twister reflector includes a plurality of patches of silicon, the antenna includes a plurality of integrated silicon on chip substrate integrated waveguides electrically coupled to the RFIC and physically positioned between the RFIC and the plurality of patches of silicon of the reconfigurable twister reflector; and the reconfigurable twister reflector extends from the antenna towards the plurality of strips of silicon of the polarizer.

Example 105 may include the lens antenna system of example 104, wherein the reconfigurable twister reflector includes a twister layer physically positioned proximate the plurality of patches of silicon of the reconfigurable twister reflector; and a control plane operatively coupled to the twister layer and the control device and the control plane extends from the antenna to the twister layer, the control plane configured to provide control signals from the control device to the twister layer.

Example 106 may include a radar device that includes a plurality of receiver chains and an ADC stage. The receiver chains may include LNAs. The LNAs may be configured to generate a plurality of intermediate analog signals based on a plurality of receive signals. The receiver chains may also include a plurality of receive chain portions. The receive chain portions may generate a plurality of analog signals. Each analog signal of the plurality of analog signals may be representative of a different intermediate analog signal of the plurality of intermediate analog signals. The ADC stage may generate a plurality of digital signals based on the plurality of analog signals. The ADC stage may generate a digital signal of the plurality of digital signals for each receive chain portion of the plurality of receive chain portions, each digital signal representative of a corresponding analog signal of the plurality of analog signals.

Example 107 may include the radar device of example 106, wherein the receiver chain further includes a subarray formed by a plurality of receive antennas configured to receive the plurality of receive signals.

Example 108 may include the radar device of example 107, wherein the LNAs are configured to generate each intermediate analog signal of the plurality of intermediate analog signals representative of a different receive signal of the plurality of receive signals.

Example 109 may include the radar device of any of examples 106-108, wherein each receive chain portion of the plurality of receive chain portions includes a mixer configured to generate a mixed analog signal based on a corresponding intermediate analog signal of the plurality of intermediate analog signals; a VGA configured to generate an amplified analog signal based on the mixed analog signal; and a filter configured to generate the single analog signal based on the amplified signal.

Example 110 may include the radar device of any of example 107-109, wherein the LNAs and subarray antenna aperture are configured to operate as a spatial analog filter to reduce channel multipath and interference.

Example 111 may include the radar device of any of examples 106-110, further including a plurality of transmitter chains, wherein the plurality of transmitter chains include a P number of transmitter chains and the plurality of receiver chains include a Q number of receiver chains.

Example 112 may include a radar device that includes: a DAC stage electrically coupled to a plurality of transmitter chains, each transmitter chain of the plurality of transmitter chains includes a transmit chain portion electrically coupled to the DAC stage; and a transmit switched analog BFN electrically coupled to the transmit chain portion, the transmit switched analog BFN configured to generate a plurality of analog transmit signals including a beam formed in accordance with a state of the transmit switched analog BFN; and an ADC stage electrically coupled to a plurality of receiver chains that include a plurality of LNAs configured to generate a plurality of intermediate analog signals based on a plurality of receive signals; and a plurality of receive chain portions electrically coupled to the plurality of LNAs and the ADC stage, the plurality of receive chain portions configured to generate a plurality of analog signals, each analog signal of the plurality of analog signals representative of a different intermediate analog signal of the plurality of intermediate analog signals.

Example 113 may include the radar device of example 112, wherein the transmitter chain further includes a subarray formed by a plurality of transmit antennas electrically coupled to the transmit switched analog BFN.

Example 114 may include the radar device of any of examples 112 and 113, wherein each receiver chain further includes a plurality of receive antennas electrically coupled to the plurality of LNAs.

Example 115 may include the radar device of any of examples 112-1149, wherein the transmit chain portion includes: a transmit filter electrically coupled to the DAC stage; a transmit VGA electrically coupled to the transmit filter; a transmit mixer electrically coupled to the transmit VGA; and a transmit splitter electrically coupled to the transmit mixer.

Example 116 may include the radar device of any of examples 112-115, wherein the transmit switched analog BFN includes: a M×M BFN electrically coupled to the transmit switched analog BFN; a plurality of VGAs electrically coupled to the M×M BFN; a plurality of splitters, each splitter of the plurality of splitters electrically coupled to a different VGA of the plurality of VGAs; a plurality of N×N BFNs, each N×N BFN of the plurality of N×N BFNs electrically coupled to a different splitter of the plurality of splitters; and a plurality of PAs, each PA of the plurality of PAs electrically coupled to a different output of the plurality of N×N BFNs.

Example 117 may include the radar device of example 116, wherein the transmit switched analog BFN further includes: a first plurality of switches, each switch of the first plurality of switches electrically coupled between a different output of the transmit chain portion and the M×M BFN; and a second plurality of switches, each switch of the second plurality of switches electrically coupled between a different splitter of the plurality of splitters and a different input of the plurality of N×N BFNs.

Example 118 may include the radar device of any of examples 112-117, wherein each receive chain portion of the plurality of receive chain portions includes a mixer configured to generate a mixed analog signal based on a corresponding intermediate analog signal of the plurality of intermediate analog signals; a VGA configured to generate an amplified analog signal based on the mixed analog signal; and a filter configured to generate the single analog signal based on the amplified signal.

Example 119 may include the radar device of examples 116-118, wherein the transmit switched analog BFN includes: a plurality of N×N BFNs coupled to the transmit chain portion; and a plurality of PAs, each PA of the plurality of PAs electrically coupled to a different output of the plurality of N×N BFNs.

Example 120 may include the radar device of any of examples 112-119, wherein the plurality of transmitter chains include a P number of transmitter chains and the plurality of receiver chains include a Q number of receiver chains.

Example 121 may include a radar device that includes: a DAC stage configured to generate a plurality of analog signals, the DAC stage generating a different analog signal for each transmitter chain of a plurality of transmitter chains, each analog signal of the plurality of analog signals representative of a single digital signal; and each transmitter chain of the plurality of transmitter chains includes: a transmit chain portion configured to generate a plurality of intermediate analog signals representative of the corresponding analog signal; and an active BFN configured to generate a plurality of analog transmit signals, each analog transmit signal of the plurality of analog signals based on a different intermediate analog signal of the plurality of intermediate analog signals, the plurality of analog transmit signals including a beam formed in accordance with a configuration of the active BFN.

Example 122 may include the radar device of example 121, wherein the transmitter chain further includes a subarray formed by a plurality of transmit antennas configured to transmit a plurality of signals representative of the plurality of analog transmit signals.

Example 123 may include the radar device of example 122, wherein each transmit antenna of the plurality of transmit antennas is configured to transmit a signal representative of a different analog transmit signal of the plurality of analog transmit signals.

Example 124 may include the radar device of any of examples 122 and 123, wherein the plurality of transmit antennas are uniformly spaced relative to each other.

Example 125 may include the radar device of example 124, wherein the plurality of transmit antennas are separated from each other according to a quotient of a wavelength of the plurality of analog transmit signals divided by a scaling factor between one and two.

Example 126 may include the radar device of any of examples 121-125, wherein the transmit chain portion includes: a filter configured to generate a filtered analog signal based on the corresponding analog signal; a VGA configured to generate an amplified analog signal based on the filtered analog signal; a mixer configured to generate a mixed analog signal based on the amplified analog signal; and a splitter configured to generate the plurality of intermediate analog signals based on the mixed analog signal.

Example 127 may include the radar device of any of examples 121-126, wherein the active BFN includes: a plurality of phase shifters configured to shift a phase of each intermediate analog signal of the plurality of intermediate analog signals to generate a plurality of phase shifted analog signals, each phase shifted analog signal of the plurality of phase shifted analog signals based on a different intermediate analog signal of the plurality of intermediate analog signals; and a plurality of PAs configured to generate the plurality of analog transmit signals, each analog transmit signal of the plurality of transmit signals based on a different phase shifted analog signal of the plurality of phase shifted analog signals.

Example 128 may include the radar device of any of examples 121-127, wherein the active BFN is configured to form the plurality of analog transmit signals as a contiguous beam.

Example 129 may include the radar device of any of examples 121-128, wherein the active BFN and subarray antenna aperture are configured to operate as a spatial filter to reduce channel multipath and interference.

Example 130 may include the radar device of example 127, wherein the plurality of PAs are configured to maximize transmit output power of the plurality of analog transmit signals, and/or control sidelobe levels of the subarray formed by a plurality of analog transmit signals.

Example 131 may include the radar device of any of examples 121-130 further including a plurality of receiver chains, wherein the plurality of transmitter chains include a P number of transmitter chains and the plurality of receiver chains include a Q number of receiver chains.

Example 132 may include the radar device of any of examples 121-131, wherein the active BFN is configured as a one dimensional array.

Example 133 may include the radar device of any of examples 121-131, wherein the active BFN is configured as a two dimensional array.

Example 134 may include the radar device of any of examples 121-133, wherein the active BFN is configured to synthesize arbitrary gain and arbitrary phase to shape nulls in the beam of at least one of the subarray and the plurality of analog transmit signals.

Example 135 may include the radar device of any of examples 121-134, wherein the beam of the plurality of analog transmit signals is formed to control sidelobe levels of the plurality of amplified formed analog signals.

Example 136 may include the radar device of any of examples 121-135, wherein the beam of the plurality of analog transmit signals is formed to increase a dynamic range of the radar device for detecting objects.

Example 137 may include the radar device of any of examples 121-136, wherein the plurality of transmitter chains are uniformly spaced relative to each other.

Example 138 may include the radar device of any of examples 121-126, wherein the active BFN includes a plurality of variable phase shifters configured to variably shift a phase of each intermediate analog signal of the plurality of intermediate analog signals to generate a plurality of phase shifted transmit signals, each phase shifted transmit signal of the plurality of phase shifted transmit signals based on a different intermediate analog signal of the plurality of intermediate analog signals.

Example 139 may include the radar device of example 138, wherein the active BFN includes: a plurality of variable phase shifters configured to variably shift the phase of each intermediate analog signal of the plurality of intermediate analog signals to generate the plurality of phase shifted analog signals, each phase shifted analog signal of the plurality of phase shifted analog signals based on a different intermediate analog signal of the plurality of intermediate analog signals; and a plurality of fixed PAs configured to generate the plurality of analog transmit signals, each analog transmit signal of the plurality of transmit signals based on a different phase shifted analog signal of the plurality of phase shifted analog signals.

Example 140 may include the radar device of any of examples 138 and 139, wherein the transmitter chain further includes a plurality of transmit antennas configured to transmit a plurality of signals representative of the plurality of analog transmit signals, each transmit antenna of the plurality of transmit antennas is configured to transmit a signal representative of a different analog transmit signal of the plurality of analog transmit signals, and wherein the plurality of transmit antennas are non-uniformly spaced relative to each other.

Example 141 may include the radar device of example 140, wherein the plurality of antennas are non-uniformly spaced to generate minimum side-lobe-level according to a distribution determined according to a classic global optimization method that includes at least one of a Genetic Algorithm, a Particle Swarm Optimization, and a Simulated Annealing, Gradient descent.

Example 142 may include the radar device of any of examples 138-141, wherein the plurality of transmitter chains are non-uniformly spaced relative to each other.

Example 143 may include the radar device of example 142, wherein the plurality of transmitter chains are non-uniformly spaced to generate minimum side-lobe-level according to a distribution determined according to a classic global optimization method that includes at least one of a Genetic Algorithm, a Particle Swarm Optimization, and a Simulated Annealing, Gradient descent.

Example 144 may include the radar device of any of examples 138-143, wherein the active BFN is configured to form the plurality of analog transmit signals as a spoiled beam.

Example 145 may include the radar device of any of examples 138-143, wherein the active BFN is configured to form the plurality of analog transmit signals as a contiguous beam.

Example 146 may include the radar device of any of examples 138-145, wherein the transmit chain portion generates the plurality of intermediate analog signals according to a uniform gain value associated with the transmit chain portion.

Example 147 may include the radar device of any of examples 138-146, wherein the active BFN generates the plurality of analog transmit signals according to a uniform gain value associated with the active BFN.

Example 148 may include a radar device that includes: a plurality of receiver chains, each receiver chain includes: an active BFN configured to generate a plurality of intermediate analog signals based on a plurality of receive signals, the plurality of intermediate analog signals including a beam formed in accordance with a configuration of the active BFN; and a receive chain portion configured to generate a single analog signal representative of the plurality of intermediate analog signals; and an ADC stage configured to generate a plurality of digital signals based on analog signals, the ADC stage generating a digital signal of the plurality of digital signals for each receiver chain of the plurality of receiver chains, each digital signal representative of a corresponding analog signal.

Example 149 may include the radar device of example 148, wherein the receiver chain further includes a subarray formed by a plurality of receive antennas configured to receive the plurality of receive signals.

Example 150 may include the radar device of example 149, wherein the plurality of receive antennas are uniformly spaced relative to each other.

Example 151 may include the radar device of example 150, wherein the plurality of receive antennas are separated from each other according to a quotient of a wavelength of the plurality of analog transmit signals divided by a scaling factor between one and two.

Example 152 may include the radar device of example 149, wherein the plurality of receive antennas are non-uniformly spaced relative to each other.

Example 153 may include the radar device of any of examples 149-152, wherein the active BFN is configured to generate each intermediate analog signal of the plurality of intermediate analog signals representative of a different receive signal of the plurality of receive signals.

Example 154 may include the radar device of any of examples 148-153, wherein the receive chain portion is further configured to perform beamforming using the digital signal in the receiver chains.

Example 155 may include the radar device of any of examples 148-154, wherein the active BFN includes: a plurality of LNAs configured to generate a plurality of amplified analog signals based on the plurality of receive signals; and a plurality of variable phase shifters configured to variably shift a phase of each amplified analog signal of the plurality of amplified analog signals to generate the plurality of intermediate analog signals, each intermediate analog signal of the plurality of intermediate analog signals based on a different amplified analog signal of the plurality of amplified analog signals.

Example 156 may include the radar device of any of examples 148-155, wherein the receive chain portion includes: a receive combiner configured to generate a single combined analog signal based on the plurality of intermediate analog signals; a mixer configured to generate a mixed analog signal based on the single combined analog signal; a VGA configured to generate an amplified analog signal based on the mixed analog signal; and a filter configured to generate the single analog signal based on the amplified signal.

Example 157 may include the radar device of any of examples 148-156, wherein the active BFN and subarray aperture are configured to operate as a spatial filter to reduce channel multipath and interference.

Example 158 may include the radar device of any of examples 148-157, further including a plurality of transmitter chains, wherein the plurality of transmitter chains include a P number of transmitter chains and the plurality of receiver chains include a Q number of receiver chains.

Example 159 may include the radar device of any of examples 148-158, wherein a number of traces electrically coupling the active BFN and the receive chain portion are based on a wavelength of the intermediate analog signals.

Example 160 may include the radar device of any of examples 148-159, wherein the active BFN is configured to synthesize arbitrary gain and arbitrary phase to shape nulls in the beam of the subarray.

Example 161 may include the radar device of any of examples 148-160, wherein the beam of subarray is formed to control sidelobe levels.

Example 162 may include the radar device of any of examples 148-161, wherein the beam of the subarray is formed to increase a dynamic range of the radar device for detecting objects.

Example 163 may include a radar device that includes: a DAC stage configured to generate a plurality of analog signals, the DAC stage generating a different analog signal for each transmitter chain of a plurality of transmitter chains, each analog signal of the plurality of analog signals representative of a single digital signal; each transmitter chain of the plurality of transmitter chains includes: a transmit chain portion configured to generate a plurality of intermediate analog signals representative of the corresponding analog signal; and an active BFN configured to generate a plurality of analog transmit signals, each analog transmit signal of the plurality of analog signals based on a different intermediate analog signal of the plurality of intermediate analog signals, the plurality of analog transmit signals including a beam formed in accordance with a configuration of the active BFN; a plurality of receiver chains, each receiver chain includes a receive active BFN configured to generate a plurality of intermediate Rx analog signals based on a plurality of receive signals, the plurality of intermediate Rx analog signals including a beam formed in accordance with a configuration of the receive active BFN; and a receive chain portion configured to generate a single Rx analog signal representative of the plurality of intermediate Rx analog signals; and an ADC stage configured to generate a plurality of digital signals based on Rx analog signals, the ADC stage generating a digital signal of the plurality of digital signals for each receiver chain of the plurality of receiver chains, each digital signal representative of a corresponding Rx analog signal.

Example 164 may include the radar device of example 163, wherein: the active BFN is configured to synthesize arbitrary gain and arbitrary phase to shape nulls in the beam of the plurality of analog transmit signals; and the receive active BFN is configured to synthesize arbitrary gain and arbitrary phase to shape nulls in the beam of the plurality of receive signals.

Example 165 may include the radar device of any of examples 163 and 164, wherein the beam of the plurality of analog transmit signals and the beam of the plurality of receive signals are formed to control sidelobe levels of the plurality of amplified formed analog signals and the receive signals through multiplication of the beam of the plurality of analog transmit signals and the beam of the receive signals.

Example 166 may include the radar device of any of examples 163-165, wherein the beam of the plurality of analog transmit signals and the beam of the plurality of receive signals are formed to increase a dynamic range of the radar device for detecting objects.

Example 167 may include a radar device that includes: means to generate a plurality of intermediate analog signals based on a plurality of receive signals; means to generate a plurality of analog signals, each analog signal of the plurality of analog signals representative of a different intermediate analog signal of the plurality of intermediate analog signals; and means to generate a plurality of digital signals based on analog signals, the means generating a digital signal of the plurality of digital signals for each analog signal of the plurality of analog signals, each digital signal of the plurality of digital signals representative of a corresponding analog signal of the plurality of analog signals.

Example 168 may include a radar device that includes: means to generate a plurality of analog signals, the means generating a different analog signal for each transmitter chain of a plurality of transmitter chains, each analog signal of the plurality of analog signals representative of a single digital signal; means to generate a plurality of intermediate analog signals representative of the corresponding analog signal; and means to generate a plurality of analog transmit signals, each analog transmit signal of the plurality of analog signals based on a different intermediate analog signal of the plurality of intermediate analog signals, the plurality of analog transmit signals including a beam formed in accordance with a configuration of the active BFN.

Example 169 may include a radar device that includes: means to generate a plurality of intermediate analog signals based on a plurality of receive signals, the plurality of intermediate analog signals including a beam formed in accordance with a configuration of the means; means to generate a single analog signal representative of the plurality of intermediate analog signals; and means to generate a plurality of digital signals based on analog signals, the means generating a digital signal of the plurality of digital signals for each means to generate a single analog signal representative of the plurality of intermediate analog signals, each digital signal representative of a corresponding analog signal.

While the above descriptions and connected figures may depict electronic device components as separate elements, skilled persons will appreciate the various possibilities to combine or integrate discrete elements into a single element. Such may include combining two or more circuits to form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A radar device comprising:
   a digital to analog converter (DAC) stage configured to generate a plurality of analog signals, the DAC stage generating a different analog signal for each transmitter chain of a plurality of transmitter chains, each analog signal of the plurality of analog signals representative of a single digital signal; and
   each transmitter chain of the plurality of transmitter chains comprises:
   a transmit chain portion configured to generate a plurality of intermediate analog signals representative of the corresponding analog signal; and
   a switched analog beamforming network (BFN) comprising a first BFN stage and a second BFN stage, wherein the BFN is configured to generate a plurality of analog transmit signals for an intermediate analog signal of the plurality of intermediate analog signals, the plurality of analog transmit signals comprising a beam formed in accordance with a state of the switched analog BFN, wherein the first BFN stage is configured to form the beam in a first angular dimension and the second BFN stage is configured to form the beam in a second angular dimension that is different from the first angular dimension.

2. The radar device of claim 1, wherein the transmit chain portion comprises:
   a filter configured to generate a filtered analog signal based on the corresponding analog signal;
   a variable gain amplifier (VGA) configured to generate an amplified analog signal based on the filtered analog signal;
   a mixer configured to generate a mixed analog signal based on the amplified analog signal; and
   a splitter configured to generate the plurality of intermediate analog signals based on the mixed analog signal.

3. The radar device of claim 1, wherein the switched analog BFN comprises:
   a first M×M BFN comprising the first BFN stage configured to generate a plurality of formed analog signals for an intermediate analog signal of the plurality of intermediate analog signals;
   a plurality of variable gain amplifiers (VGAs) configured to generate an amplified formed analog signal for each formed analog signal of the plurality of formed analog signals;
   a plurality of splitters configured to generate a plurality of split analog signals for each amplified formed analog signal of the plurality of amplified formed analog signals;
   a plurality of N×N BFNs comprising the second BFN stage configured to generate a plurality of additional analog signals for a split analog signal of the plurality of split analog signals; and
   a plurality of power amplifier (PAs) configured to generate the plurality of analog transmit signals based on the plurality of additional analog signals.

4. The radar device of claim 3, wherein the first M×M BEN is configured to generate the plurality of formed analog signals formed in the first angular dimension.

5. The radar device of claim 4, wherein each N×N BFN of the plurality of N×N BFNs is configured to generate the plurality of additional analog signals formed in the second angular dimension.

6. The radar device of claim 3, wherein the switched analog BFN further comprises a first plurality of switches and a second plurality of switches, the radar device further comprising a control circuit configured to:
control the first plurality of switches to cause the first M×M BFN to generate the plurality of formed analog signals as a number of analog signals; and
control the second plurality of switches to cause each N×N BFN of the plurality of N×N BFNs to generate the corresponding plurality of additional analog signals as a number of analog signals, wherein the state of the switched analog BFN comprises a state of the first plurality of switches and a state of the second plurality of switches.

7. The radar device of claim 1, wherein the switched analog BFN comprises:
a second plurality of N×N BFNs configured to generate a plurality of formed analog signals for an intermediate analog signal of the plurality of intermediate analog signals; and
a plurality of PAs configured to generate the plurality of analog transmit signals based on the plurality of formed analog signals.

8. A radar device comprising:
a digital to analog converter (DAC) stage configured to generate a plurality of analog signals, the DAC stage generating a different analog signal for each transmitter chain of a plurality of transmitter chains, each analog signal of the plurality of analog signals representative of a single digital signal; and
each transmitter chain of the plurality of transmitter chains comprises:
a transmit chain portion configured to generate a plurality of intermediate analog signals representative of the corresponding analog signal; and
an active beamforming network (BFN) configured to generate a plurality of analog transmit signals, each analog transmit signal of the plurality of analog signals based on a different intermediate analog signal of the plurality of intermediate analog signals, the plurality of analog transmit signals comprising a beam formed in accordance with a configuration of the active BFN, wherein the active BFN comprises a first BFN stage and a second BFN stage, wherein the first BFN stage is configured to form the beam in a first angular dimension and the second BFN stage is configured to form the beam in a second angular dimension that is different from the first angular dimension.

9. The radar device of claim 8, wherein the transmit chain portion comprises:
a filter configured to generate a filtered analog signal based on the corresponding analog signal;
a variable gain amplifier (VGA) configured to generate an amplified analog signal based on the filtered analog signal;
a mixer configured to generate a mixed analog signal based on the amplified analog signal; and
a splitter configured to generate the plurality of intermediate analog signals based on the mixed analog signal.

10. The radar device of claim 8, wherein the active BFN comprises:
a plurality of phase shifters configured to shift a phase of each intermediate analog signal of the plurality of intermediate analog signals to generate a plurality of phase shifted analog signals, each phase shifted analog signal of the plurality of phase shifted analog signals based on a different intermediate analog signal of the plurality of intermediate analog signals; and
a plurality of power amplifiers (PAs) configured to generate the plurality of analog transmit signals, each analog transmit signal of the plurality of transmit signals based on a different phase shifted analog signal of the plurality of phase shifted analog signals.

11. The radar device of claim 8, wherein the beam of the plurality of analog transmit signals is formed to increase a dynamic range of the radar device for detecting objects.

12. The radar device of claim 8, wherein the plurality of transmitter chains are uniformly spaced relative to each other.

13. The radar device of claim 8, wherein the plurality of transmitter chains are non-uniformly spaced relative to each other.

* * * * *